United States Patent
Wang et al.

(10) Patent No.: US 10,214,132 B2
(45) Date of Patent: Feb. 26, 2019

(54) CARGO RESTRAINT SYSTEMS

(71) Applicant: GM GLOBAL TECHNOLOGY OPERATIONS LLC, Detroit, MI (US)

(72) Inventors: Jenne-Tai Wang, Rochester, MI (US); Yuxiu Zhang, Pontiac, MI (US); Chin-Hsu Lin, Troy, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/601,768

(22) Filed: May 22, 2017

(65) Prior Publication Data
US 2018/0334078 A1 Nov. 22, 2018

(51) Int. Cl.
*B60P 7/08* (2006.01)
*B60R 22/10* (2006.01)

(52) U.S. Cl.
CPC ............ *B60P 7/0823* (2013.01); *B60R 22/10* (2013.01)

(58) Field of Classification Search
CPC . B60R 22/16; B60R 2022/289; B60R 22/023; B60R 22/341; B60R 22/42; B60P 7/0823; B60P 7/0876; B60P 7/0807; B60P 7/135; B60P 3/40; B60P 7/06; B60P 7/0815; B60P 7/0892
USPC ..... 410/97, 98, 118, 106, 100, 104, 7, 8, 94, 410/99, 22, 19; 24/170, 198, 199, 300, 24/302, 455, 570; 296/193.04, 100.16
See application file for complete search history.

(56) References Cited

U.S. PATENT DOCUMENTS

| | | | |
|---|---|---|---|
| 4,138,157 A | 2/1979 | Pickett et al. | |
| 4,588,208 A | 5/1986 | Yoshitsugu | |
| 5,529,343 A | 6/1996 | Klink | |
| 5,547,223 A * | 8/1996 | Koketsu | B60R 22/16 280/801.1 |
| 5,658,012 A | 8/1997 | Villarreal et al. | |
| 5,788,280 A | 8/1998 | Ohsumi | |
| 7,650,717 B2 * | 1/2010 | Drayer | A01G 17/10 47/32.5 |
| 8,292,329 B2 * | 10/2012 | Singh | A01K 1/0272 280/806 |
| 8,622,431 B2 * | 1/2014 | Singh | B60R 22/10 280/806 |

(Continued)

OTHER PUBLICATIONS

A document entitled "Paw Prime's Doggy Seatbelt's" retrieved from the internet on Mar. 30, 2017 at https://pawprime.com/products/paw-primes-seatbelt.

(Continued)

*Primary Examiner* — D Glenn Dayoan
*Assistant Examiner* — Sunsurraye Westbrook
(74) *Attorney, Agent, or Firm* — Lorenz & Kopf, LLP

(57) ABSTRACT

A kit for securing cargo within an interior of a vehicle is provided. The vehicle has an occupant restraint system including a coupling member. The kit includes a harness having at least one connecting ring. The harness is configured to hold the cargo. The kit includes a first strap having a first connector at a first end releasably coupled to the coupling member and a second connector at a second end coupled to the at least one connecting ring. The kit includes an energy absorbing element defined on the strap between the first end and the second end. The energy absorbing element is deformable to absorb a force acting on the cargo.

14 Claims, 35 Drawing Sheets

(56) References Cited

U.S. PATENT DOCUMENTS

2013/0092100 A1* 4/2013 Davis .................. B60R 22/10
119/771

OTHER PUBLICATIONS

Frank Witsil, "Could changes in car seat design save dogs in crashes?" Detroit Free Press, Jun. 30, 2016, retrieved from the internet on Jul. 13, 2016 at: http://www.freep.com/story/money/business/michigan/2016/06/29/car-dogs-pets-safety/86339672/.
A document entitled "2011 Pilot Study: The Center for Pet Safety presents the Pilot Study evidence that drives our mission." Center for Pet Safety, retrieved from the internet on Jul. 13, 2016 at: http://www.centerforpetsafety.org/test-results/harnesses/2011-pilot-study/.
A document entitled "CPS Approved Harnesses" Center for Pet Safety, retrieved from the internet on Jul. 13, 2016 at: http://www.centerforpetsafety.org/test-results/harnesses/cps-approved-harnesses/.
Lindsey A. Wolko, "Center for Pet Safety 2015 Pet Travel Seat Pilot Summary Report" Center for Pet Safety, sponsored by Subaru of America, dated Oct. 2, 2015.

* cited by examiner

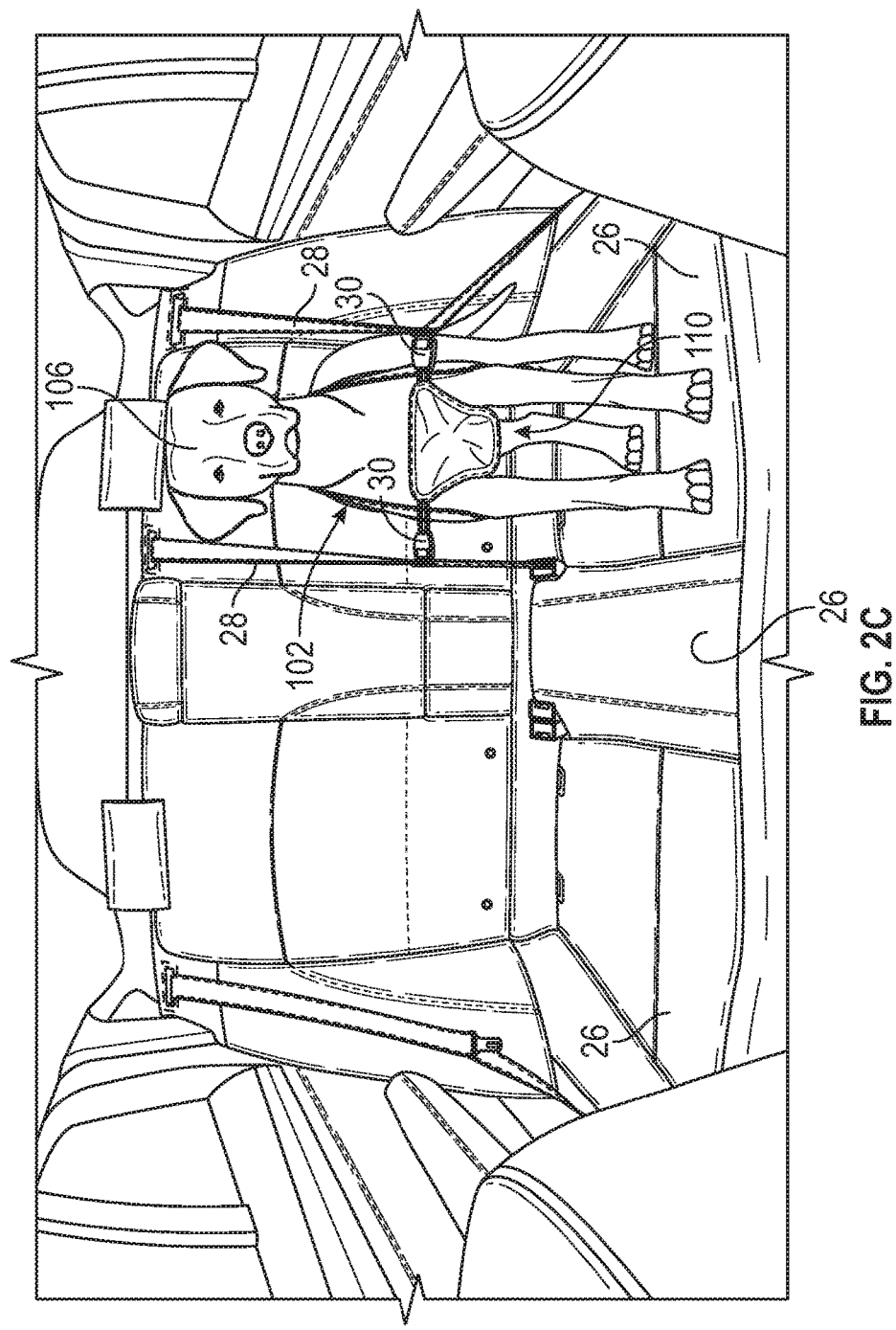

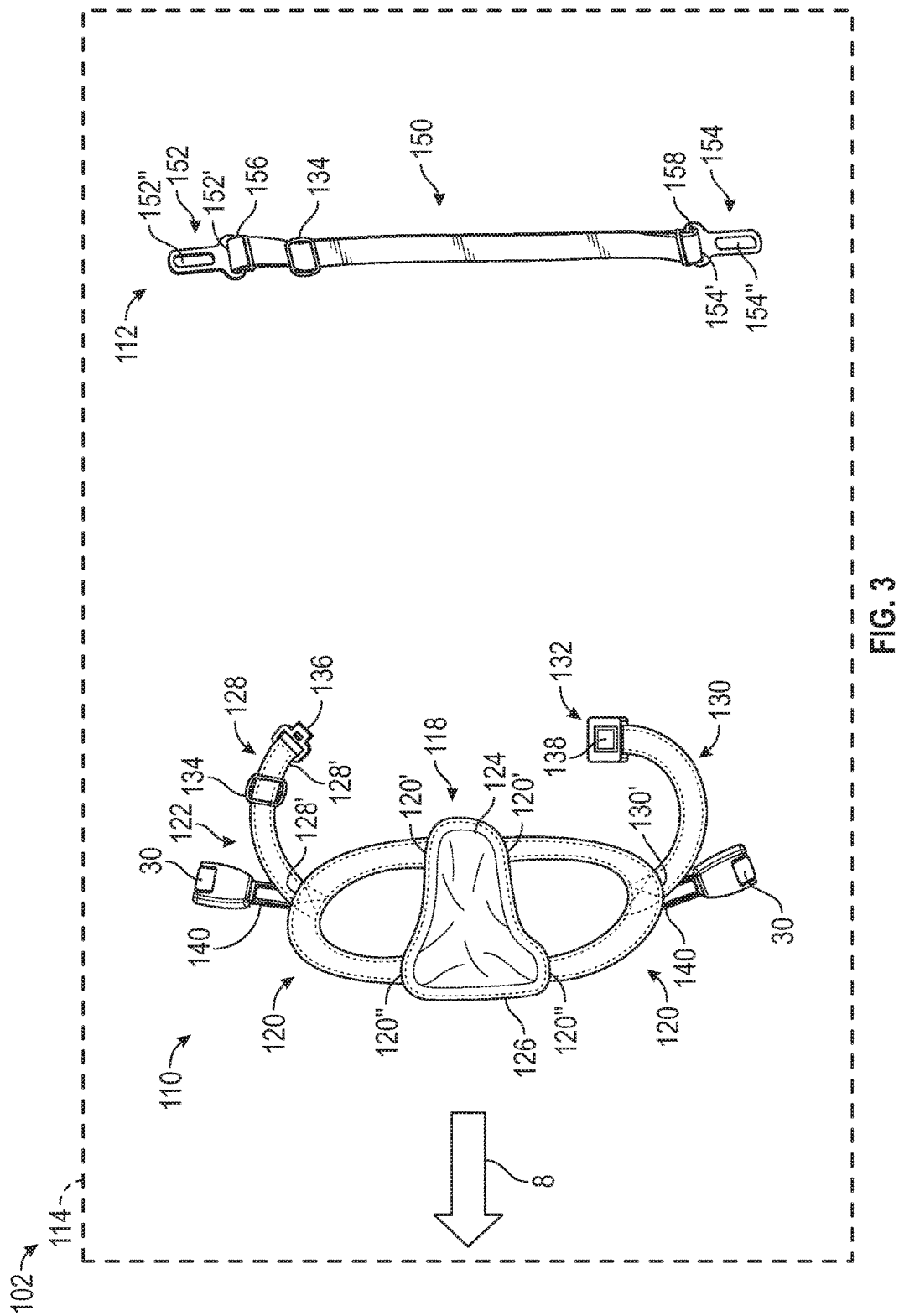

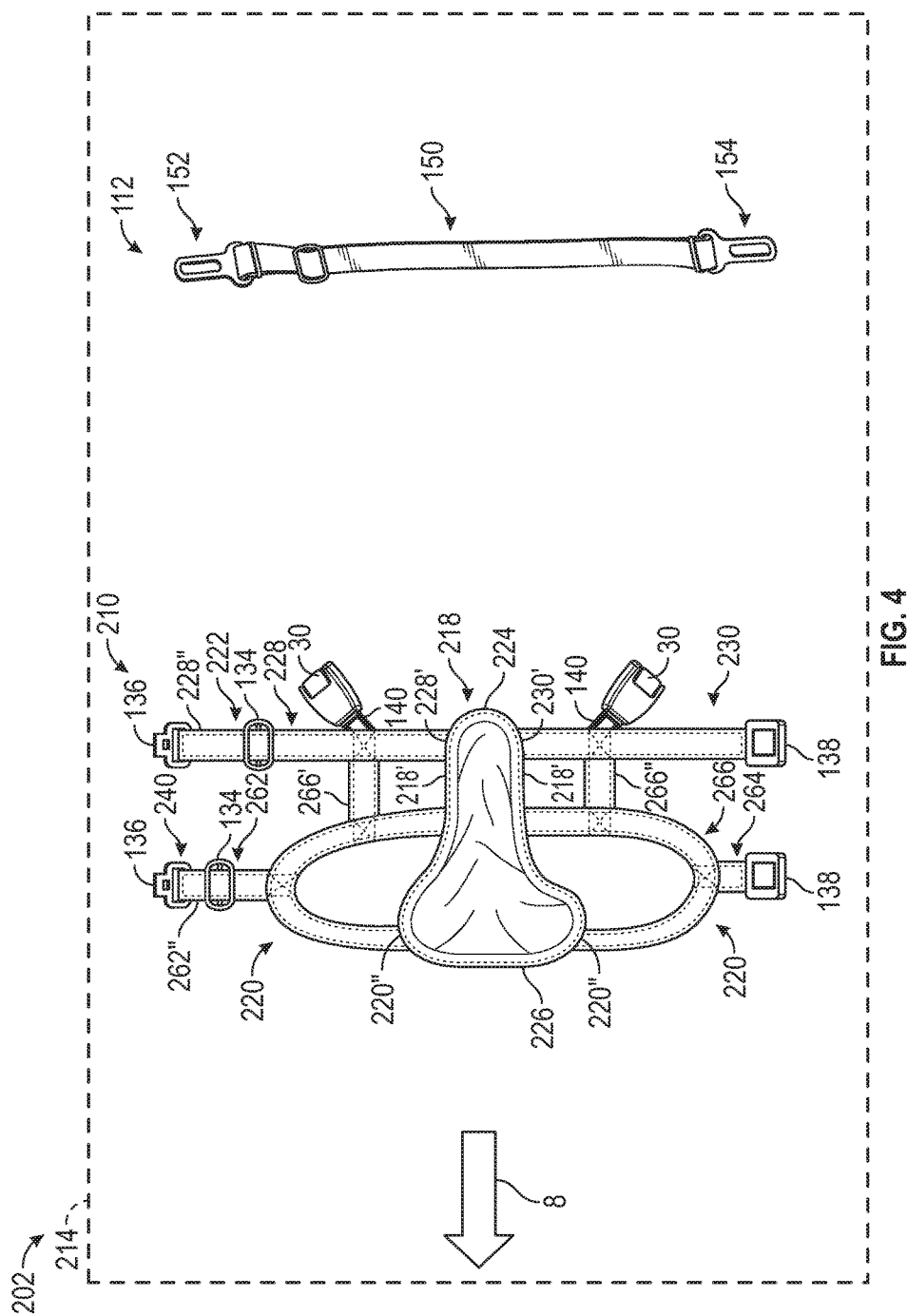

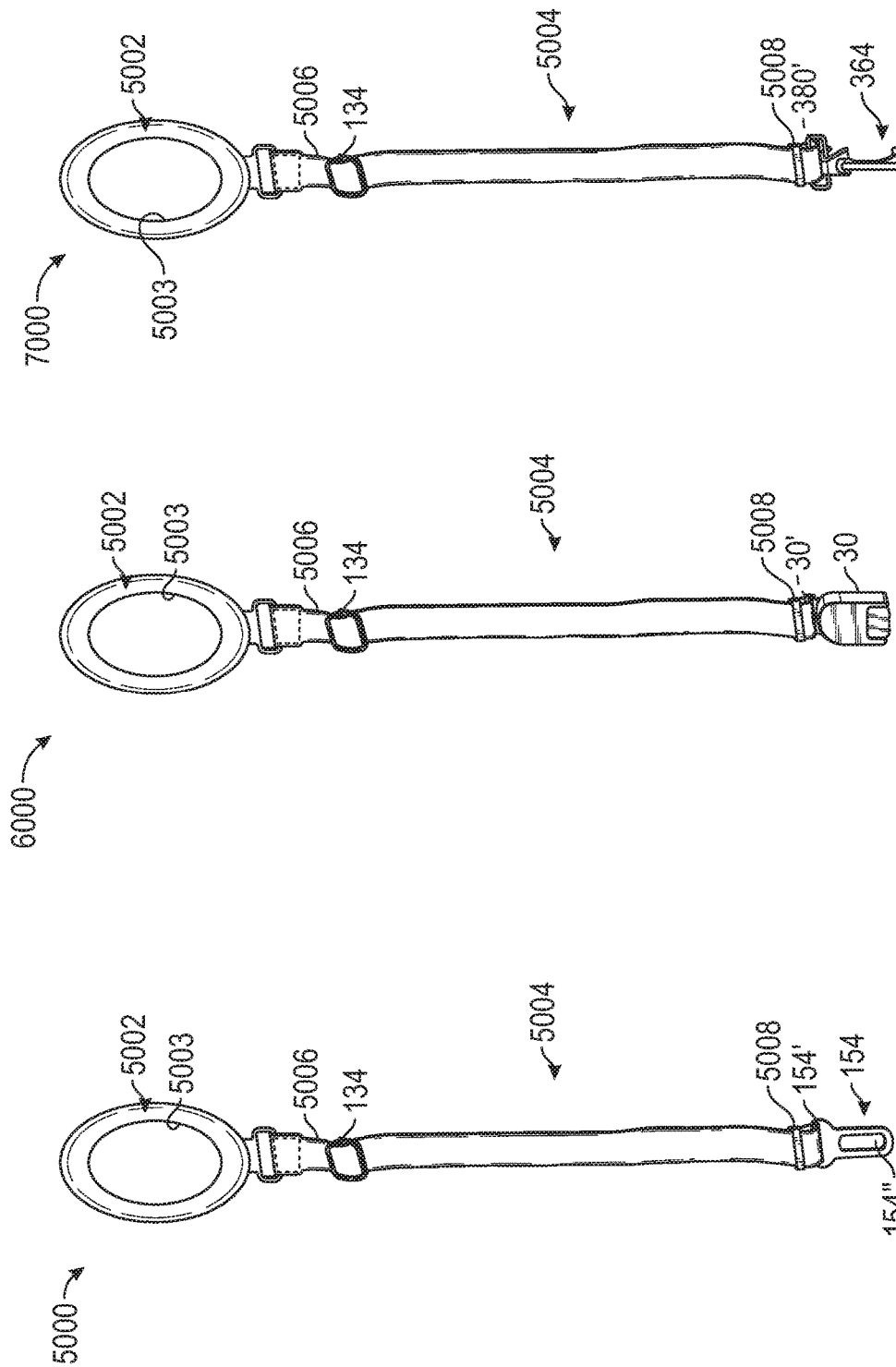

CARGO RESTRAINT SYSTEMS

TECHNICAL FIELD

The present disclosure generally relates to vehicles, and more particularly relates to cargo restraint systems for restraining cargo, including, pets, within an interior cabin of a vehicle.

INTRODUCTION

Generally, certain vehicles, such as motor vehicles, have an interior cabin, which receives one or more occupants of the vehicle. Typically, the interior cabin includes one or more seating surfaces, which enable the one or more occupants to sit comfortably within the vehicle. The interior cabin also includes one or more restraint systems, which retain an occupant on the seating surfaces during the operation of the vehicle. In certain instances, when not in use, these seat surfaces may also be used by an occupant to carry one or more cargo items, including pets, within the interior cabin. Generally, however, the one or more restraint systems are not suitable for restraining the cargo item, including the pet, during the operation of the vehicle.

Accordingly, it is desirable to provide cargo restraint systems, which enable cargo, including pets, to be restrained within the vehicle during operation. It is also desirable to provide cargo restraint systems that include energy absorbing features for restraining the cargo, including pets, comfortably during a deceleration of the vehicle. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a kit for securing cargo within an interior of a vehicle. The vehicle has an occupant restraint system including a coupling member. The kit includes a harness having at least one connecting ring. The harness is configured to hold the cargo. The kit includes a first strap having a first connector at a first end releasably coupled to the coupling member and a second connector at a second end coupled to the at least one connecting ring. The kit includes an energy absorbing element defined on the strap between the first end and the second end. The energy absorbing element is deformable to absorb a force acting on the cargo.

The first strap is a tether. The energy absorbing element is defined on the tether between the first end and the second end. The first connector is a first spring hook clip that is configured to couple to the coupling member in the form of a lower anchor associated with the vehicle. The second connector is a second spring hook clip releasably coupled to the at least one connecting ring. The second connector is a handle that is configured to couple to the coupling member in the form of a seat belt of the occupant restraint system associated with the vehicle. The energy absorbing element includes a housing and at least one energy absorbing member. The at least one energy absorbing member couples the housing to the first strap. The at least one energy absorbing member is selected from the group consisting of a plurality of rivets, an adhesive strip, a plurality of stitches and a tear strip. The energy absorbing element is integrally formed on a first portion of the first strap. The energy absorbing element is rolled or folded such that a first length of the energy absorbing element is less than a length of the first strap. The energy absorbing element includes two energy absorbing elements including a first energy absorbing element formed on the first portion of the first strap and a second energy absorbing element formed on a second portion of the first strap. The first connector includes a first spring hook clip that is configured to couple to the coupling member in the form of a lower anchor associated with the vehicle and the second connector includes a seat belt buckle receptacle.

In various embodiments, a cargo restraint system for securing cargo to a coupling member within an interior of a vehicle is provided. The cargo restraint system includes a harness having at least one connecting ring. The harness is configured to hold the cargo. The cargo restraint system includes a tether having a first connector at a first end that releasably couples to the connecting ring and a second connector at a second end opposite the first end that is configured to couple to the coupling member within the interior of the vehicle. The cargo restraint system includes an energy absorbing element defined on the strap between the first end and the second end. The energy absorbing element is deformable to absorb a force acting on the cargo.

The tether includes a strap. The energy absorbing element includes a housing and at least one energy absorbing member. The at least one energy absorbing member couples the housing to the strap. The at least one energy absorbing member is selected from the group consisting of a plurality of rivets, an adhesive strip, a plurality of stitches and a tear strip. The second connector includes a first spring hook clip that is configured to couple to the coupling member in the form of a lower anchor associated with the vehicle and the second connector includes a second spring hook clip coupled to the at least one connecting ring.

In various embodiments, a cargo restraint system for securing cargo within an interior of a vehicle is provided. The cargo restraint system includes a body having a plurality of interconnected panels. The plurality of interconnected panels cooperates to hold the cargo. The cargo restraint system includes a first seat belt buckle receptacle coupled to a first panel of the plurality of interconnected panels and configured to couple to a first belt tongue of a first seat belt associated with the vehicle. The cargo restraint system includes a first lower connector coupled to a second panel of the plurality of interconnected panels and configured to couple to a first lower anchor associated with the vehicle. The first lower connector includes a first spring hook clip configured to connect to the first lower anchor. The cargo restraint system includes a second spring hook clip coupled to one of the plurality of interconnected panels and configured to couple to a second lower anchor associated with the vehicle. The cargo restraint system includes a second seat belt buckle receptacle coupled to one of the plurality of interconnected panels and configured to couple to a second belt tongue of a second seat belt associated with the vehicle. The body includes a collapsible body having hinges interconnecting the plurality of interconnected panels and at least one hinge lock operable to arrange one of the plurality of interconnected panels substantially co-planar with another one of the plurality of interconnected panels.

BRIEF DESCRIPTION OF THE DRAWINGS

The exemplary embodiments will hereinafter be described in conjunction with the following drawing figures, wherein like numerals denote like elements, and wherein:

FIG. 2C is a schematic illustration of cargo, such as a pet, restrained by the pet restraint system of FIG. 2A within an interior of the vehicle of FIG. 1 in accordance with one of various embodiments;

FIG. 3 is an exemplary pet restraint kit that includes the pet restraint system of FIG. 2A in accordance with various embodiments;

FIG. 4 is an exemplary pet restraint kit that includes an exemplary pet restraint system of the cargo restraint system of FIG. 1 in accordance with various embodiments;

Figure 1:
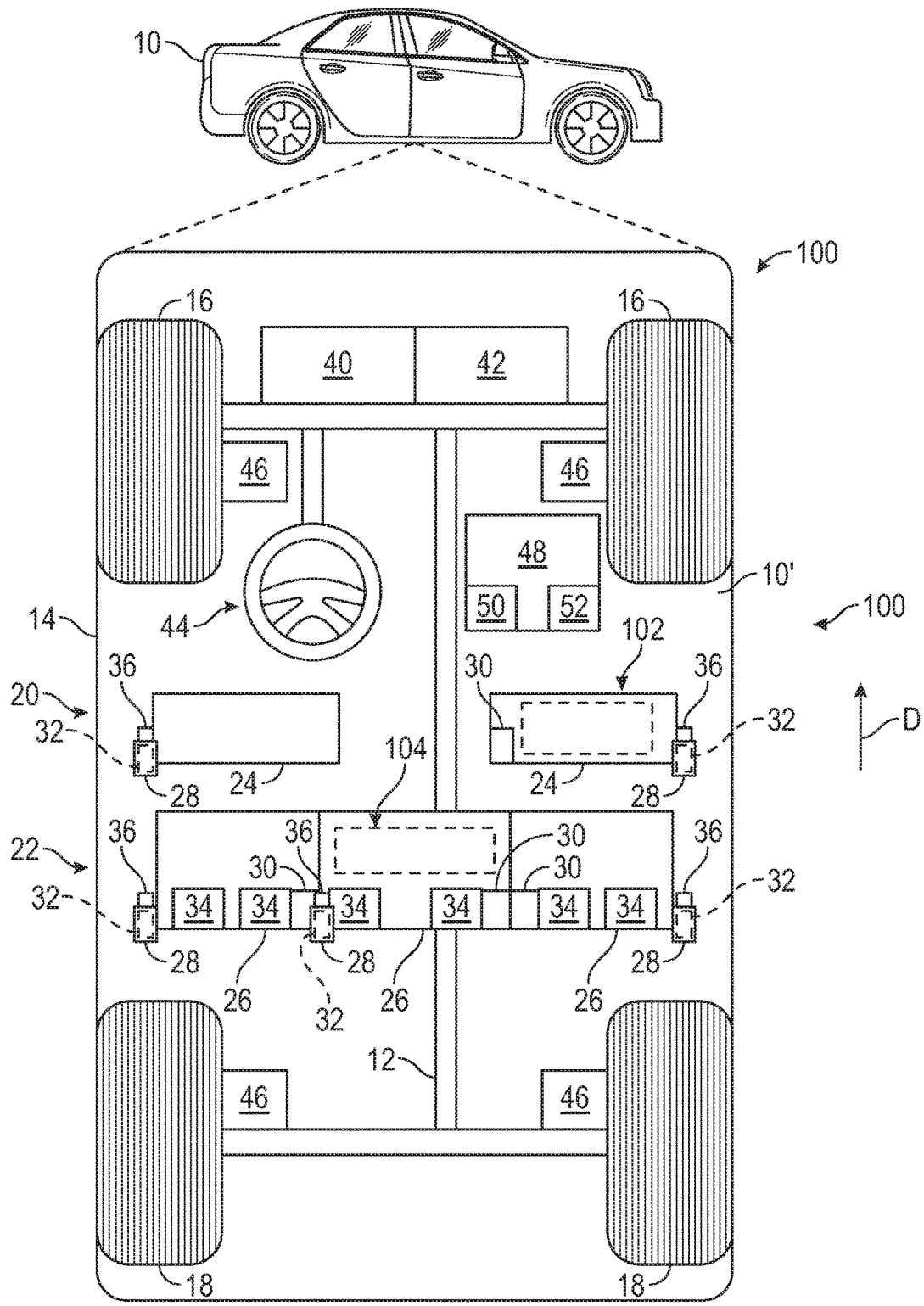
FIG. 1 is a functional block diagram illustrating a vehicle having a cargo restraint system, in accordance with various embodiments.
Figure 31:
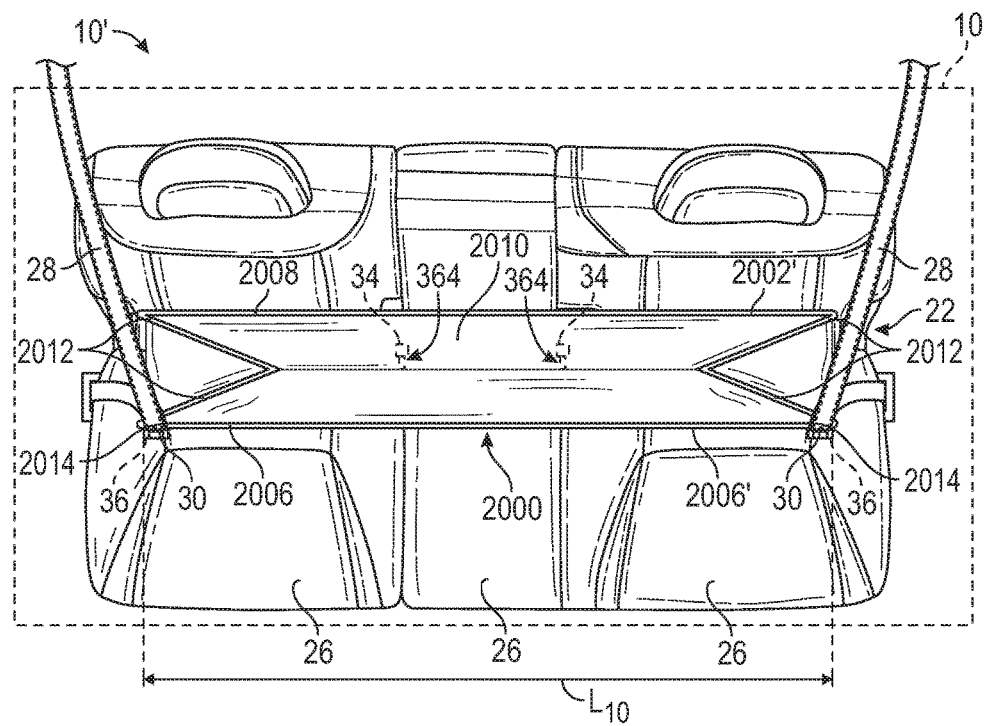
FIG. 31 is a schematic top view of an exemplary cargo carrier restraint system of the cargo restraint system of FIG.
Figure 32:
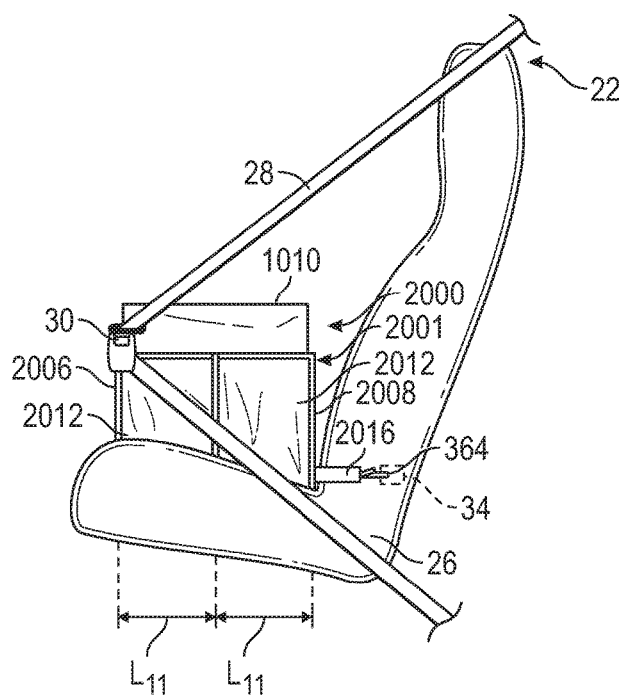
Figure 33:
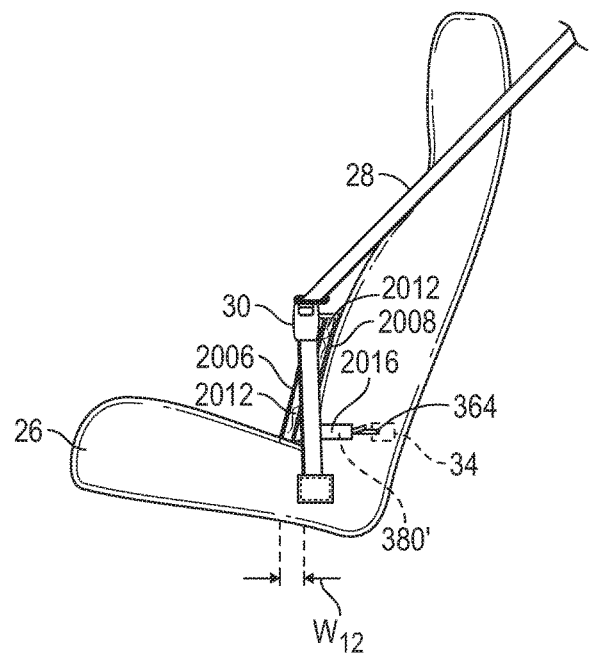
Figure 34:
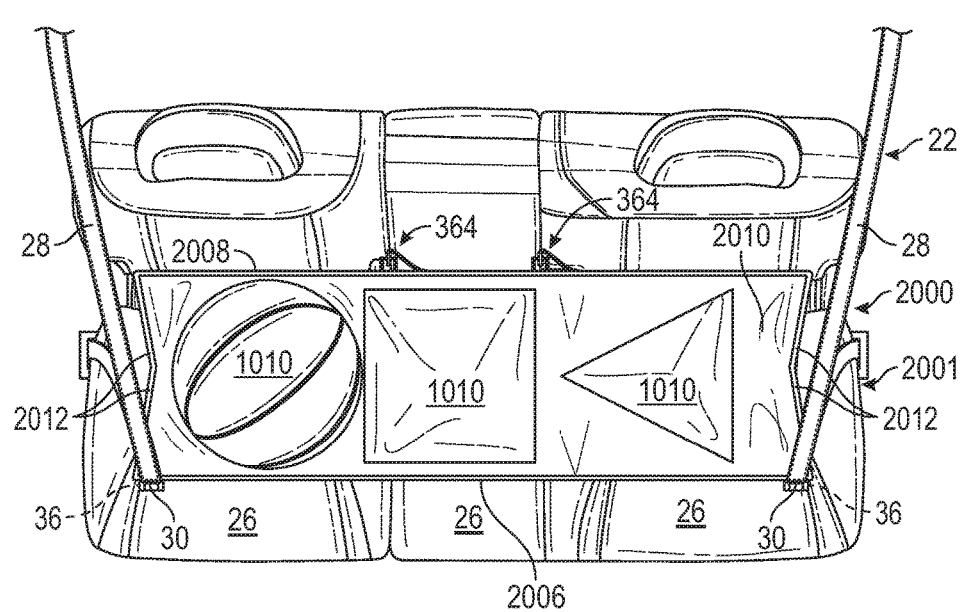
Figure 34A:
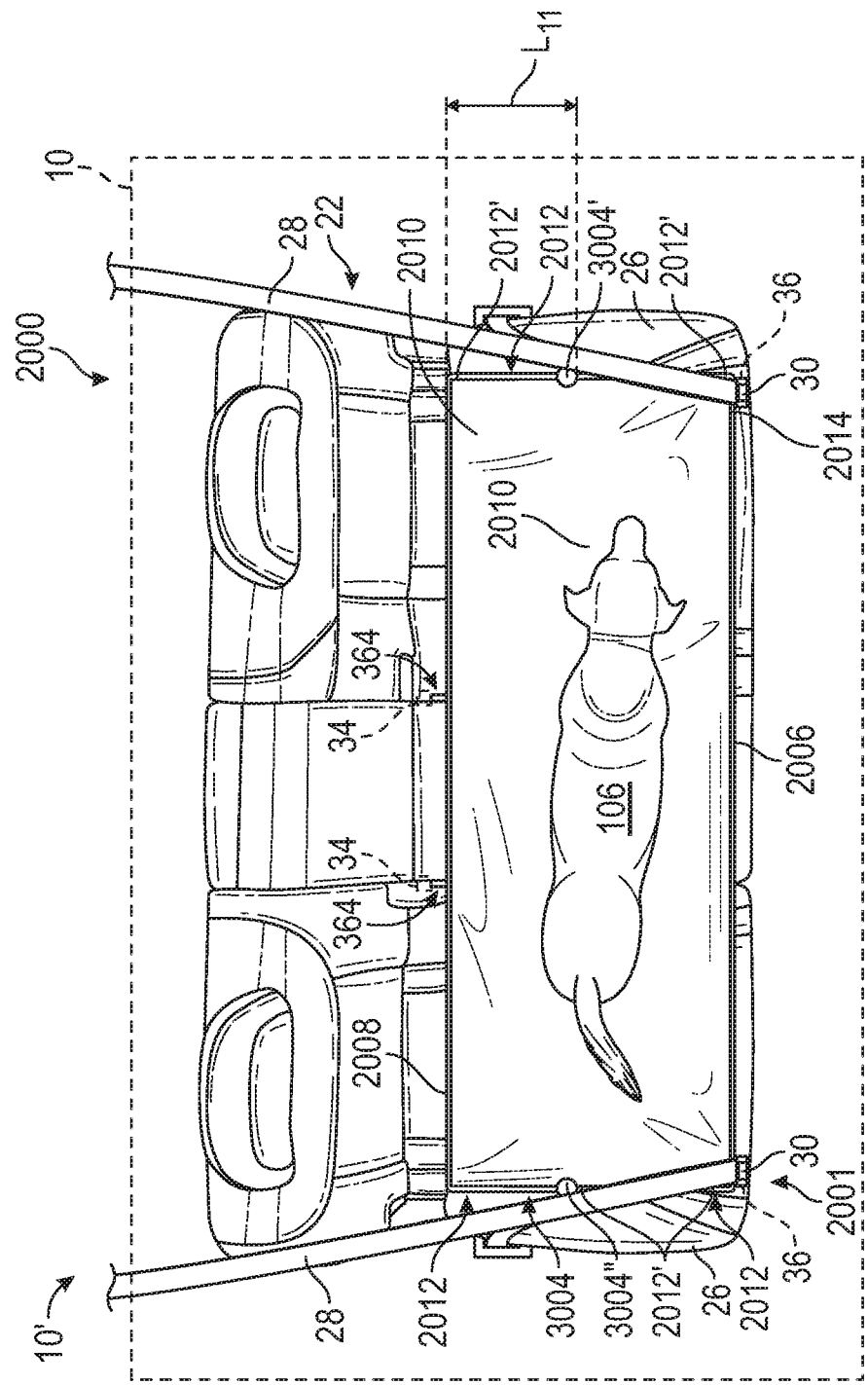
Figure 35:
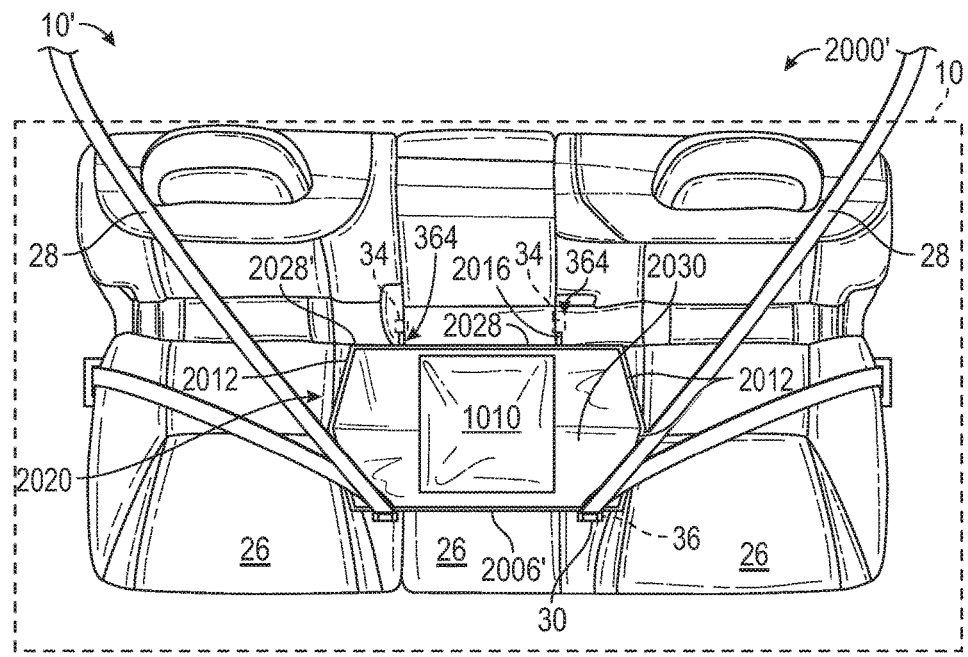
Figure 36:
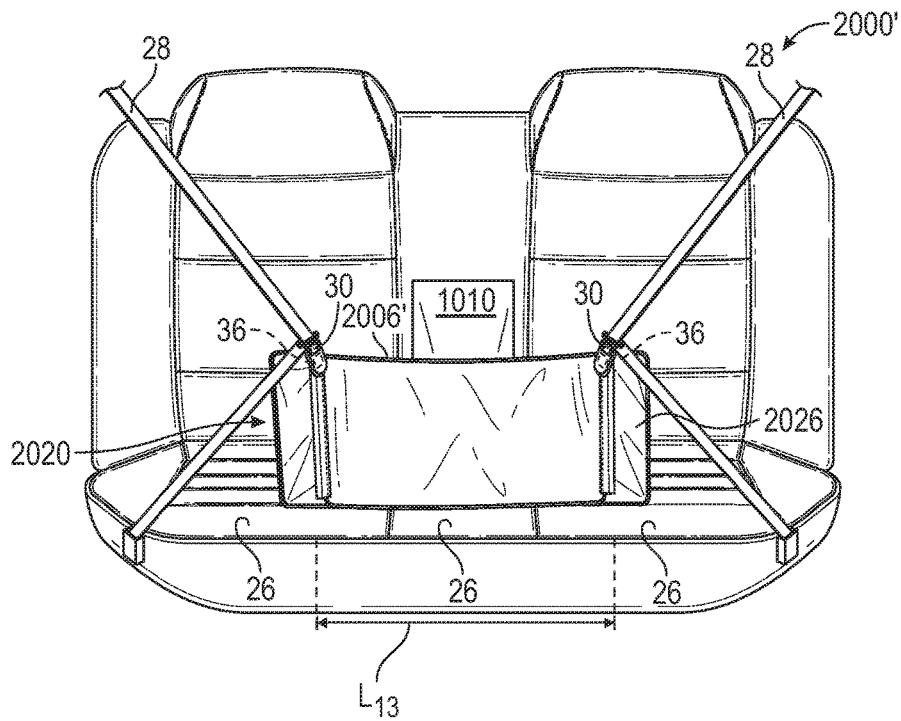
Figure 37:
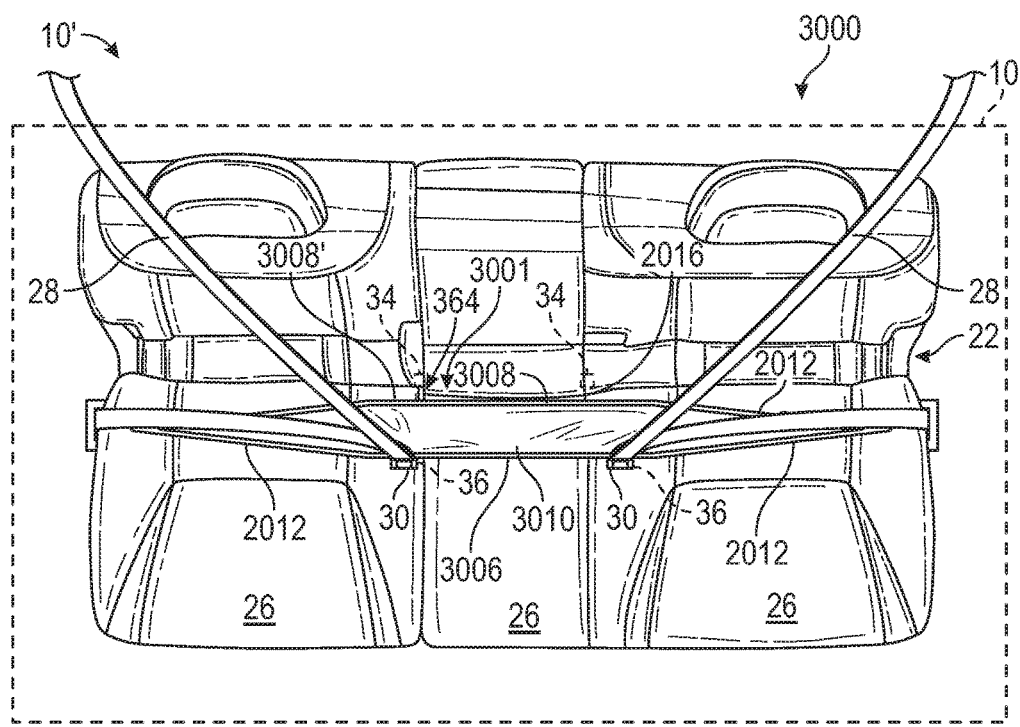
Figure 38:
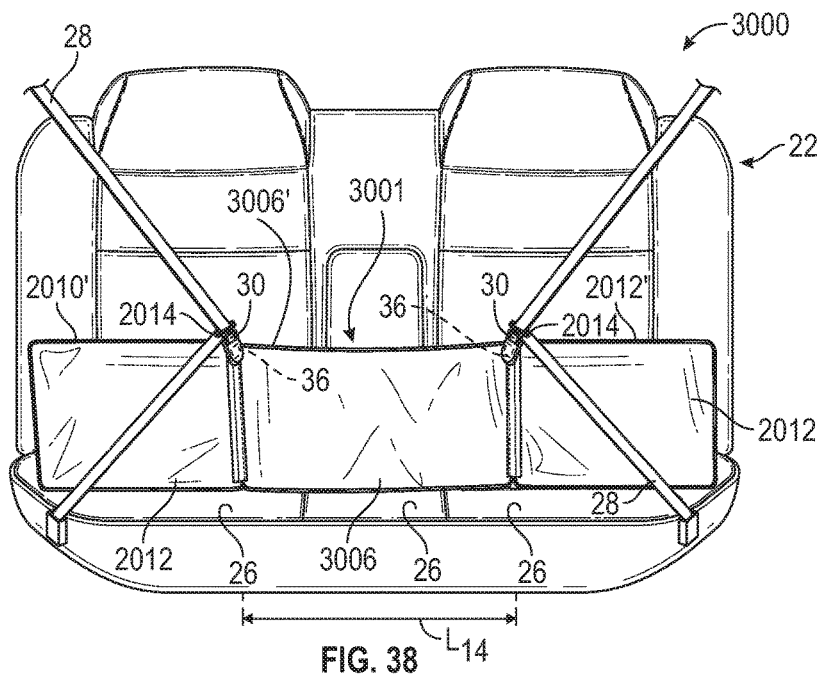
Figure 39:
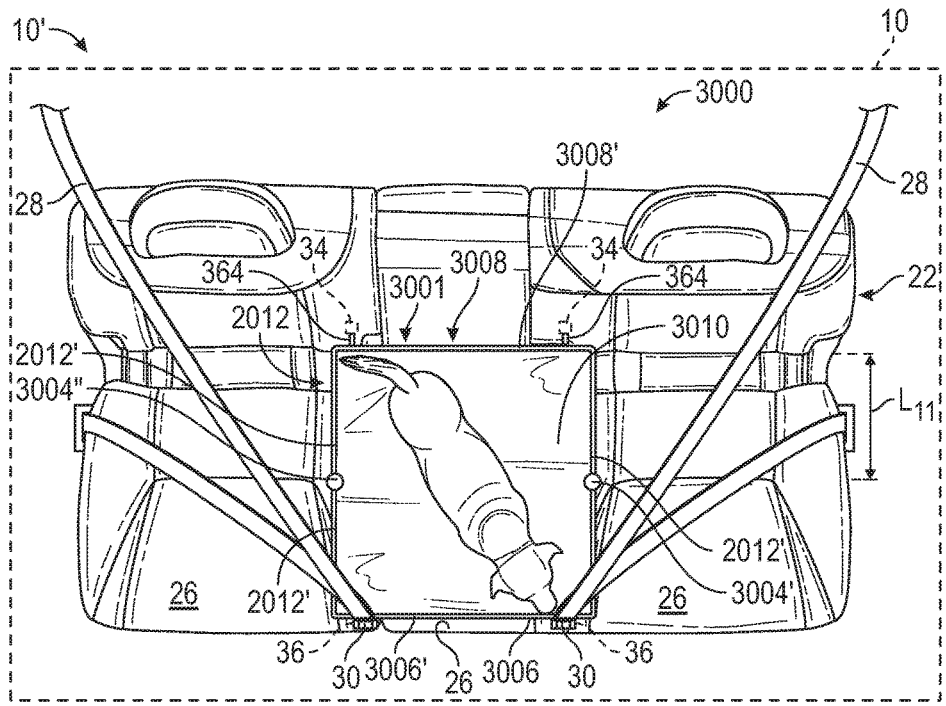
Figure 40:
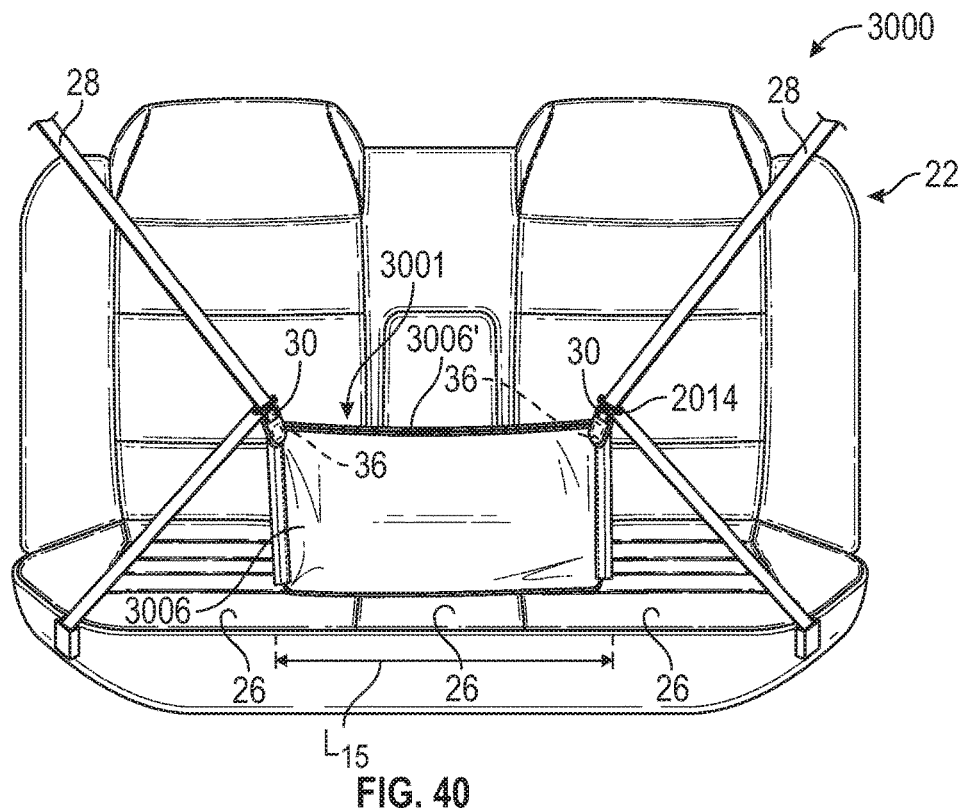
Figure 41:
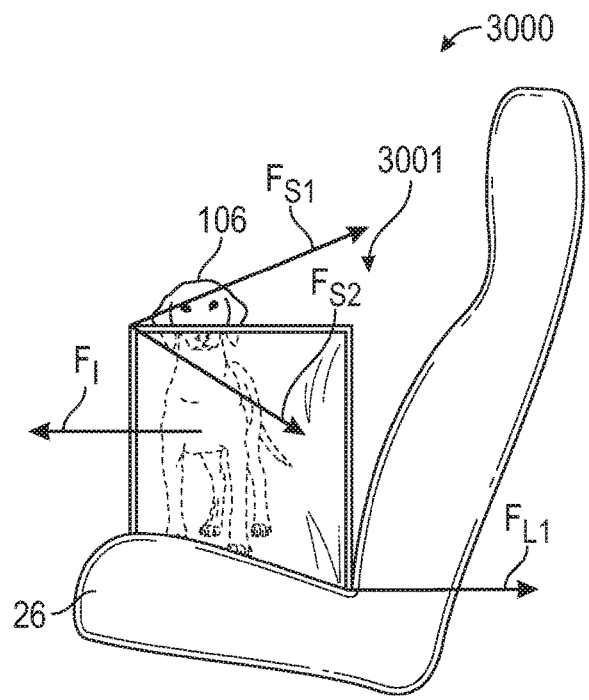
Figure 42:
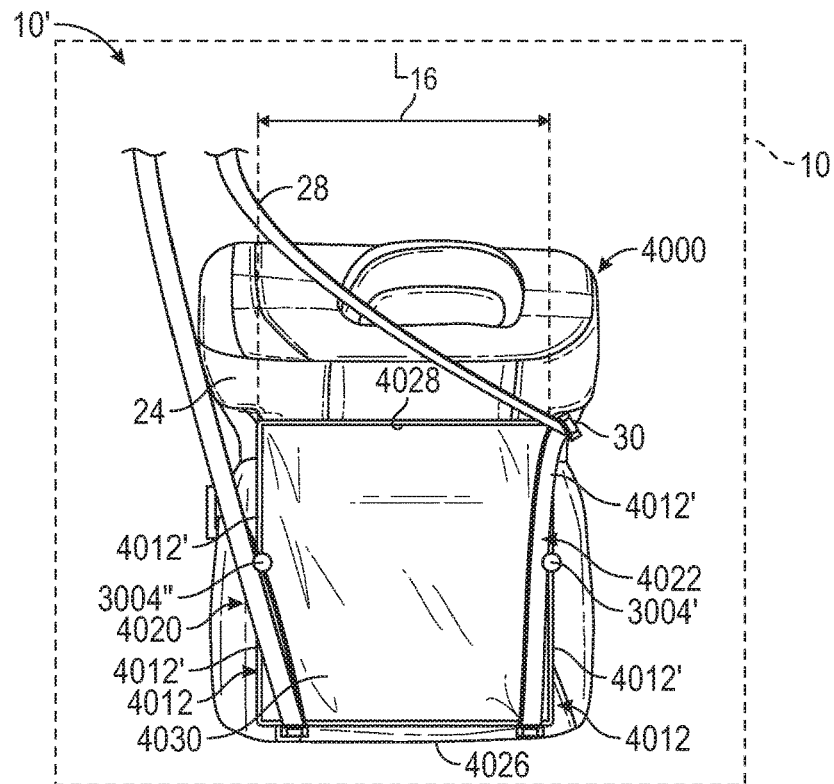
Figure 43:
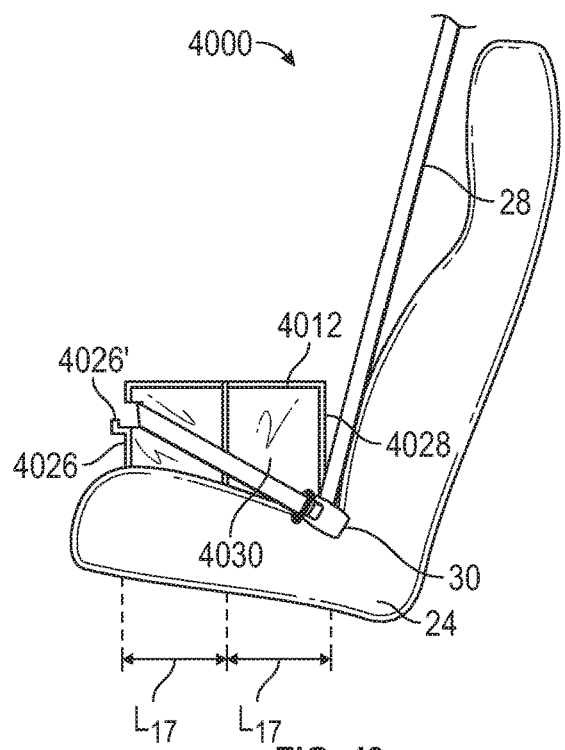
Figure 44:
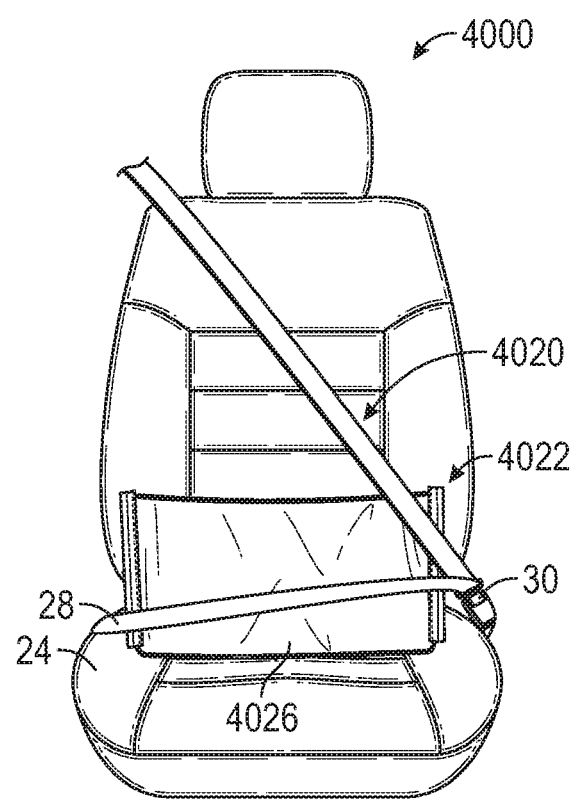
Figure 48:
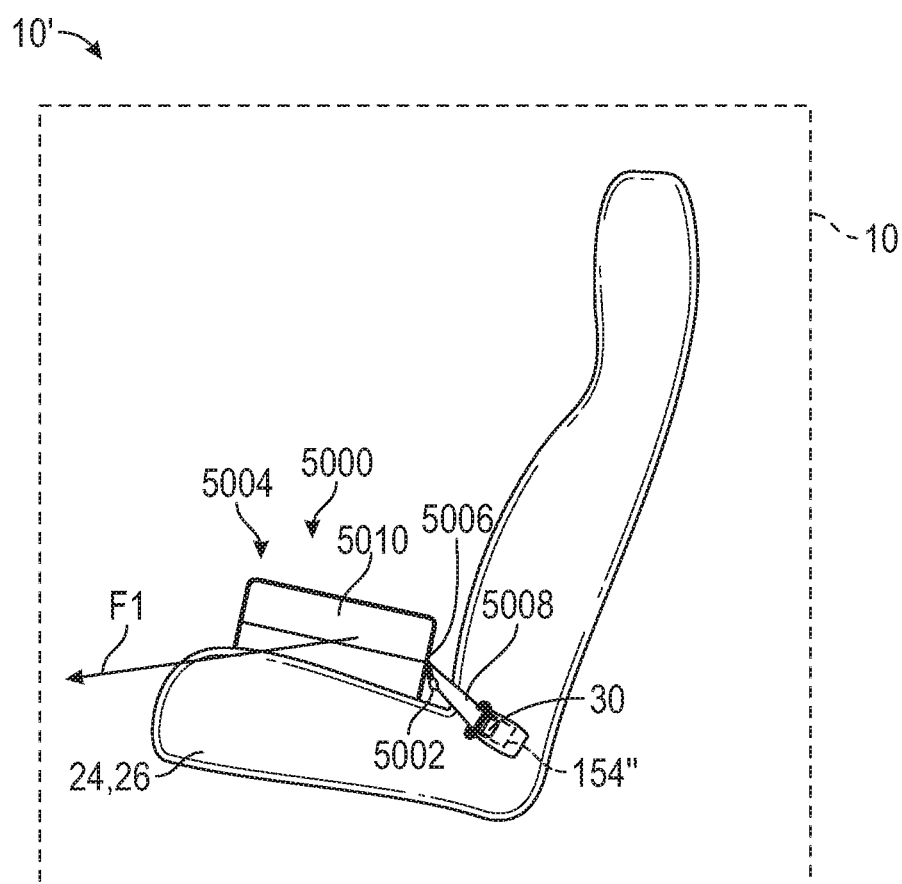

1 in a first, collapsed state and coupled within an interior of the vehicle of FIG. 1, in accordance with various embodiments;

FIG. 32 is a schematic side view of the cargo carrier restraint system of FIG. 31 in a second, expanded state, in accordance with various embodiments;

FIG. 33 is a schematic side view of the cargo carrier restraint system of FIG. 31 in the first, collapsed state, in accordance with various embodiments;

FIG. 34 is a schematic top view of the cargo carrier restraint system of FIG. 31 in the second, expanded state and retaining various cargo in accordance with various embodiments;

FIG. 34A is a schematic top view of the cargo carrier restraint system of FIG. 31 in the second, expanded state with one or more hinge locks coupled to the cargo carrier restraint system for retaining cargo, such as a pet, in accordance with various embodiments;

FIG. 35 is a schematic top view of an exemplary cargo carrier restraint system of the cargo restraint system of FIG. 1 in a second, expanded state and coupled within an interior of the vehicle of FIG. 1, in accordance with various embodiments;

FIG. 36 is a schematic front view of the cargo carrier restraint system of FIG. 35 in the second, expanded state, in accordance with various embodiments;

FIG. 37 is a schematic front view of an exemplary cargo carrier restraint system of the cargo restraint system of FIG. 1 in a first, collapsed state and coupled within an interior of the vehicle of FIG. 1, in accordance with various embodiments;

FIG. 38 is a schematic front view of the cargo carrier restraint system of FIG. 37 in the second, expanded state, in accordance with various embodiments;

FIG. 39 is a schematic top view of an exemplary cargo carrier restraint system of the cargo restraint system of FIG. 37 in a second, expanded state with one or more hinge locks coupled to the cargo carrier restraint system for retaining cargo, such as a pet, coupled within an interior of the vehicle of FIG. 1, in accordance with various embodiments;

FIG. 40 is a schematic front view of the cargo carrier restraint system of FIG. 37 in the second, expanded state, in accordance with various embodiments;

FIG. 41 is a schematic side view of the cargo carrier restraint system of FIG. 37 that illustrates forces acting on the cargo carrier restraint system while retaining cargo within an interior of the vehicle of FIG. 1 in accordance with various embodiments;

FIG. 42 is a schematic top view of an exemplary cargo carrier restraint system of the cargo restraint system of FIG. 1 in a second, expanded state with one or more hinge locks coupled to the cargo carrier restraint system for retaining cargo coupled within an interior of the vehicle of FIG. 1, in accordance with various embodiments;

FIG. 43 is a schematic side view of the cargo carrier restraint system of FIG. 42 in the second, expanded state, in accordance with various embodiments;

FIG. 44 is a schematic front view of the cargo carrier restraint system of FIG. 42 in the second, expanded state, in accordance with various embodiments;

FIG. 45 illustrates an exemplary cargo carrier restraint system of the cargo restraint system of FIG. 1 for retaining cargo within an interior of the vehicle of FIG. 1, in accordance with various embodiments;

FIG. 46 illustrates another exemplary cargo carrier restraint system of the cargo restraint system of FIG. 1 for retaining cargo within an interior of the vehicle of FIG. 1, in accordance with various embodiments;

FIG. 47 illustrates yet another exemplary cargo carrier restraint system of the cargo restraint system of FIG. 1 for retaining cargo within an interior of the vehicle of FIG. 1, in accordance with various embodiments; and FIG. 48 is a schematic side view of the cargo carrier restraint system of FIG. 45 retaining cargo within an interior of the vehicle of FIG. 1 in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a cargo restraint system shown generally at 100 is associated with a vehicle 10 in accordance with various embodiments. In general, the cargo restraint system 100 includes a pet restraint system 102 and a cargo carrier restraint system 104. Generally, the pet restraint system 102 is capable of securing an animal, including, but not limited to a dog, cat, etc., during operation of the vehicle 10. In various embodiments, the pet restraint system 102 is capable of absorbing energy during an abrupt acceleration or deceleration of the vehicle 10. The cargo carrier restraint system 104 is capable of securing cargo, including, but not limited to luggage, purses, groceries, athletic equipment, animals, etc., during operation of the vehicle 10. In various embodiments, the cargo carrier restraint system 104 is configurable in a first, collapsed state and a second, expanded state for receiving the cargo. In various embodiments, the cargo carrier restraint system 104 includes a hinge lock to secure the cargo carrier restraint system 104 in the second, expanded state. It should be noted that the location of the pet restraint system 102 and the cargo carrier restraint system 104 in FIG. 1 is merely exemplary, as each of the pet restraint system 102 and the cargo carrier restraint system 104 may be positioned at any desired location in which it may be secured within the vehicle 10. Generally, as will be discussed further herein, each of the pet restraint system 102 and the cargo carrier restraint system 104 are secured to one or more occupant restraint systems 20, 22 of the vehicle 10. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 10 generally includes a chassis 12, a body 14, front wheels 16, and rear wheels 18. In certain embodiments, the vehicle 10 may be an autonomous vehicle that is capable of sensing its environment and navigating with little or no user input. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the vehicle 10 includes the one or more occupant restraint systems 20, 22 within an interior cabin 10' of the vehicle 10. Generally, the occupant restraint system 20 is coupled to one or more front seats 24 of the vehicle 10 (when viewed in a forward driving direction D of the vehicle 10); and the occupant restraint system 22 is coupled to one or more rear seats 26. Each of the occupant restraint systems 20, 22 include a seat belt 28, a seat belt buckle receptacle 30 and a seat belt retractor 32. The occupant restraint system 22 also includes one or more lower anchors 34. The seat belt 28, the seat belt buckle receptacle 30 and the lower anchors 34 comprise a coupling member of the occupant restraint system 22, while the seat belt 28 and the seat belt buckle receptacle 30 comprise a coupling member of the occupant restraint system 20.

The seat belt 28 is coupled to the body 14 of the vehicle 10, and is movable relative to the body 14 to engage the seat belt buckle receptacle 30. In one example, the seat belt 28 may be coupled to a spool, which enables a selected amount of the seat belt 28 to be moved relative to the body 14 to engage the seat belt buckle receptacle 30. The seat belt 28 cooperates with the seat belt buckle receptacle 30 to retain an occupant within the respective one of the seats 24, 26. In various embodiments, the seat belt 28 also cooperates with the cargo restraint system 100 to retain the cargo within the respective one of the seats 24, 26. The seat belt 28 generally has a first end coupled to the body 14 at an upper mounting point (e.g. near the roof of the vehicle 10) and a second end coupled to the body 14 at a lower mounting point (e.g. near a floor of the vehicle 10). The seat belt 28 includes a buckle tongue 36, which is coupled to the seat belt 28 between the first end and the second end. The buckle tongue 36 may be coupled to the seat belt buckle receptacle 30 to secure the occupant and/or cargo restraint system 100 to the respective one of the seats 24, 26. In various embodiments, the buckle tongue 36 may be coupled to a portion of the cargo restraint system 100 that includes the seat belt buckle receptacle 30.

The buckle tongue 36 includes a slot, which couples the seat belt 28 to the seat belt buckle receptacle 30 and/or the cargo restraint system 100. The seat belt 28 may be composed of a woven polymeric fabric or a webbing, while the buckle tongue 36 may be composed of a metal or metal alloy.

The seat belt buckle receptacle 30 releasably receives the buckle tongue 36 and in various embodiments, may receive a portion of the cargo restraint system 100 that includes the buckle tongue. The seat belt buckle receptacle 30 generally includes a biased latch that engages with the slot of the buckle tongue 36 to couple the seat belt 28 to the seat belt buckle receptacle 30. A button of the seat belt buckle receptacle 30 is depressible to overcome the force of the spring, and move the latch to release the buckle tongue 36, thereby uncoupling the seat belt 28 from the seat belt buckle receptacle 30.

The seat belt retractor 32 generally provides a constant low tension (approximately 3N) on the seat belt 28 and removes slack that may exist on the seat belt 28 in normal driving operation. The seat belt retractor 32 may lock the seat belt 28 based on a determination of an abrupt deceleration of the vehicle 10 (greater than about 0.4 G). The seat belt retractor 32 includes a spool coupled to the seat belt 28 and a lock. By locking the spool, and thus, the seat belt 28, the seat belt retractor 32 assists in retaining the occupant and/or the cargo restraint system 100 during an abrupt deceleration of the vehicle 10. It should be noted that the location of the seat belt retractor 32 shown herein is merely an example, as the seat belt retractor 32 may be located at any desired location to lock the spool and retain the occupant and/or cargo restraint system 100. Moreover, it should be noted that the cargo restraint system 100, including the pet restraint system 102 and the cargo carrier restraint system 104, may be used with any suitable occupant restraint system associated with a vehicle.

Generally, the one or more lower anchors 34 are rigidly coupled to the vehicle 10, and are positioned between a seat back and a seat bottom of the rear seats 26. Generally, the lower anchors 34 are substantially U-shaped, and are configured to engage one or more child restraints, such as a child seat lower anchor system which allows a child restraint seat to be connected to two of the lower anchors 34 at specific seating positions of one or more of the seats 26 in the vehicle 10. The lower anchors 34 are typically located between a seatback and a seat cushion of the respective one or more of the seats 26. In various embodiments, a portion of the cargo restraint system 100 may also engage the lower anchors 34 to assist in securing the cargo, including pets, to the respective rear seat 26.

With reference to FIG. 1, the vehicle 10 is depicted in the illustrated embodiment as a passenger car, but it should be appreciated that the cargo restraint system 100 may be incorporated into other vehicles including trucks, sport utility vehicles (SUVs), recreational vehicles (RVs), marine vessels, aircraft, etc. As shown, the vehicle 10 generally includes a propulsion system 40, a transmission system 42, a steering system 44, a brake system 46 and a controller 48. The propulsion system 40 may, in various embodiments, include an internal combustion engine, an electric machine such as a traction motor, and/or a fuel cell propulsion system. The transmission system 42 is configured to transmit power from the propulsion system 40 to the wheels 16-18 according to selectable speed ratios. According to various embodiments, the transmission system 42 may include a step-ratio automatic transmission, a continuously-variable transmission, or other appropriate transmission. The brake system 46 is configured to provide braking torque to the wheels 16-18 and/or the transmission system 42. The brake system 46 may, in various embodiments, include friction brakes, brake by wire, a regenerative braking system such as an electric machine, and/or other appropriate braking systems. The steering system 44 influences the course of travel by the vehicle 10, for example by adjusting a position of the wheels 16-18. While depicted as including a steering wheel for illustrative purposes, in some embodiments contemplated within the scope of the present disclosure, the steering system 44 may not include a steering wheel.

The controller 48 includes at least one processor 50 and a computer readable storage device or media 52. The processor 50 can be any custom made or commercially available processor, a central processing unit (CPU), a graphics processing unit (GPU), an auxiliary processor among several processors associated with the controller 48, a semiconductor based microprocessor (in the form of a microchip or chip set), a macroprocessor, any combination thereof, or generally any device for executing instructions. The computer readable storage device or media 52 may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The computer-readable storage device or media 52 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 48 in controlling components of the vehicle 10.

The instructions may include one or more separate programs, each of which comprises an ordered listing of executable instructions for implementing logical functions. The instructions, when executed by the processor 50, receive and process input signals, perform logic, calculations, methods and/or algorithms for controlling the components of the vehicle 10, and generate control signals to components of the vehicle 10 based on the logic, calculations, methods, and/or algorithms. Although only one controller 48 is shown in FIG. 1, embodiments of the vehicle 10 can include any number of controllers 48 that communicate over any suitable communication medium or a combination of communication mediums and that cooperate to process the sensor signals, perform logic, calculations, methods, and/or algorithms, and generate control signals to control features of the vehicle 10.

As discussed above, the cargo restraint system 100, including the pet restraint system 102 and/or the cargo carrier restraint system 104, is coupled to one or more of the occupant restraint systems 20, 22 to assist in securing the pets and/or cargo within the interior cabin 10' of the vehicle 10. By coupling the pet restraint system 102 and/or the cargo carrier restraint system 104 to the occupant restraint systems 20, 22 of the vehicle 10, the pets and/or cargo are further secured during an operation of the vehicle 10 due to the features of the seat belt 28, the seat belt retractor 32 and the lower anchors 34. Moreover, in the example of the pet restraint system 102, an animal secured to the pet restraint system 102 is provided with additional freedom in that the animal may be able to move as far as the spool out of the seat belt 28 the seat belt retractor 32 allows during a normal operation (e.g. not during an abrupt deceleration/acceleration) of the vehicle 10.

Pet Restraint System

Figure 2A:
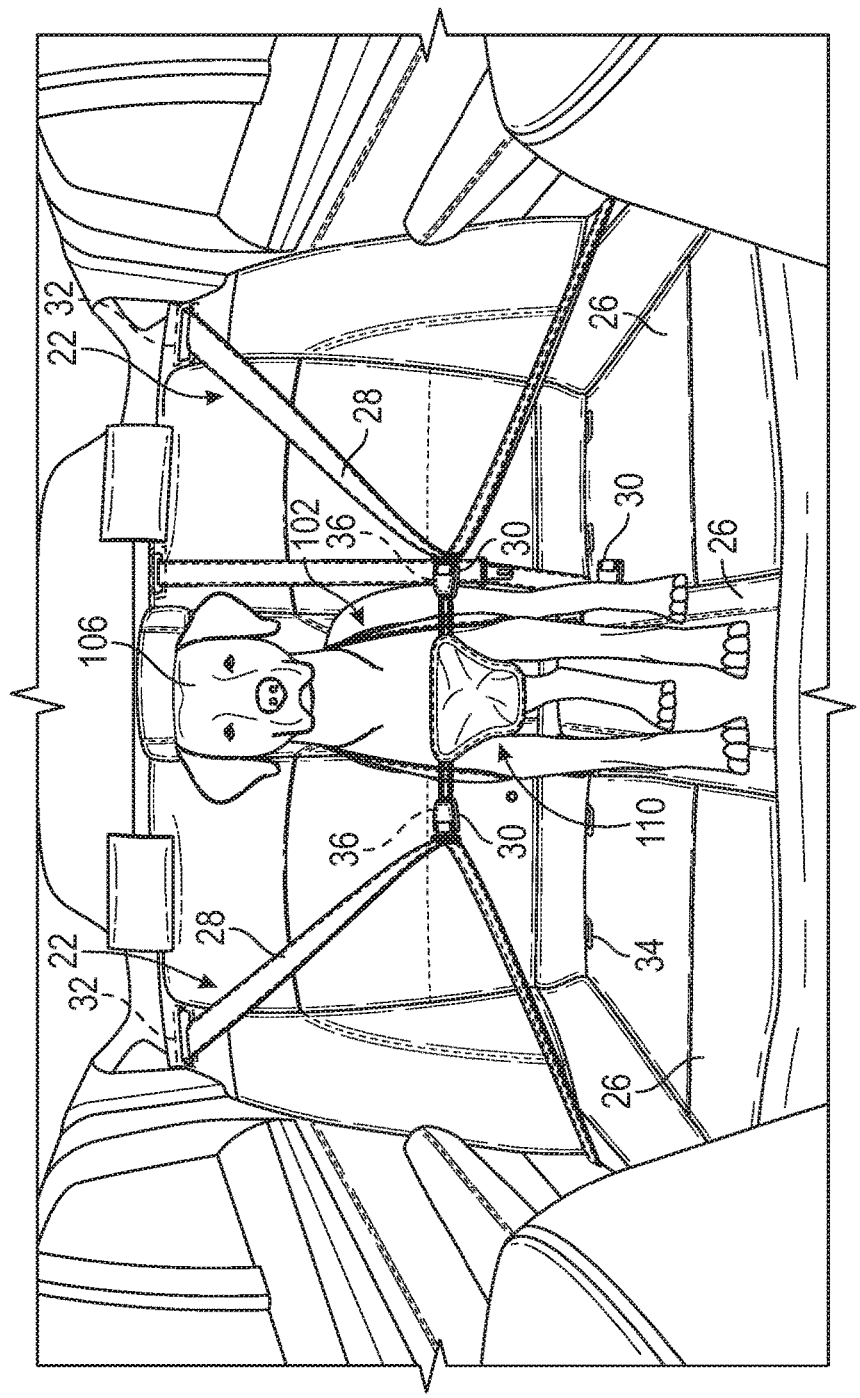
FIG. 2A is a schematic illustration of cargo, such as a pet, restrained by an exemplary pet restraint system of the cargo restraint system of FIG. 1 within an interior of the vehicle of FIG. 1, in accordance with one of various embodiments.

In one example, with reference to FIG. 2A, the pet restraint system 102 is shown coupled to the occupant restraint system 22 of two of the rear seats 26, which are spaced apart from each other by another rear seat 26. As shown, the seat belts 28 are coupled, via the respective buckle tongues 36, to the pet restraint system 102. This enables a pet, such as a dog 106, to move along the rear seats 26 as permitted by the spool out of the seat belts 28, but also secures the dog 106 during an abrupt deceleration/acceleration of the vehicle 10 by the locking of the spool of the seat belt 28 by the respective seat belt retractors 32. In this example, the dog 106 is securely retained on the rear seat 26 with four points of restraint.

Figure 2B:
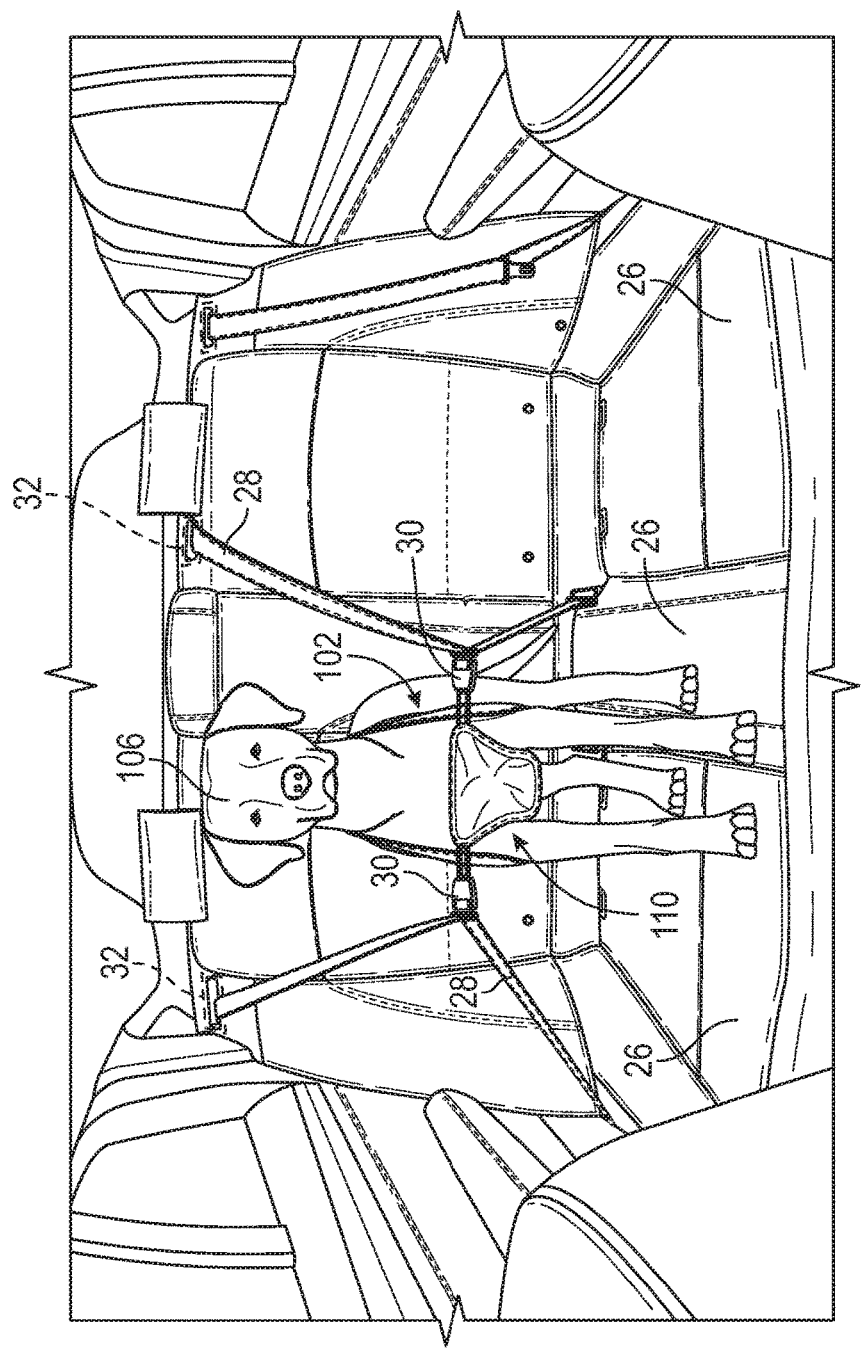
FIG. 2B is a schematic illustration of cargo, such as a pet, restrained by the pet restraint system of FIG. 2A within an interior of the vehicle of FIG. 1 in accordance with one of various embodiments.

In another example, with reference to FIG. 2B, the pet restraint system 102 is shown coupled to the occupant restraint system 22 of two of the rear seats 26, which are adjacent to each other. As shown, the seat belts 28 are coupled, via the respective buckle tongues 36, to the pet restraint system 102. This enables a pet, such as the dog 106, to move along the rear seats 26 as permitted by the spool out of the seat belts 28, but also secures the dog 106 during an unexpected or abrupt deceleration/acceleration of the vehicle 10 via the respective seat belt retractors 32. In this example, the dog 106 is securely retained on the rear seat 26 with four points of restraint.

As a further example, with reference to FIG. 2C, the pet restraint system 102 is shown coupled to the occupant restraint system 22 of a single one of the rear seats 26. As shown, the seat belts 28 are coupled, via the respective buckle tongues 36, to the pet restraint system 102. This enables a pet, such as the dog 106, to move along the rear seats 26 as permitted by the spool out of the seat belts 28, but also secures the dog 106 during an unexpected or abrupt deceleration/acceleration of the vehicle 10 via the respective seat belt retractors 32. In this example, the dog 106 is securely retained on the rear seat 26 with four points of restraint.

Figure 3A:
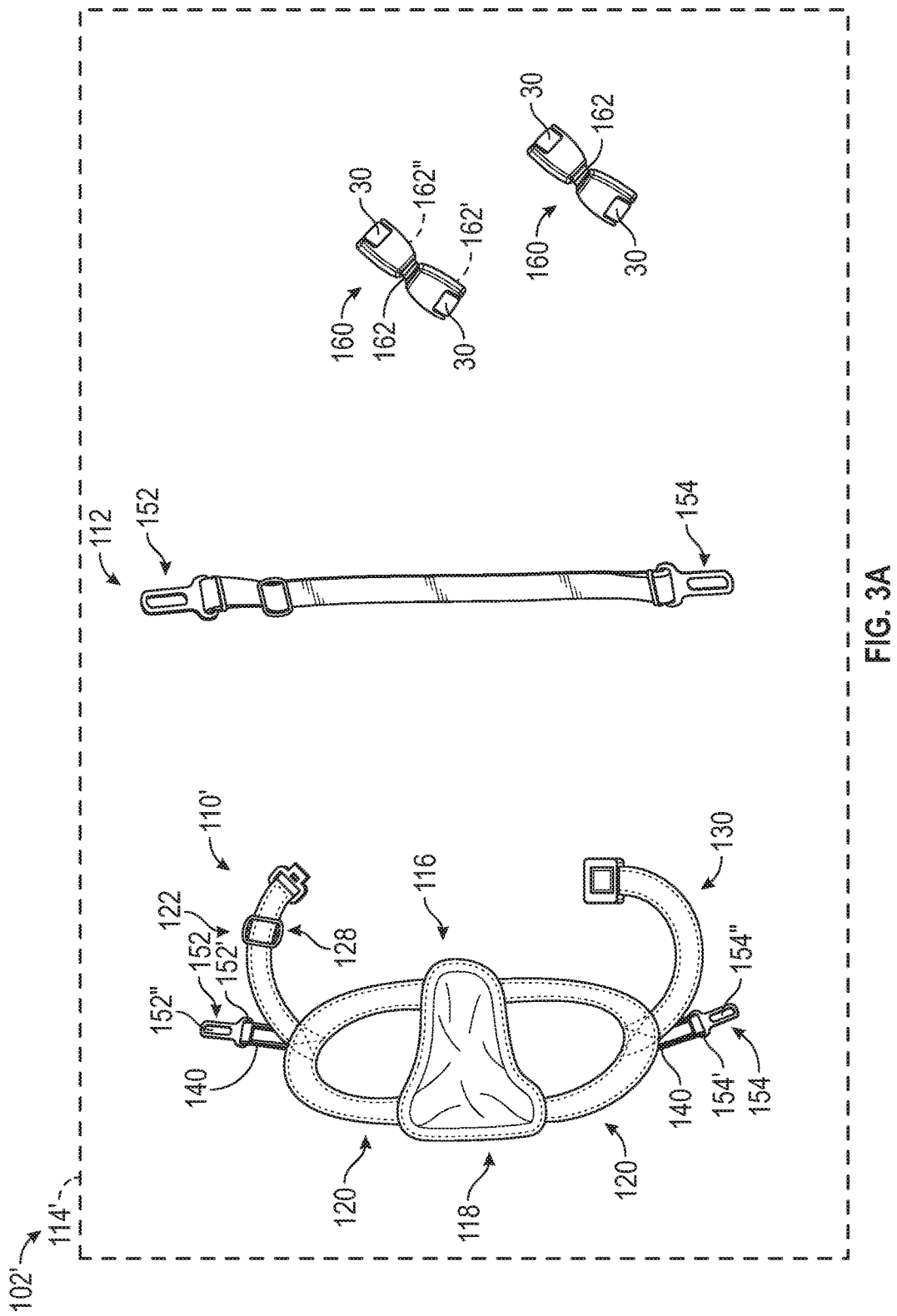
FIG. 3A is an exemplary pet restraint kit that includes an exemplary pet restraint system of the cargo restraint system of FIG. 1 in accordance with various embodiments.

With reference to FIG. 3, the pet restraint system 102 is shown in greater detail. In this embodiment, the pet restraint system 102 includes a harness 110 and a tether 112. The harness 110 and the tether 112 may be packaged together in suitable packaging and available to a consumer as a pet restraint kit 114 for use with the vehicle 10. Generally, the harness 110 is suitable for small (less than 25 kilograms (kg.)) or mid-size pets (25 kg.-50 kg.). The harness 110 includes a body 116 and one or more of the seat belt buckle receptacles 30. In this regard, the harness 110 may include one of more of the seat belt buckle receptacles 30 such that the harness 110 may be employed with, and releasably coupled to, one or more of the buckle tongues 36 associated with a respective one or more of the seat belts 28 of the vehicle 10 (as shown in FIG. 2). The harness 110 is generally composed of a woven polymeric material; however, a natural fiber, leather or other material may be employed. An arrow 8 points in a direction of a front of the harness 110.

The body 116 of the harness 110 includes a pad 118, a pair of leg straps 120 and a back strap 122. The pad 118 includes a first end 124 and a second end 126. The pad 118 may also define a receptacle between the first end 124 and the second end 126, which is enclosed to receive padding or energy absorbing materials. The pad 118 is generally sized and shaped to fit between adjacent shoulders of the pet, such as the dog 106 (FIG. 2A), and to distribute a load imparted to the pet between the shoulders of the pet. The leg straps 120 are coupled to the pad 118 to define substantially C-shaped openings for receipt of a portion of the pet, such as the forearms of the dog 106. An end 120' of each of the leg straps 120 is coupled to the first end 124 of the pad 118, and an end 120" of each of the leg straps 120 is coupled to the second end 126. In one example, the leg straps 120 are sewn to the pad 118 to couple the leg straps 120 to the pad 118.

The back strap 122 couples the harness 110 to the pet, such as the dog 106. The back strap 122 includes a first back strap 128, a second back strap 130 and a buckle 132 for releasably coupling the first back strap 128 to the second back strap 130, and thus, the harness 110 to the pet. The first back strap 128 and the second back strap 130 each include an end 128', 130', which is coupled to a respective one of the leg straps 120. In one example, the ends 128', 130' are each sewn to the respective one of the leg straps 120. The first back strap 128 includes a second end 128", which is looped to provide extra material and coupled to a slider 134. The looping of the second end 128" to the slider 134 enables the first back strap 128 to be adjustable in length, for fitting over differently shaped pets, for example. It should be noted that while various portions of the pet restraint system 102 described herein refer to a slider, such the slider 134 for adjusting a length of a strap, other devices may be used to provide adjustability to a strap length, such as one or more D-rings, etc.

The buckle 132 includes a male end 136 and a female end 138. In one example, the male end 136 is coupled to the first back strap 128, and the female end 138 is coupled to the second back strap 130. The male end 136 is receivable within the female end 138 to couple the first back strap 128 to the second back strap 130. The female end 138 includes a latch, which may be biased by a button, for example, to release the male end 136 from the female end 138, thereby uncoupling the harness 110 from the pet.

In addition, the harness 110 includes one or more connecting straps 140. In this example, the harness 110 includes two connecting straps 140 coupled the leg straps 120 at the intersection of the respective ends 128', 130' and the respective leg straps 120. The connecting straps 140 may be composed of a leather or a polymeric material. In one example, the connecting straps 140 are sewn to the harness 110 to couple the connecting straps 140 to the harness 110. Generally, the connecting straps 140 receive a respective one of the seat belt buckle receptacles 30 to couple the respective seat belt buckle receptacle 30 to the harness 110.

Figure 5:
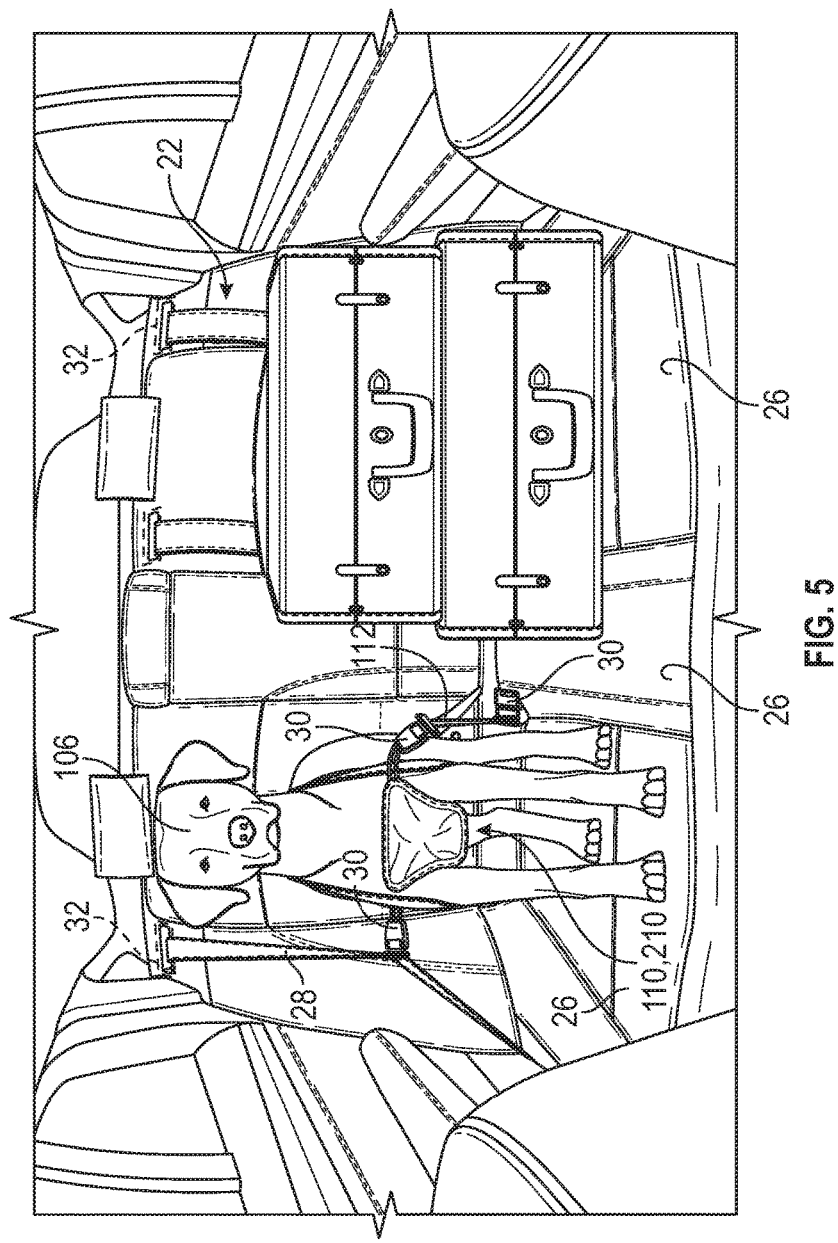
FIG. 5 is a schematic illustration of cargo, such as a pet, restrained by the pet restraint system of FIG. 3 within an interior of the vehicle of FIG. 1 in accordance with one of various embodiments.

The tether 112 may be used with the harness 110 in instances wherein an additional tether is needed to connect the harness 110 to the seat belt buckle receptacle 30 coupled to the occupant restraint system 22, as shown in FIG. 5. In this example, with reference to FIG. 3, the tether 112 includes a strap 150, a first tongue 152 and a second tongue 154. The strap 150 may be composed of a woven polymeric material for example, and alternatively, may be composed of a natural fiber, a leather, etc. The strap 150 includes a loop of extra material and the slider 134 such that a length of the strap 150 is adjustable in a longitudinal direction of the strap 150. The strap 150 includes a first end 156, and an opposite, second end 158. The first tongue 152 is coupled to the first end 156; and the second tongue 154 is coupled to the second end 158. In one example, the first tongue 152 is retained within the loop of extra material, and the second end 158 is looped around a bracket 154' of the second tongue 154 and coupled to itself to retain the second tongue 154. For example, the second end 158 may be sewn together to retain the second tongue 154.

The first tongue 152 and the second tongue 154 each include a respective bracket 152', 154', which receives a portion of the strap 150 at the first end 156 and the second end 158, respectively, to couple the first tongue 152 and the second tongue 154 to the strap 150. The first tongue 152 and the second tongue 154 may be composed of a metal, metal alloy or polymeric material, and may be cast, stamped, printed, etc. The first tongue 152 and the second tongue 154 each include a respective tongue 152", 154", which engages with a respective one of the seat belt buckle receptacles 30, such as the seat belt receptacles coupled to the harness 110 and/or the seat belt buckle receptacles 30 coupled to the occupant restraint systems 20, 22 (FIG. 5). Thus, the tether 112 may be used to configure the pet restraint system 102 in a variety of ways for coupling the pet within the interior cabin 10' of the vehicle 10.

With reference to FIG. 4, another exemplary pet restraint system 202 is shown. As the pet restraint system 202 is similar to the pet restraint system 102 described with regard to FIGS. 1-3, the same reference numerals will be used to denote the same features. The pet restraint system 202 includes a harness 210 and the tether 112. The harness 210 and the tether 112 may be packaged together in suitable packaging and available to a consumer as a pet restraint kit 214 for use with the vehicle 10. Generally, the harness 210 is suitable for mid-size (25 kg.-50 kg.) to large pets (50 kg. and above). The harness 210 includes a body 216 and one or more of the seat belt buckle receptacles 30. In this regard, the harness 210 may include one of more of the seat belt buckle receptacle 30 such that the harness 210 may be employed with, and releasably coupled to, one or more of the buckle tongues 36 associated with a respective one or more of the seat belts 28 of the vehicle 10 (as shown in FIG. 2). The harness 210 is generally composed of a woven polymeric material; however, a natural fiber, leather or other material may be employed. An arrow 8 points in a direction of a front of the harness 210.

The body 216 of the harness 210 includes a pad 218, a pair of leg straps 220, a back strap 222 and a secondary strap 260. The pad 218 includes a first end 224 and a second end 226. Generally, the pad 218 is longer than the pad 118 to accommodate the larger sized pet. The pad 218 may also define a receptacle between the first end 224 and the second end 226, which is enclosed to receive padding or energy absorbing materials. The pad 218 is generally sized and shaped to fit between adjacent shoulders of the pet, such as the dog 106 (FIG. 2A), and to distribute a load imparted to the pet between the shoulders of the pet. The leg straps 220 are coupled to the pad 218 to define substantially C-shaped openings for receipt of a portion of the pet, such as the forearms of the dog 106. An end 220' of each of the leg straps 220 is coupled to side 218' of the pad 218 between the first end 224 and the second end 226; and an end 220" of each of the leg straps 220 is coupled to the second end 226. In one example, the leg straps 220 are sewn to the pad 218 to couple the leg straps 220 to the pad 218.

The back strap 222 couples the harness 210 to the pet, such as the dog 106. The back strap 222 includes a first back strap 228, a second back strap 230 and the buckle 132 for releasably coupling the first back strap 228 to the second back strap 230, and thus, the harness 210 to the pet. The first back strap 228 and the second back strap 230 each include an end 228', 230', which is coupled to the first end 224 of the pad 218. In one example, the ends 228', 230' are each sewn to a respective side 218' of the pad 218 at the first end 224. The first back strap 228 includes a second end 228", which is looped to provide extra material and coupled to the slider 134. The looping of the second end 228" to the slider 134 enables the first back strap 228 to be adjustable in length, for fitting over differently shaped pets, for example.

The secondary strap 260 also couples the harness 210 to the pet, such as the dog 106. The secondary strap 260 includes a first strap 262, a second strap 264 and the buckle 132 for releasably coupling the first strap 262 to the second strap 264, and thus, the harness 210 to the pet. The first strap 262 and the second strap 264 each include an end 262', 264', which is coupled to a respective one of the leg straps 120. In one example, the ends 262', 264' are each sewn to the respective one of the leg straps 120. The first strap 262 includes a second end 262", which is looped to provide extra material and coupled to the slider 134. The looping of the second end 262" to the slider 134 enables the first back strap 228 to be adjustable in length, for fitting over differently shaped pets, for example.

The harness 210 also includes one or more interconnecting straps 266, which provide additional structural integrity to the harness 210 and also assist in load distribution. In this example, the harness 210 includes two interconnecting straps 266', 266". The interconnecting strap 266' interconnects the first back strap 228 and the first strap 262. The interconnecting strap 266" interconnects the second back strap 230 and the second strap 264. The interconnecting straps 266', 266" may be coupled to the respective ones of the first back strap 228, the first strap 262, the second back strap 230 and the second strap 264, via sewing, for example.

In addition, the harness 210 includes the one or more connecting straps 140. In this example, the harness 210 includes two connecting straps 140. One of the connecting straps 140 is coupled to the first back strap 228 at an intersection of the first back strap 228 and the interconnecting strap 266'. The other of the connecting straps 140 is coupled to the second back strap 230 at an intersection of the second back strap 230 and the interconnecting strap 266". In one example, the connecting straps 140 are sewn to the harness 210 to couple the connecting straps 140 to the harness 210. The connecting straps 140 receive a respective one of the seat belt buckle receptacles 30 to couple the respective seat belt buckle receptacle 30 to the harness 210.

In order to use the pet restraint systems 102, 202 for a pet, such as the dog 106, the harness 110, 210 is assembled, with the leg straps 120, 220 sewn to the pad 118, 218, for example. With regard to the harness 110, the first back strap 128, with the male end 136 of the buckle 132 attached is sewn to one of the leg straps 120, and the second back strap 130, with the female end 138 of the buckle 132 attached is sewn to the other one of the leg straps 120. One of the seat belt buckle receptacles 30 is positioned onto one of the connecting straps 140, and the connecting strap 140, with the seat belt buckle receptacle 30, is sewn to a respective one of the leg straps 120 at the intersection with the first back strap 128. Another one of the seat belt buckle receptacles 30 is positioned onto one of the connecting straps 140, and the connecting strap 140, with the seat belt buckle receptacle 30, is sewn to a respective one of the leg straps 120 at the intersection with the second back strap 130.

With regard to the harness 210, the first back strap 228, with the male end 136 of the buckle 132 attached is sewn to the first end 224 of the pad 218, and the second back strap 230, with the female end 138 of the buckle 132 attached is coupled to the other side 218' of the pad 218 at the first end 224. The first strap 262, with the male end 136 of the buckle 132 attached is coupled to one of the leg straps 120, and the second strap 264, with the female end 138 of the buckle 132 attached is coupled to the other one of the leg straps 120. The interconnecting strap 266' is coupled, via sewing for example, to the leg strap 120 and the first back strap 228, and the interconnecting strap 266" is coupled to the other leg strap 120 and the second back strap 230. One of the seat belt buckle receptacles 30 is positioned onto one of the connecting straps 140, and the connecting strap 140, with the seat belt buckle receptacle 30, is coupled to the first back strap 228 at the intersection with the interconnecting strap 266'. Another one of the seat belt buckle receptacles 30 is positioned onto one of the connecting straps 140, and the connecting strap 140, with the seat belt buckle receptacle 30, is coupled to the second back strap 230 at the intersection with the interconnecting strap 266".

With the strap 150 formed, the tether 112 is assembled by positioning the first tongue 152 onto the first end 156 of the strap 150. The slider 134 may be threaded onto the strap 150 to retain the first tongue 152. The second tongue 154 may be coupled to the second end 158 of the strap 150, by sewing the second end 158 of the strap 150 onto itself.

The assembled harness 110, 210 and tether 112 may be packaged together and sold as the pet restraint kits 114, 214, respectively, for restraining a pet, such as the dog 106 within the interior cabin 10' of the vehicle 10. As discussed with regard to FIGS. 2A-2C, the harness 110, 210 may be employed with the occupant restraint system 22 of one or more of the rear seats 26 to securely couple the pet to the rear seats 26 and to retain the pet during an unexpected or abrupt acceleration and/or deceleration of the vehicle 10. Moreover, with reference to FIG. 5, the tether 112 may be used with either the harness 110, 210 to secure the pet to one or more of the rear seats 26. In this example, one of the seat belt buckle receptacles 30 of the harness 110, 210 is coupled to the buckle tongue 36 of the seat belt 28, and the other seat belt buckle receptacle 30 is coupled to the first tongue 152 of the tether 112. The second tongue 154 of the tether 112 is coupled to the seat belt buckle receptacle 30 of the rear seat 26. This enables the pet, such as the dog 106, to be securely retained on the rear seat 26 with three points of restraint.

It should be noted that in various embodiments, the pet restraint kits 114, 214 may be configured differently. In this regard, one or more of the harnesses 110, 210 may include the first tongue 152 and the second tongue 154 instead of the seat belt buckle receptacles 30. In this example, with reference to FIG. 3A, a pet restraint system 102' is shown for use with a pet restraint kit 114'. As the pet restraint system 102' is similar to the pet restraint system 102 described with regard to FIG. 3, the same reference numerals will be used to denote the same features. The pet restraint system 102' includes a harness 110' and one or more interconnected seat belt buckle receptacles 160. The harness 110' includes the body 116, the first tongue 152 and the second tongue 154.

The first tongue 152 and the second tongue 154 are coupled to a respective one of the connecting straps 140. Generally, the connecting straps 140 are received through the brackets 152', 154' of the first tongue 152 and the second tongue 154 to couple the respective first tongue 152 and the second tongue 154 to the harness 110'.

The interconnected seat belt buckle receptacles 160 each include two seat belt buckle receptacles 30 that are coupled together via a strap 162. Generally, the strap 162 is composed of a polymeric material, such as a woven polymeric material; however, other materials may be employed, such as natural fibers, leather, etc. The strap 162 includes a first end 162' and a second end 162". The first end 162' is received through the slot of a first one of the seat belt buckle receptacles 30 and retains the seat belt buckle receptacle 30. In one example, the first end 162' is coupled to itself, via sewing, to retain the seat belt buckle receptacle 30. The second end 162" is received through the slot of the second one of the seat belt buckle receptacle 30 and retains the seat belt buckle receptacle 30. In one example, the second end 162" is coupled to itself, via sewing, to retain the seat belt buckle receptacle 30.

As the installation and use of the pet restraint system 102' is substantially the same as the installation and use of the pet restraint system 102, the installation and use of the pet restraint system 102' will not be discussed in great detail herein. Briefly, the first tongue 152 and the second tongue 154 may be coupled to the harness 110' via the connecting rings 140. The interconnected seat belt buckle receptacles 160 may be assembled by coupling the first end 162' of the strap 162 to one of the seat belt buckle receptacles 30 and coupling the second end 162" of the strap 162 to the other of the seat belt buckle receptacles 30. One of the seat belt buckle receptacles 30 of the interconnected seat belt buckle receptacles 160 may be coupled to the first tongue 152, and the other one of the seat belt buckle receptacles 30 may be coupled to the buckle tongue 36 of the seat belt 28. The other one of the interconnected seat belt buckle receptacles 160 may be coupled to the second tongue 154 and to the buckle tongue 36 of another the seat belt 28 to restrain the pet within the interior 10' of the vehicle 10. In this example, the pet is restrained with four points of restraint. Alternatively, the tether 112 may be one of the seat belt buckle receptacles 30 and used to restrain the pet within the vehicle 10.

Figure 6:
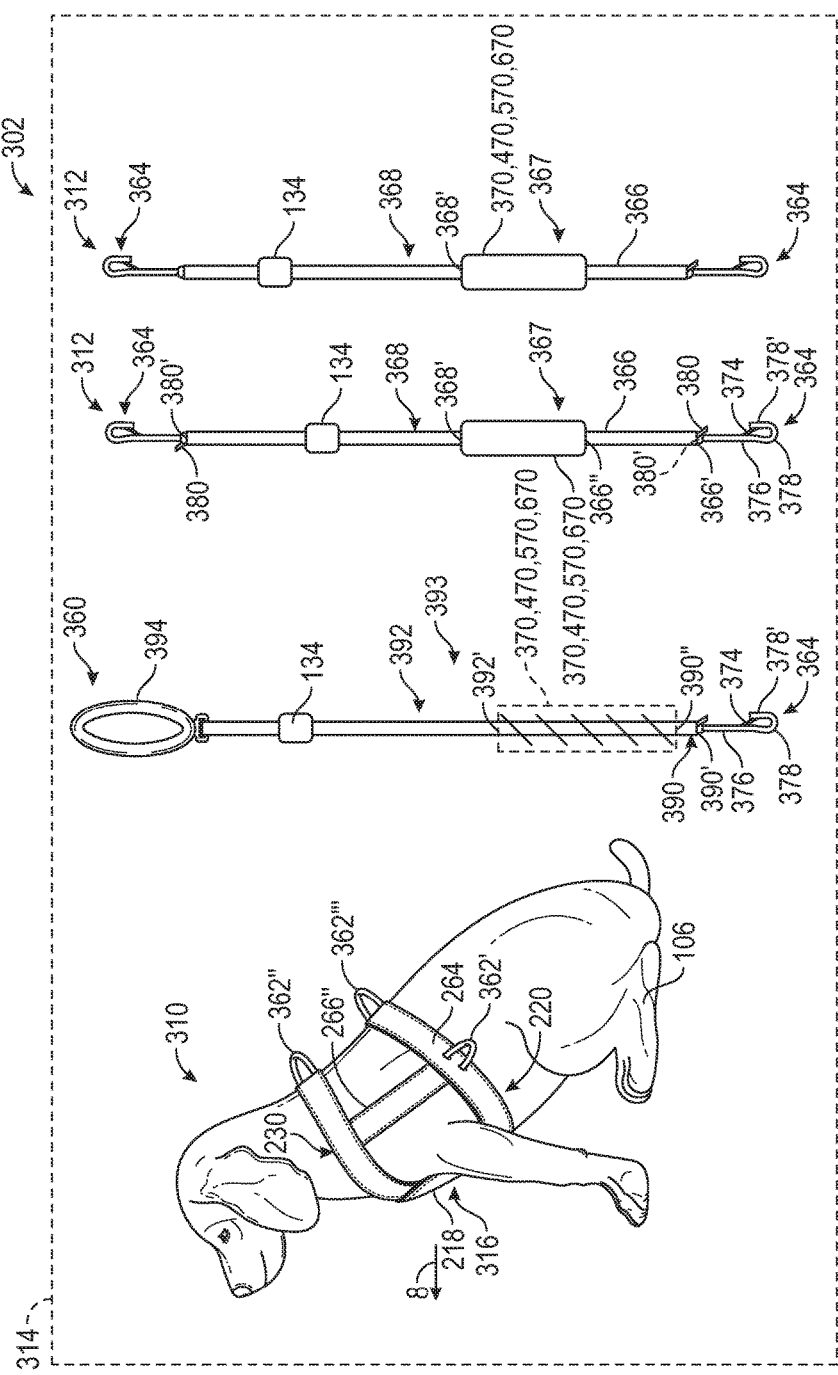
FIG. 6 is an exemplary pet restraint kit that includes an exemplary pet restraint system of the cargo restraint system of FIG. 1 in accordance with various embodiments.

With reference to FIG. 6, another exemplary pet restraint system 302 is shown. As the pet restraint system 302 is similar to the pet restraint system 102 and the pet restraint system 202 described with regard to FIGS. 1-5, the same reference numerals will be used to denote the same features. The pet restraint system 302 includes a harness 310, one or more energy absorbing tethers 312 and an energy absorbing handled tether 360. The harness 310, the one or more energy absorbing tethers 312 and the energy absorbing handled tether 360 may be packaged together in suitable packaging and available to a consumer as a pet restraint kit 314 for use with the vehicle 10. It should be understood, however, that the energy absorbing handled tether 360 may be optional such that the pet restraint system 302 includes the one or more energy absorbing tethers 312. Generally, the harness 310 is suitable for mid-size (25 kg.-50 kg.) to large pets (50 kg. and above). It should be understood, however, that the pet restraint system 302 may also include a harness that is suitable for small to mid-size pets, such as a harness similar to the harness 110 of the pet restraint system 102. The harness 310 includes a body 316 and one or more connecting rings 362. It should be noted that the placement of the connecting rings 362 is merely exemplary, as the connecting rings 362 may be coupled to the harness 310 at any desired location and the harness 310 may include additional connecting rings 362 than those shown. As will be discussed, the connecting rings 362 enable one or more of the energy absorbing tethers 312 and energy absorbing handled tether 360 to be coupled to the harness 310.

The harness 310 is generally composed of a woven polymeric material; however, leather, natural fibers or other material may be employed. An arrow 8 points in a direction of a front of the harness 310. The body 316 of the harness 310 includes the pad 218, the pair of leg straps 220, the back strap 222 and the secondary strap 260. In this example, the harness 310 includes three connecting rings 362', 362", 362'". The connecting ring 362' is coupled to one of the leg straps 220 at the intersection of the leg strap 220 and the interconnecting strap 266". Although not shown in this view, another connecting ring 362 is coupled to the harness 310 so as to be substantially opposite the connecting ring 362' when the harness 310 is coupled to the pet. The connecting ring 362" is coupled to the second back strap 230 adjacent to or near the buckle 132. The connecting ring 362'" is coupled to the second strap 264 adjacent to or near the buckle 132. It should be noted that while the connecting rings 362', 362", 362'" are illustrated herein as having a substantially C shape, the connecting rings 362', 362", 362'" may have any shape that may be securely latched by the spring hook clip 364.

In one example, the connecting rings 362', 362", 362'" are sewn to the harness 310 to couple the connecting rings 362', 362", 362'" to the harness 310. The connecting rings 362', 362", 362'" receive a first connector or a spring hook clip 364 of the energy absorbing tethers 312 and/or the energy absorbing handled tether 360 to couple the energy absorbing tethers 312 and/or the energy absorbing handled tether 360 to the harness 310.

In this example, the pet restraint kit 314 includes two energy absorbing tethers 312. It should be understood that the pet restraint kit 314 may include any number of energy absorbing tethers 312. Each of the energy absorbing tethers 312 include the spring hook clip 364, a first strap portion 366, a second strap portion 368 and an energy absorbing element 370. The first strap portion 366 and the second strap portion 368 are part of a single strap 367. The spring hook clip 364 includes a substantially rigid hook member 372 and a resilient portion 374. The hook member 372 includes a body 376 that defines a U-shaped hook portion 378. The body 376 is substantially planar, and the hook portion 378 curves outwardly from a distal end of the body 376. The hook portion 378 is sized and shaped to retain one of the connecting rings 362', 362", 362'", and is also sized and shaped to retain a portion of the lower anchors 34. The hook member 372 may be composed of a metal or metal alloy, and may be cast, forged, stamped, etc. The resilient portion 374 is coupled at one end to the body 376 and extends outwardly from the body 376 at an angle to contact a tip 378' of the hook portion 378. The resilient portion 374 is coupled to the body 376 such that the resilient portion 374 is biased in a direction against the tip 378'. The biasing of the resilient portion 374 against the tip 378' secures the hook member 372 on the connecting rings 362', 362", 362'" and the lower anchors 34. In order to release the spring hook clip 364 from the respective one of the connecting rings 362', 362", 362'" or the lower anchors 34, a force is applied to the resilient portion 374 to move the resilient portion 374 toward the body 376. In this example, the energy absorbing tethers 312 are shown with two spring hook clips 364, one spring hook clip 364 at either end, however, it should be understood that the energy absorbing tethers 312 may include only a single spring hook clip 364 at one end and may include the seat belt buckle receptacle 30, for example, on the other end. Thus, in this example, the energy absorbing tethers 312 include the first connector at a first end and a second connector at an opposite, second end. The spring hook clips 364 each generally include a flange 380 that defines a slot 380' for coupling the spring hook clip 364 to the energy absorbing tethers 312 and/or the energy absorbing handled tether 360.

The first strap portion 366 and the second strap portion 368 may be composed of a polymeric material, such as a woven polymeric material, and may be composed of another suitable material, such as leather, natural fiber, etc. The first strap portion 366 is coupled to a first one of the spring hook clips 364 at a first end 366'. The first strap portion 366 is received through the slot of the flange of the spring hook clip 364 and coupled to itself, via sewing, rivets, etc., to secure the spring hook clip 364 on the first strap portion 366. A second end 366" of the first strap portion 366 is coupled to the energy absorbing element 370.

The second strap portion 368 generally comprises a loop of material, such as the woven polymeric material, and includes the slider 134, which enables a length of the second strap portion 368 to be adjustable. The second strap portion 368 is coupled to one of the spring hook clips 364. Generally, the second strap portion 368 is coupled to the spring hook clip 364 by threading the second strap portion 368 through the slot 380' on the flange 380 prior to coupling the slider 134 to the second strap portion 368 such that the slider 134 also retains the spring hook clip 364. An end 368' of the second strap portion 368 is coupled to the energy absorbing element 370.

Figure 7:
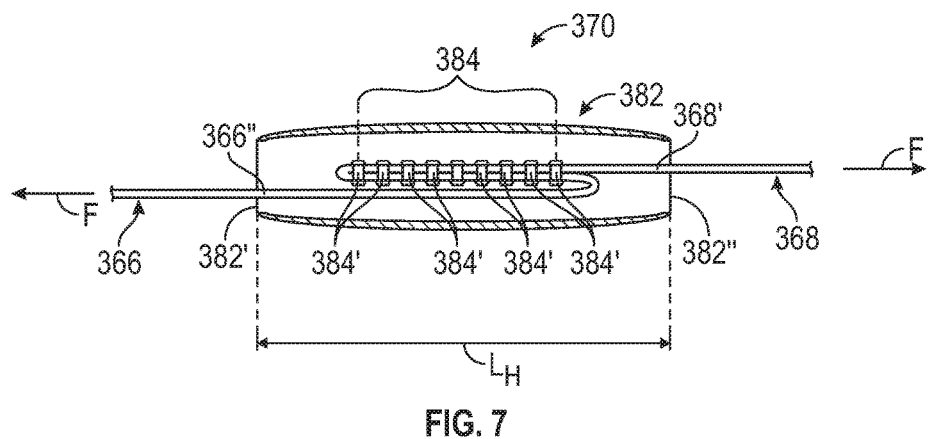
FIG. 7 is a detail view of an energy absorbing element for use with the pet restraint system of FIG. 6 in accordance with one of various embodiments.

With reference to FIG. 7, the energy absorbing element 370 is shown in greater detail. In one example, the energy absorbing element 370 includes a housing 382 and at least one energy absorbing member 384. The housing 382 may be composed of a polymeric material, such as a woven polymeric material, and may be composed of another suitable material, such as leather, natural fiber, rubber, plastic, etc. The housing 382 substantially surrounds at least a portion of the energy absorbing element 370 to protect the energy absorbing element 370 from the environment. In this example, the housing 382 is substantially planar, and is comprised of a woven fiber, such as a woven polymeric fiber, a woven natural fiber, a woven synthetic fiber, etc. The housing 382 has a first end 382' and an opposite, second end 382''. Generally, a first portion of the energy absorbing tether 312 is coupled to the first end 382' and a second portion of the energy absorbing tether 312 is coupled to the second end 382''. In this example, the first strap portion 366 is coupled the first end 382' and the second strap portion 368 is coupled to the second end 382''. As the first strap portion 366 and the second strap portion 368 are a single strap, in this example, the second end 366'' of the first strap portion 366 is joined to the end 368' of the of the second strap portion 368 within the housing 382. In this example, the second end 366'' of the first strap portion 366 is positioned adjacent to the end 368' of the second strap portion 368 and coupled together by the energy absorbing member 384.

The energy absorbing member 384 includes a plurality of rivets 384'. Generally, each of the rivets 384' are composed of a metal, metal alloy or plastic and comprise split rivets, which pierce into the first strap portion 366 and the second strap portion 368 to fasten the first strap portion 366 and the second strap portion 368 together and are fixedly retained within the housing 382 until a predefined force is reached. In this example, the energy absorbing member 384 include 9 rivets 384', however, the energy absorbing element 370 may include any number of rivets 384' depending upon the desired amount of force to be limited and energy to be absorbed by the energy absorbing element 370. In addition, although the rivets 384' are illustrated herein as being arranged in a line, the rivets 384' may be arranged in a pattern to provide a desired amount of energy absorption. Each of the rivets 384' is fixedly secured about both the second end 366'' of the first strap portion 366 and the end 368' of the second strap portion 368. When one of the first strap portion 366 and the second strap portion 368 has a tension force F applied, the intensity of which exceeds a predetermined threshold, such as about 2 kilonewtons (kN), a first one of the rivets 384' will break off the housing 382. As the tension force maintains, the rivets 384' will break off of the housing 382 sequentially, in a direction from the second end 382'' of the housing 382 toward the first end 382'. The breaking off of each of the plurality of rivets 384' aids in limiting the applied tension force F to a predetermined threshold, such as about 2 kilonewtons (kN), and in instances of unexpected acceleration/deceleration experienced by a pet within the harness 310 attached to the energy absorbing tethers 312 and/or energy absorbing handled tether 360, the energy absorbing element 370 absorbs the kinetic energy of the pet and reduces the force acting on the pet.

Figure 8:
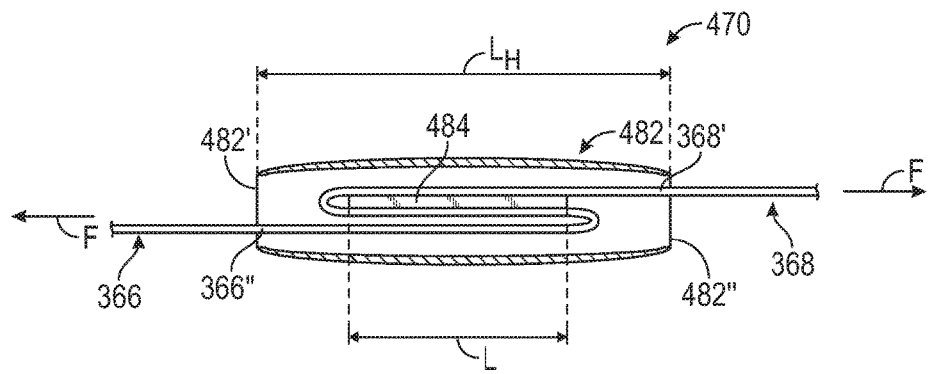
FIG. 8 is a detail view of an energy absorbing element for use with the pet restraint system of FIG. 6 in accordance with one of various embodiments.

In various embodiments, with reference to FIG. 8, another energy absorbing element 470 is shown in greater detail. As the energy absorbing element 470 is similar to the energy absorbing element 370 described with regard to FIG. 7, the same reference numerals will be used to denote the same features. In this example, the energy absorbing element 470 includes a housing 482 and at least one energy absorbing member 484. In this example, the energy absorbing member 484 is an adhesive element. In this example, the housing 482 is substantially planar, and is comprised of a soft material, such as a soft rubber, a woven fabric with a pad, etc. The housing 482 substantially surrounds at least a portion of the energy absorbing element 470 to protect the energy absorbing element 470 from the environment. The housing 482 has a first end 482' and an opposite, second end 482''. Generally, a first portion of the energy absorbing tether 312 is coupled to the first end 482' and a second portion of the energy absorbing tether 312 is coupled to the second end 482''. In this example, the first strap portion 366 is coupled the first end 482' and the second strap portion 368 is coupled to the second end 482''. One or both of the first end 482' and the second end 482'' may include an elastomeric material, such as a rubber, to assist in aligning the first strap portion 366 and the second strap portion 368 within the housing 482. As the first strap portion 366 and the second strap portion 368 are a single strap, in this example, the second end 366'' of the first strap portion 366 is joined to the end 368' of the of the second strap portion 368 within the housing 482. In this example, the second end 366'' of the first strap portion 366 is positioned adjacent to the end 368' of the second strap portion 368 and coupled together by the energy absorbing member 484.

The energy absorbing member 484 is composed of a suitable adhesive, such as industry grade adhesive with elastic moduli between about 0.03 gigapascals (GPa) and about 1.55 GPa. Generally, the energy absorbing member 484 is applied between the second end 366'' of the first strap portion 366 and the end 368' of the of the second strap portion 368 within the housing 482. In certain instances, the energy absorbing member 484 overcoats the second end 366'' of the first strap portion 366 and the end 368' of the of the second strap portion 368, and in other instances, the energy absorbing member 484 is disposed in-between the second end 366'' of the first strap portion 366 and the end 368' of the of the second strap portion 368 along a length L of each of the end 368' and the second end 366''. Generally, the energy absorbing member 484 is fixedly secured to both the second end 366'' of the first strap portion 366 and the end 368' of the second strap portion 368. When one of the first strap portion 366 and the second strap portion 368 has a tension force F applied, the intensity of which exceeds a predetermined threshold, such as about 2 kilonewtons (kN), the energy absorbing member 484 will start to peel off the housing 482. As the force maintains, the energy absorbing member 484 will peel off of the housing 482 in a direction from the second end 482'' of the housing 482 toward the first end 482'. The peeling off of the energy absorbing member 484 aids in limiting the applied tension force F to a predetermined threshold, such as about 2 kilonewtons (kN), and in instances of unexpected acceleration/deceleration experienced by a pet within the harness 310 attached to the energy absorbing tethers 312 and/or energy absorbing handled tether 360, the energy absorbing element 470 absorbs the kinetic energy of the pet and reduces the force acting on the pet.

Figure 9:
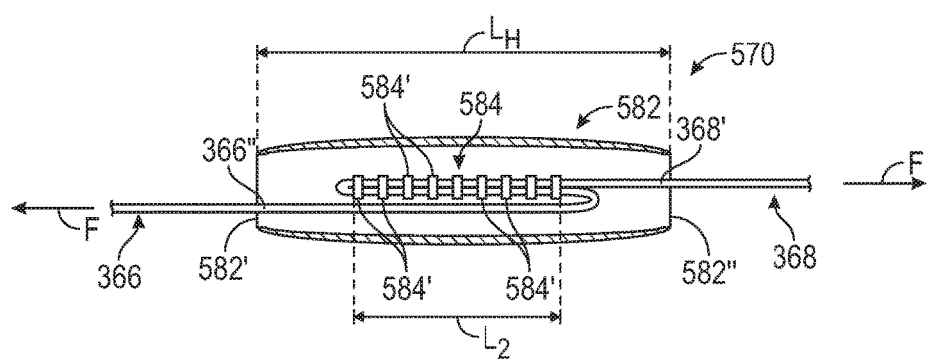
FIG. 9 is a detail view of an energy absorbing element for use with the pet restraint system of FIG. 6 in accordance with one of various embodiments.

In various embodiments, with reference to FIG. 9, another energy absorbing element 570 is shown in greater detail. As the energy absorbing element 570 is similar to the energy absorbing element 370 described with regard to FIG. 7 and the energy absorbing element 470 described with regard to FIG. 8, the same reference numerals will be used to denote the same features. In this example, the energy absorbing element 570 includes a housing 582 and at least one energy absorbing member 584. In this example, the housing 582 is substantially planar, and is comprised of a woven fiber, such as a woven polymeric fiber, a woven natural fiber, a woven synthetic fiber, etc. The housing 582 substantially surrounds at least a portion of the energy absorbing element 570 to protect the energy absorbing element 570 from the environment. The housing 582 has a first end 582' and an opposite, second end 582". Generally, a first portion of the energy absorbing tether 312 is coupled to the first end 582' and a second portion of the energy absorbing tether 312 is coupled to the second end 582". In this example, the first strap portion 366 is coupled the first end 582' and the second strap portion 368 is coupled to the second end 582". One or both of the first end 582' and the second end 582" may include an elastomeric material, such as a rubber, to assist in aligning the first strap portion 366 and the second strap portion 368 within the housing 582. As the first strap portion 366 and the second strap portion 368 are a single strap, in this example, the second end 566" of the first strap portion 366 is joined to the end 568' of the of the second strap portion 368 within the housing 582. In this example, the second end 566" of the first strap portion 366 is positioned adjacent to the end 568' of the second strap portion 368 and coupled together by the energy absorbing member 584.

Figure 9A:
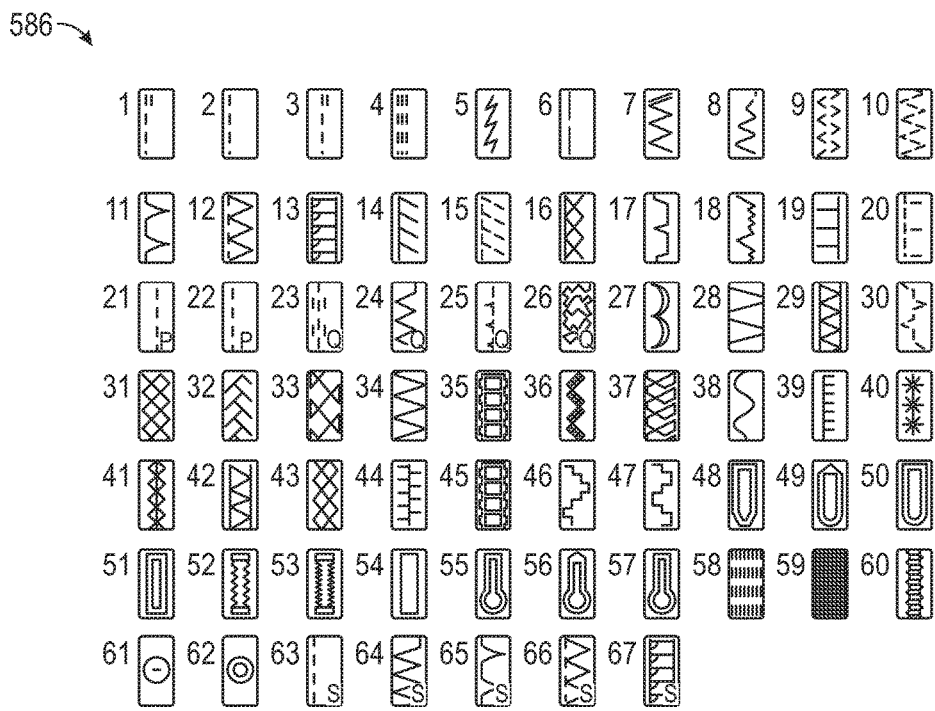
FIG. 9A provides a legend of exemplary patterns for a plurality of stitches associated with the energy absorbing element of FIG. 9 in accordance with various embodiments.

The energy absorbing member 584 includes a plurality of stitches 584'. Generally, each of the stitches 584' are made from thread, which is composed of a polymeric material, natural material (e.g. cotton), etc. In this example, the energy absorbing member 584 includes 9 stitches 584', which may be composed from a single piece of thread or from multiple pieces of thread. The stitches 584' may be continuously formed along a length L2 of the housing 582 or may be discretely formed and spaced apart along the length L2 of the housing 582. Moreover, the energy absorbing element 570 may include any number of stitches 584' depending upon the desired amount of force to be absorbed by the energy absorbing element 570. In addition, although the stitches 584' are illustrated herein as being arranged sequentially in a row, the stitches 584' may be arranged in a pattern 586 to provide a desired amount of energy absorption. For example, the stitches 584' may be arranged in one or more of the patterns 586 numbered 1 to 67 in FIG. 9A. As shown in FIG. 9A, the patterns 1 to 67 provide arrangements for a plurality of stitches 584' along the length L2 of the housing 582 for coupling the second end 366" of the first strap portion 366 to the end 368' of the of the second strap portion 368 and absorbing energy during an application of one or more of the forces F.

With reference back to FIG. 9, each of the stitches 584' is fixedly secured about both the second end 366" of the first strap portion 366 and the end 368' of the second strap portion 368. When one of the first strap portion 366 and the second strap portion 368 has a tension force F applied, the intensity of which exceeds a predetermined threshold, such as about 2 kilonewtons (kN), a first one of the stitches 584' will break off the housing 582. As the tension force maintains, the stitches 584' will break off of the housing 582 sequentially, in a direction from the second end 582" of the housing 582 toward the first end 582'. The breaking off of each of the plurality of stitches 584' aids in limiting the applied force F to a predetermined threshold, such as about 2 kilonewtons (kN), and in instances of unexpected acceleration/deceleration experienced by a pet within the harness 310 attached to the energy absorbing tethers 312 and/or energy absorbing handled tether 360, the energy absorbing element 570 absorbs the kinetic energy of the pet and reduces the force acting on the pet.

Figure 10:
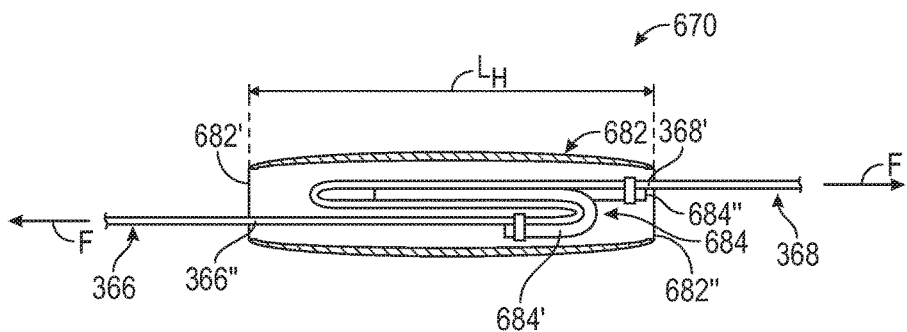
FIG. 10 is a detail view of an energy absorbing element for use with the pet restraint system of FIG. 6 in accordance with one of various embodiments.

In various embodiments, with reference to FIG. 10, another energy absorbing element 670 is shown in greater detail. As the energy absorbing element 670 is similar to the energy absorbing element 670 described with regard to FIG. 7, the same reference numerals will be used to denote the same features. In this example, the energy absorbing element 670 includes a housing 682 and at least one energy absorbing member 684. In this example, the housing 682 is substantially planar, and is comprised of a woven fiber, such as a woven polymeric fiber, a woven natural fiber, a woven synthetic fiber, etc. The housing 682 substantially surrounds at least a portion of the energy absorbing element 670 to protect the energy absorbing element 670 from the environment. The housing 682 has a first end 682' and an opposite, second end 682". Generally, a first portion of the energy absorbing tether 312 is coupled to the first end 682' and a second portion of the energy absorbing tether 312 is coupled to the second end 682". In this example, the first strap portion 366 is coupled the first end 682' and the second strap portion 368 is coupled to the second end 682". As the first strap portion 366 and the second strap portion 368 are a single strap, in this example, the second end 366" of the first strap portion 366 is joined to the end 368' of the of the second strap portion 368 within the housing 682. In this example, the second end 366" of the first strap portion 366 is positioned adjacent to the end 368' of the second strap portion 368 and coupled together by the energy absorbing member 684.

In this embodiment, the energy absorbing member 684 is a tear strip. The energy absorbing member 684 or tear strip is composed of a suitable material, which may be the same or different than the first strap portion 366 and/or the second strap portion 368. For example, the energy absorbing member 684 may be composed of a woven fiber material, including, but not limited to, a natural fiber, polymeric fiber, etc. In one example, the housing 682 itself comprises the energy absorbing member 684. Generally, the energy absorbing member 684 has a first end 684' coupled to the second end 366" of the first strap portion 366 and a second end 684" coupled to the end 368' of the of the second strap portion 368 within the housing 682. The first end 684' and the second end 384" may be coupled to the respective second end 366" of the first strap portion 366 and the end 368' of the of the second strap portion 368 via any suitable technique, such as sewing, rivets, adhesives, mechanical fasteners, etc. In the example of the energy absorbing member 684 being separate or discrete from the housing 682, the energy absorbing member 684 may be coupled to the housing 682 via sewing, adhesives, rivets, mechanical fasteners, etc. Generally, the energy absorbing member 684 is fixedly secured to both the second end 366" of the first strap portion 366 and the end 368' of the second strap portion 368 such that the application of the force F to either the first strap portion 366 and/or the second strap portion 368 will be absorbed by the tearing apart or separating of the energy absorbing member 684. When one of the first strap portion 366 and the second strap portion 368 has a tension force F applied, the intensity of which exceeds a predetermined threshold, such as about 2 kilonewtons (kN), the energy absorbing member 684 will start to tear or separate, which absorbs energy. As the tension force maintains, the energy absorbing member 684 will tear or separate in a direction from the second end 582" of the housing 582 toward the first end 582'. The tearing or separating of the energy absorbing member 684 aids in limiting the applied tension force F to a predetermined threshold, such as about 2 kilonewtons (kN), and in instances of unexpected acceleration/deceleration experienced by a pet within the harness 310 attached to the energy absorbing tethers 312 and/or energy absorbing handled tether 360, the energy absorbing element 670 absorbs the kinetic energy of the pet and reduces the force acting on the pet.

The energy absorbing tethers 312 may include one or more energy absorbing elements selected from the various the energy absorbing elements 370, 470, 570, 670 described above. Moreover, one of the energy absorbing tethers 312 may include multiple configurations of the energy absorbing elements 370, 470, 570, 670 than the other energy absorbing tether 312 within the pet restraint kit 314.

With reference back to FIG. 6, in this example, the pet restraint kit 314 includes a single energy absorbing handled tether 360. It should be understood that the pet restraint kit 314 may include any number of energy absorbing handled tethers 360. Further, while the energy absorbing handled tether 360 is described and illustrated herein as a tether for restraining an animal, the energy absorbing handled tether 360 may also be used as a leash, for walking the animal or other non-vehicle related uses. The energy absorbing handled tether 360 includes the spring hook clip 364, a first strap portion 390, a second strap portion 392 and optionally, one or more of the energy absorbing elements 370, 470, 570, 670. The first strap portion 390 and the second strap portion 392 are part of a single strap 393. In this example, the spring hook clip 364 is coupled to the first strap portion 390. However, it should be understood that the energy absorbing handled tether 360 may include the seat belt buckle receptacle 30, for example, on the first strap portion 390.

The first strap portion 390 and the second strap portion 392 may be composed of a polymeric material, such as a woven polymeric material, and may be composed of another suitable material, such as leather, a natural fiber, etc. The first strap portion 390 is coupled to the spring hook clip 364 at a first end 390'. The first strap portion 390 is received through the slot of the flange of the spring hook clip 364 and coupled to itself, via sewing, rivets, etc., to secure the spring hook clip 364 on the first strap portion 390. If employed with one of the energy absorbing elements 370, 470, 570, 670, a second end 390" of the first strap portion 390 is coupled to the respective one of the energy absorbing elements 370, 470, 570, 670.

The second strap portion 392 generally comprises a loop of material, such as the woven polymeric material, and includes the slider 134, which enables a length of the second strap portion 392 to be adjustable. The second strap portion 392 is coupled to a handle 394. In one example, the handle 394 is composed of a loop of material, which may be the same material or different material than the second strap portion 392. In this example, the handle 394 is composed of a portion of the second strap portion 392, which is coupled together at an intersection, via sewing, riveting, etc., to form the handle 394. Thus, the handle 394 is generally annular; however, the handle 394 may have various other shapes.

Generally, the handle 394 is defined on the second strap portion 392 prior to coupling the slider 134 to the second strap portion 392. If employed with one of the energy absorbing elements 370, 470, 570, 670, an end 392' of the second strap portion 392 is coupled to the respective one of the energy absorbing elements 370, 470, 570, 670.

In order to use the pet restraint system 302 for a pet, such as the dog 106, with reference to FIG. 6, the harness 310 is assembled, with the leg straps 220 sewn to the pad 218, for example. The first back strap 228, with the male end 136 of the buckle 132 attached is sewn to the first end 224 of the pad 218, and the second back strap 230, with the female end 138 of the buckle 132 attached is coupled to the other side 218' of the pad 218 at the first end 224. The first strap 262, with the male end 136 of the buckle 132 attached is coupled to one of the leg straps 120, and the second strap 264, with the female end 138 of the buckle 132 attached is coupled to the other one of the leg straps 120. The interconnecting strap 266' is coupled, via sewing for example, to the leg strap 120 and the first back strap 228, and the interconnecting strap 266" is coupled to the other leg strap 120 and the second back strap 230. The connecting ring 362' is coupled to the one of the leg straps 220 at the intersection of the leg strap 220 and the interconnecting strap 266". The connecting ring 362" is coupled to the second back strap 230 adjacent to or near the buckle 132. The connecting ring 362' is coupled to the second strap 264 adjacent to or near the buckle 132.

With the strap 367 formed, the energy absorbing tethers 312 are each assembled by positioning the spring hook clip 364 onto the second strap portion 368. The slider 134 may be threaded onto the second strap portion 368 to retain the spring hook clip 364. The respective energy absorbing element 370, 470, 570, 670 is coupled to the end 368' of the second strap portion 368. The second end 366" of the first strap portion 366 is positioned adjacent to the end of the second strap portion 368, and the respective energy absorbing element 370, 470, 570, 670 couples the second end 366" of the first strap portion 366 to the end 368' of the second strap portion 368.

In the example of the energy absorbing element 370, with reference to FIG. 7, the housing 382 is positioned adjacent to the second end 366" of the first strap portion 366 and the end 368' of the second strap portion 368, and each of the plurality of rivets 184' are coupled to the housing 382 over the first strap portion 366 and the second strap portion 368 to couple the first strap portion 366 and the second strap portion 368 to the housing 382. In the example of the energy absorbing element 470, with reference to FIG. 8, the housing 482 is positioned adjacent to the second end 366" of the first strap portion 366 and the end 368' of the second strap portion 368, and the energy absorbing member 484 is applied in-between the first strap portion 366 and the second strap portion 368 to couple the first strap portion 366 and the second strap portion 368 to the housing 482.

With regard to the energy absorbing element 570, with reference to FIGS. 9 and 9A, the housing 582 is positioned adjacent to the second end 366" of the first strap portion 366 and the end 368' of the second strap portion 568, and each of the plurality of stitches 584' are sewn into the first strap portion 366, the second strap portion 368 and the housing 582 in a selected one of the patterns 586-1 to 586-67 to couple the first strap portion 366 and the second strap portion 368 to the housing 582. In the example of the energy absorbing element 670, with reference to FIG. 10, in the example of the energy absorbing member 684 separate from the housing 682, the energy absorbing member 684 is coupled to the housing 682. The first end 674' of the energy absorbing member 684 is coupled to the second end 366" of the first strap portion 366 and the second end 674" is coupled to the end 368' of the second strap portion 368.

With reference to FIG. 6, with the respective one of the energy absorbing elements 370, 470, 570, 670 coupled to the strap 367, the spring hook clip 364 is coupled to the first strap portion 366, by threading the strap 367 through the slot 380' and coupling the first strap portion 366 to itself, via sewing, adhesives, etc. Thus, generally, the energy absorbing member 384, 484, 584, 684 couples the strap 367 to the respective housing 382, 482, 582, 682 of each of the energy absorbing elements 370, 470, 570, 670.

In order to assemble the energy absorbing handled tether 360, with the strap 393 formed, the handle 394 is defined on the second strap portion 392. The slider 134 may be coupled to the second strap portion 392. The respective energy absorbing element 370, 470, 570, 670 is coupled to the end 392' of the second strap portion 392. The second end 390" of the first strap portion 390 is positioned adjacent to the end 392' of the second strap portion 392, and the respective energy absorbing element 370, 470, 570, 670 couples the second end 390" of the first strap portion 390 to the end 392' of the second strap portion 392.

As the energy absorbing elements 370, 470, 570, 670 are coupled to the second end 390" of the first strap portion 390 and the end 392' of the second strap portion 392 in the same manner as the energy absorbing elements 370, 470, 570, 670 couple together the second end 366" of the first strap portion 366 and the end 368' of the second strap portion 368 of the energy absorbing tether 312, the coupling of the energy absorbing elements 370, 470, 570, 670 to the strap 393 will not be discussed in detail herein.

With the respective energy absorbing element 370, 470, 570, 670 coupled to the strap 393, the spring hook clip 364 is coupled to the first strap portion 390, by threading the strap 393 through the slot 380' and coupling the first strap portion 390 to itself, via sewing, adhesives, etc.

Figure 11:
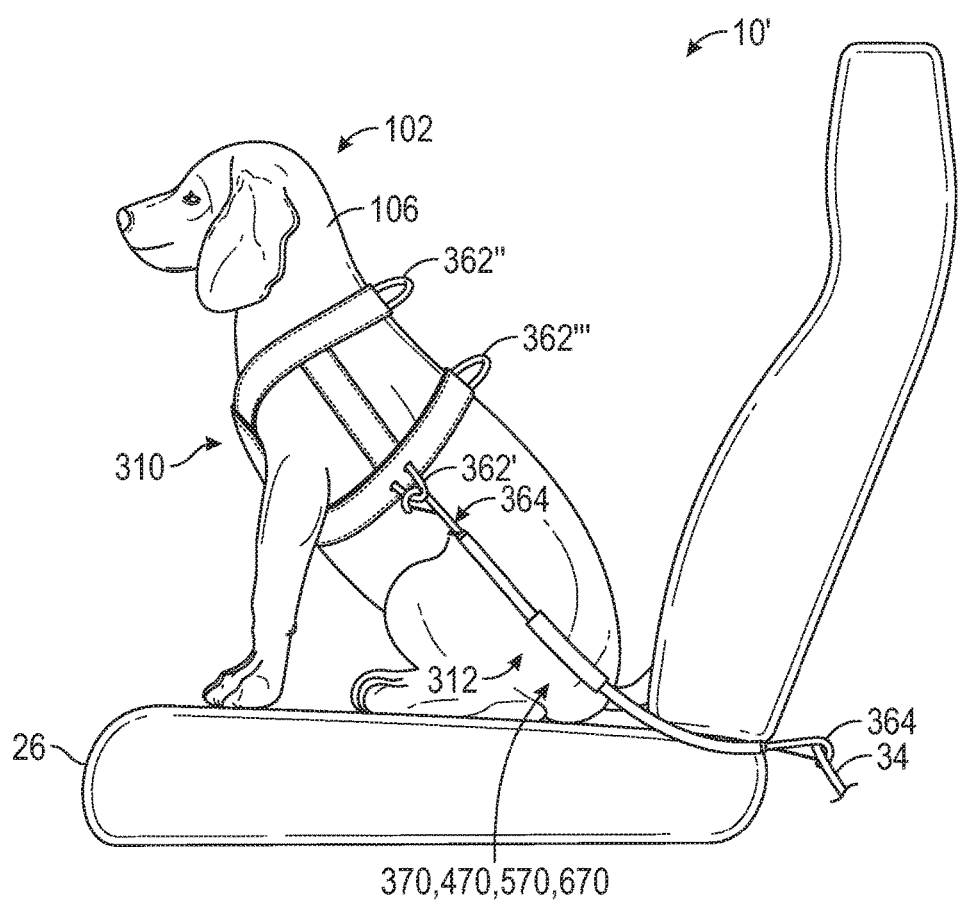
FIG. 11 is a schematic illustration of cargo, such as a pet, restrained by the pet restraint system of FIG. 6 within an interior of the vehicle of FIG. 1 in accordance with one of various embodiments.

The assembled harness 310, the energy absorbing tether 312 and the energy absorbing handled tether 360 may be packaged together and sold as the pet restraint kits 314 for restraining a pet, such as the dog 106 within the interior cabin 10' of the vehicle 10. In this regard, with reference to FIG. 11, the harness 310 is shown coupled to an animal, such as the dog 106. In this example, the spring hook clip 364 of at one end of the energy absorbing tethers 312 is coupled to the connecting ring 362' and the spring hook clip 364 at the other end of the energy absorbing tether 312 is coupled to the lower anchor 34. The spring hook clip 364 at one end of the other energy absorbing tethers 312 is coupled to the connecting ring 362 on the harness 310 substantially opposite the connecting ring 362'. The spring hook clip 364 at the other end of the other energy absorbing tether 312 is coupled to the lower anchor 34 on the opposite side of the rear seat 26. Thus, in this example, the energy absorbing tethers 312 secure the pet with two points of restraint. The energy absorbing element 370, 470, 570, 670 coupled to the energy absorbing tether 312 deforms to absorb unexpected forces acting on the harness 310 during travel.

In the example of the energy absorbing element 370 (FIG. 7), the rivets 384' break off of the first strap portion 366 and the second strap portion 368 in a direction from the second end 382" toward the first end 382' upon the application of the tension force F greater than a predefined threshold. In the example of the energy absorbing element 470 (FIG. 8), the energy absorbing member 484 pulls off of the first strap portion 366 and the second strap portion 368 in a direction from the second end 482" toward the first end 482' upon the application of the tension force F greater than a predefined threshold. With regard to the energy absorbing element 570 (FIG. 9), the stitches 584' break off the first strap portion 366 and the second strap portion 368 in a direction from the second end 582" toward the first end 582' upon the application of the tension force F greater than a predefined threshold. In the example of the energy absorbing element 670 (FIG. 10), the energy absorbing member 684 tears or separates upon the application of the tension force F greater than a predefined threshold. Thus, the energy absorbing elements 370, 470, 570, 670 employed with the energy absorbing tethers 312 deform to absorb energy and limit the tension forces F acting on the harness 310, and cooperate with the energy absorbing tethers 312 to securely retain the pet, such as the dog 106, within the interior 10' of the vehicle 10.

Figure 12:
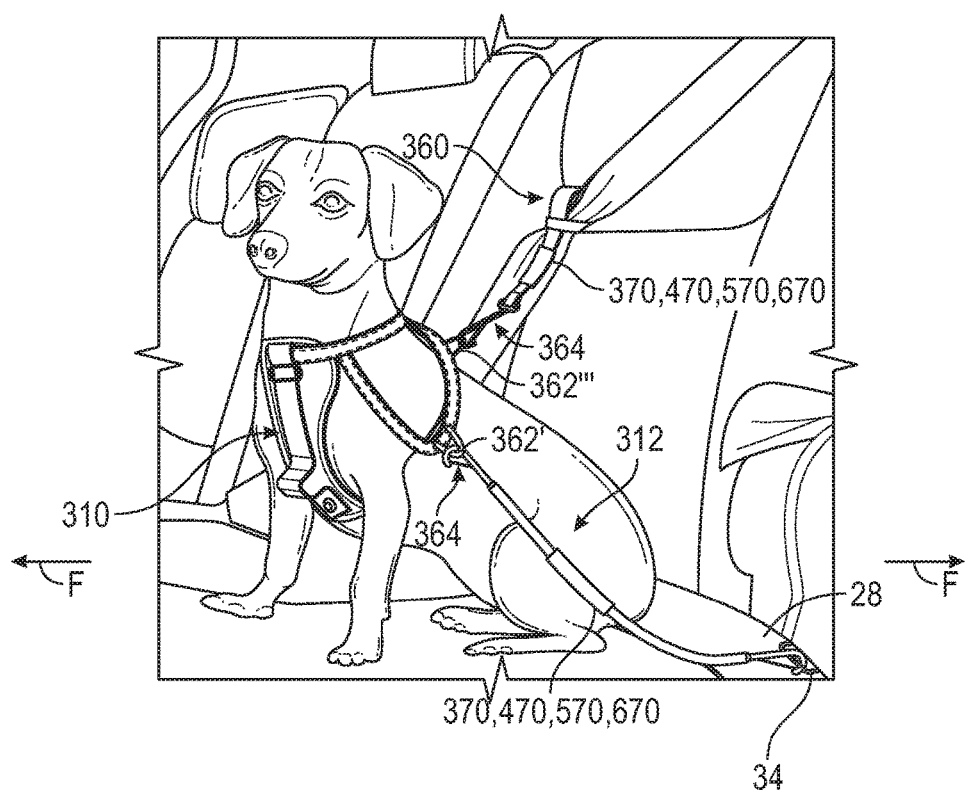
FIG. 12 is a schematic illustration of cargo, such as a pet, restrained by the pet restraint system of FIG. 6 within an interior of the vehicle of FIG. 1 in accordance with one of various embodiments.

With reference to FIG. 12, another example of restraining a pet, such as the dog 106 within the interior cabin 10' of the vehicle 10, with the pet restraint kit 314 is shown. In FIG. 12, the energy absorbing tethers 312 are coupled to the harness 310 and the lower anchors 34 as described with regard to FIG. 11. The handle 394 of the energy absorbing handled tether 360 is positioned about the seat belt 28, and the strap 393 is passed through the handle 394 to securely fix the handle 394 onto the seat belt 28. The spring hook clip 364 of the strap 393 is coupled to the connecting ring 362''' of the harness 310. Thus, in this example, the pet restraint kit 314 is employed to secure the pet with three points of restraint. Similarly, as discussed with regard to FIG. 11, the energy absorbing elements 370, 470, 570, 670 employed with the energy absorbing tethers 312 and the energy absorbing handled tether 360 deform to absorb the tension forces F acting on the harness 310, and cooperate with the energy absorbing tethers 312 and the energy absorbing handled tether 360 to securely retain the pet, such as the dog 106, within the interior 10' of the vehicle 10.

Figure 13:
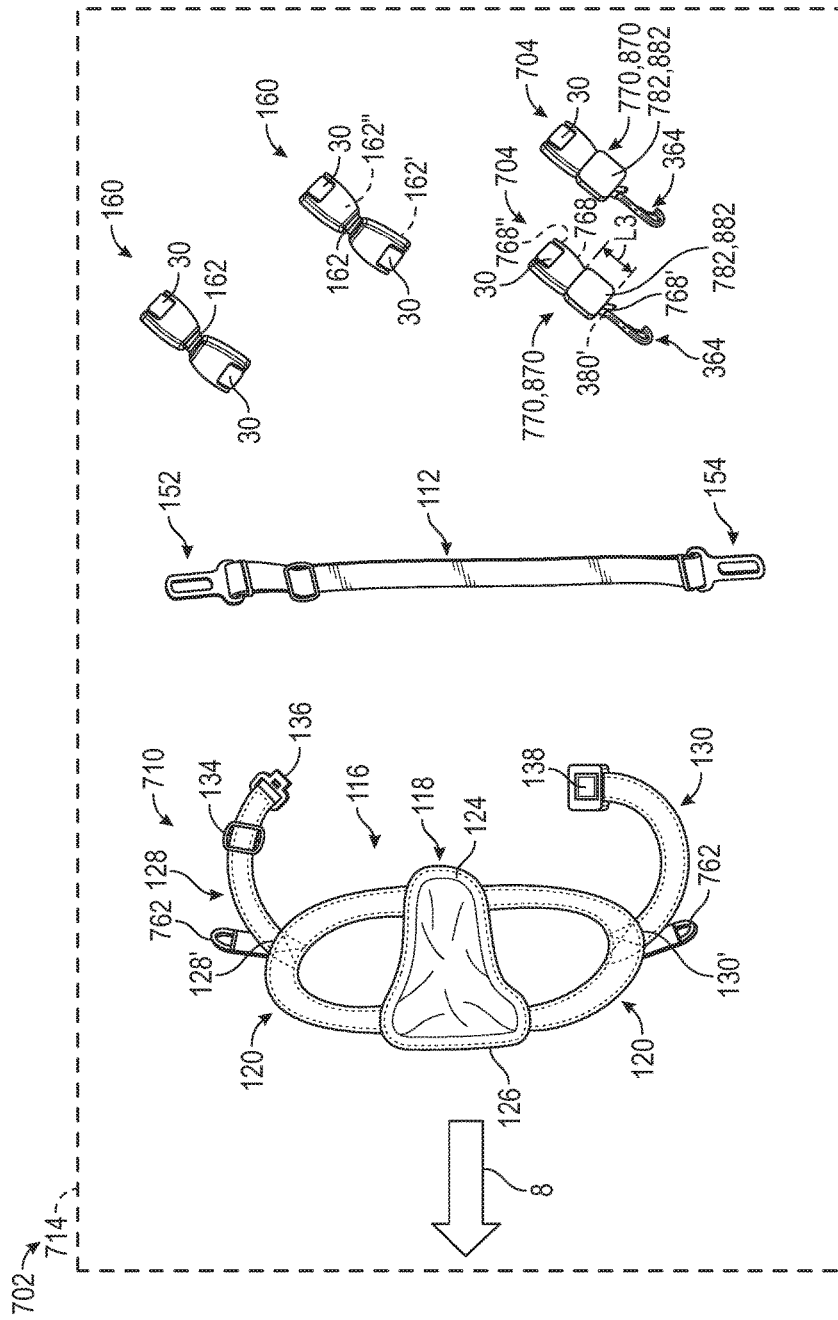
FIG. 13 is an exemplary pet restraint kit that includes an exemplary pet restraint system of the cargo restraint system of FIG. 1 in accordance with various embodiments.

With reference to FIG. 13, another exemplary pet restraint system 702 is shown. As the pet restraint system 702 is similar to the pet restraint system 102 described with regard to FIGS. 1-3 and the pet restraint system 302 described with regard to FIG. 6, the same reference numerals will be used to denote the same features. The pet restraint system 702 includes a harness 710, the tether 112 and one or more energy absorbing connectors 704. Optionally, the pet restraint system 702 may also include the one or more interconnected seat belt buckle receptacles 160 described with regard to FIG. 3A. The harness 710, the tether 112 the one or more energy absorbing connectors 704 and optionally, the interconnected seat belt buckle receptacles 160 may be packaged together in suitable packaging and available to a consumer as a pet restraint kit 714 for use with the vehicle 10. Generally, the harness 710 is suitable for small (less than 25 kg.) or mid-size pets (25 kg.-50 kg.). The harness 710 includes the body 716 and one or more of the connecting rings 762. In this regard, the harness 710 may include one of more connecting rings 762 such that the harness 710 may be employed with, and releasably coupled to, one or more of the energy absorbing connectors 704 associated with the pet restraint system 702 (and/or one or more of the energy absorbing tethers 312 and the energy absorbing handled tether 360 of FIG. 6). The harness 710 is generally composed of a woven polymeric material; however, a natural fiber, leather or other material may be employed. An arrow 8 points in a direction of a front of the harness 710.

In this example, the harness 710 includes two connecting rings 762, which are coupled to the body 116 of the harness 710. The connecting rings 762 are coupled to the leg straps 120 at the intersection of the respective ends 128', 130' and the respective leg straps 120. The connecting rings 762 may be composed of a metal, metal alloy or a polymeric material. In one example, the connecting rings 762 are sewn to the harness 710 to couple the connecting rings 762 to the harness 710. Generally, the connecting rings 762 are substantially O-shaped, and receive a respective one of energy absorbing connectors 704 to couple the respective energy absorbing connectors 704 to the harness 710.

The energy absorbing connectors 704 include a strap 768, a first connector or the spring hook clip 364, a compact energy absorbing element 770 with a housing 782 (FIG. 13) and a second connector or the seat belt buckle receptacle 30. The strap 768 interconnects the spring hook clip 364 with the seat belt buckle receptacle 30. The energy absorbing element 770 is also coupled to the strap 768. Generally, the strap 768 is composed of a polymeric material, such as a woven polymeric material, however, other materials, such as a natural fiber, leather, etc. may be employed. The housing 782 may be composed of a polymeric material, such as a woven polymeric material, and may be composed of another suitable material, such as leather, natural fiber, rubber, plastic, etc. The housing 782 substantially encloses the compact energy absorbing element 770 to protect the compact energy absorbing element 770 from the environment. The strap 768 includes a first end 768' and a second end 768''. The first end 768' is coupled to the slot 380' of the spring hook clip 364. The second end 768'' is received through the slot of the seat belt buckle receptacle 30 and retains the seat belt buckle receptacle 30. In one example, the second end 768'' is coupled to itself, via sewing, to retain the seat belt buckle receptacle 30.

Figure 14:
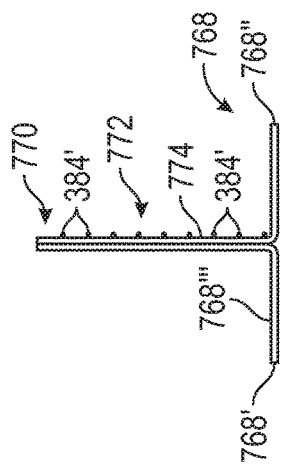
FIG. 14 is a detail perspective view of an energy absorbing element for use with the pet restraint system of FIG. 13 in accordance with various embodiments.

The energy absorbing element 770 has a length L3 as illustrated in FIG. 13, which is different than and generally less than a length $L_H$ of each of the housings 382, 482, 582, 682 of the respective energy absorbing elements 370, 470, 570, 670 (FIGS. 7-10). In one example, with reference to FIGS. 14 and 15, the energy absorbing element 770 is coupled to the strap 768. In this example, the energy absorbing element 770 is integrally formed with the strap 768; however, it will be understood that the energy absorbing element 770 may be discrete from the strap 768 and coupled to the strap 768 via any suitable technique, such as sewing, riveting, etc. The energy absorbing element 770 includes at least one energy absorbing member 772 coupled to a portion 774 of the strap 768. In one example, the energy absorbing member 772 comprises the plurality of rivets 384' discussed with regard to FIG. 7. It should be understood, however, that the energy absorbing element 770 may include the energy absorbing member 484 (FIG. 8), the plurality of stitches 584' (FIGS. 9 and 9A) or may comprise the energy absorbing member 684 (FIG. 10). In this example, the plurality of rivets 384' are coupled to the strap 768 so as to be spaced apart along a length L4 of the portion 774 of the strap 768. The length L4 is generally different than and in this example, is significantly longer than the length L3 (FIG. 13).

Figure 15:
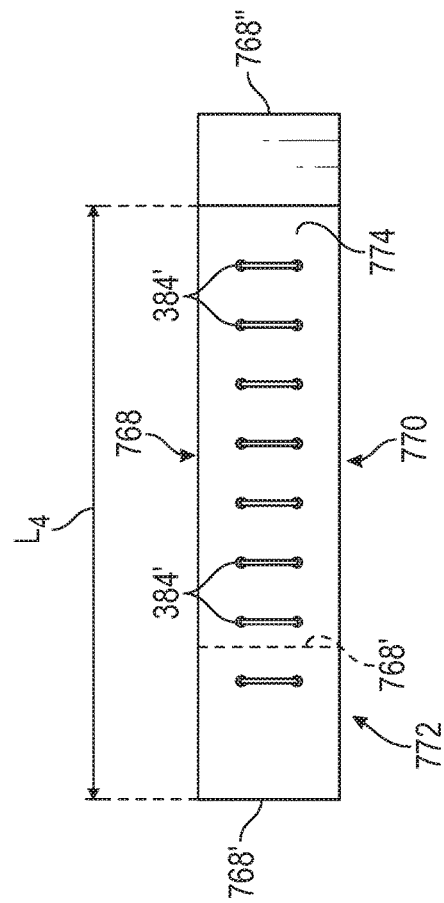
FIG. 15 is a detail top view of the energy absorbing element of FIG. 14 in which the energy absorbing element is folded onto a surface of a strap in accordance with various embodiments.
Figure 16:
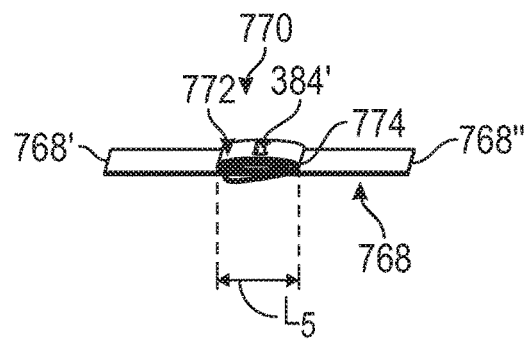
FIG. 16 is a detail side view of the energy absorbing element of FIG. 14 in which the energy absorbing element is folded upon itself in accordance with one of various embodiments.
Figure 17:
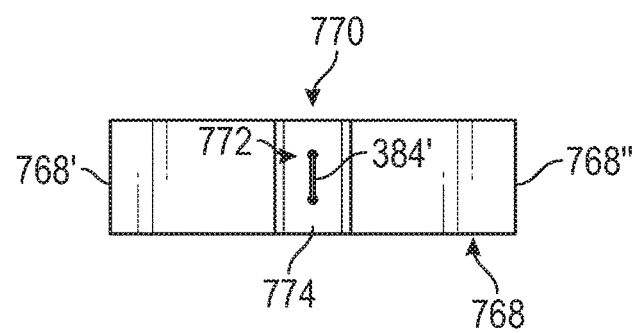
FIG. 17 is a detail top view of the energy absorbing element of FIG. 16 in accordance with various embodiments.

In order to reduce the length L4 of the energy absorbing element 770 to the length L3, and thereby, reduce an overall size of the energy absorbing connectors 704, in one example, with reference to FIG. 15, the compact energy absorbing element 770 is folded to lie on top of a surface 768''' of the strap 768. As shown in FIG. 15, the portion 774 of the strap 768 that contains the plurality of rivets 384' is substantially parallel to the surface 768''' of the strap 768. With reference to FIGS. 16 and 17, the portion 774 of the strap 768 is folded a plurality of times to arrive at a length L5. The length L5 is different than, and significantly less than, the length L4 (FIG. 15). By folding the portion 774 of the strap 768 containing the energy absorbing member 772, the length of the energy absorbing element 770 with the housing 782 is reduced to the length L3 (FIG. 13), making it more compact than the energy absorbing elements 370, 470, 570, 670 discussed with regard to FIGS. 7-10.

Figure 18:
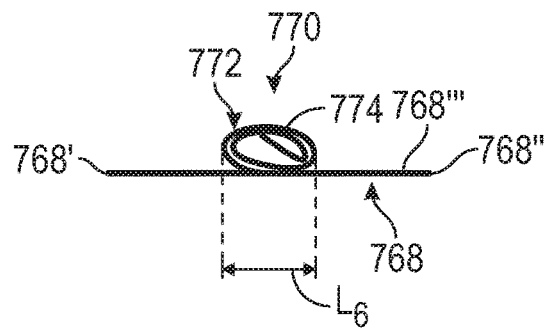
FIG. 18 is a detail side view of the energy absorbing element of FIG. 14 in which the energy absorbing element is rolled upon itself in accordance with one of various embodiments.
Figure 19:
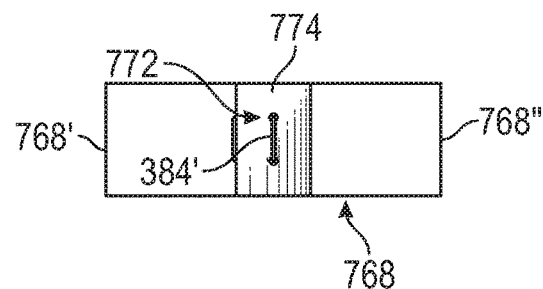
FIG. 19 is a detail top view of the energy absorbing element of FIG. 18 in accordance with various embodiments.

Alternatively, with reference to FIGS. 18 and 19, the portion 774 of the strap 768 is rolled a plurality of times to arrive at a length L6. In this regard, with the energy absorbing element 770 folded to lie on top of a surface 768''' of the strap 768 as shown in FIG. 15, the portion 774 is rolled upon itself to arrive at the length L6 shown in FIG. 18. The length L6 is different than, and significantly less than, the length L4 (FIG. 15). By rolling the portion 774 of the strap 768 containing the energy absorbing member 772, the length of the energy absorbing element 770 with the housing 782 is reduced to the length L3 (FIG. 13), making it more compact than the energy absorbing elements 370, 470, 570, 670 discussed with regard to FIGS. 7-10.

Figure 20:
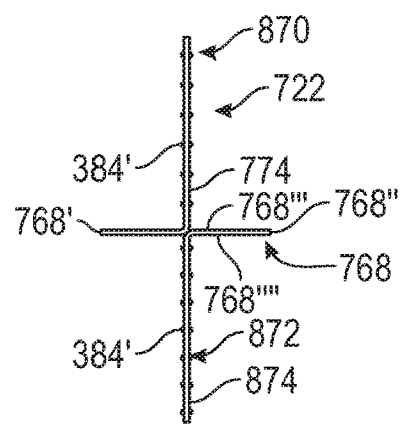
FIG. 20 is a detail perspective view of an energy absorbing element for use with the pet restraint system of FIG. 13 in accordance with various embodiments.
Figure 21:
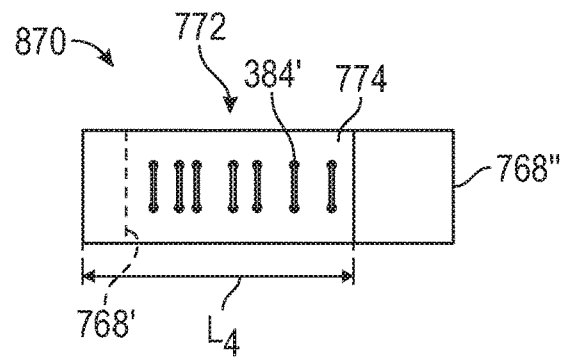
FIG. 21 is a detail top view of the energy absorbing element of FIG. 20 in which a first energy absorbing member is folded onto a surface of a strap in accordance with various embodiments.
Figure 22:
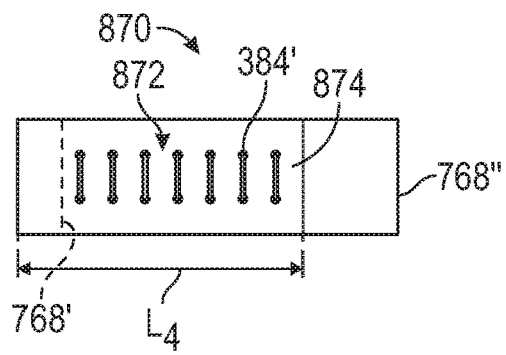
FIG. 22 is a detail top view of the energy absorbing element of FIG. 20 in which a second energy absorbing member is folded onto a second surface of a strap in accordance with various embodiments.

In another exemplary embodiment, with reference to FIGS. 20-22, a compact energy absorbing element 870 with a housing 882 (FIG. 13) is shown. The energy absorbing element 870 has the length L3 (FIG. 13), which is different than and significantly less than the length $L_H$ of each of the housings 382, 482, 582, 682 of the respective energy absorbing elements 370, 470, 570, 670 (FIGS. 7-10). The housing 882 may be composed of a polymeric material, such as a woven polymeric material, and may be composed of another suitable material, such as leather, natural fiber, rubber, plastic, etc. The housing 882 substantially encloses the compact energy absorbing element 870 to protect the compact energy absorbing element 870 from the environment. The housing 882 may be substantially similar to the housing 782. In one example, the energy absorbing element 870 is coupled to the strap 768. In this example, the energy absorbing element 870 is integrally formed with the strap 768; however, it will be understood that the energy absorbing element 870 may be discrete from the strap 768 and coupled to the strap 768 via any suitable technique, such as sewing, riveting, etc. The energy absorbing element 870 includes the energy absorbing member 772 coupled to the portion 774 of the strap 768 and at least one second energy absorbing member 872 coupled to a second portion 874 of the strap 768. Thus, the energy absorbing element 870 includes two energy absorbing members 772, 872, which are each coupled to respective portions 774, 874 of the strap 768. In one example, the second energy absorbing member 872 comprises the plurality of rivets 384' discussed with regard to FIG. 7. It should be understood, however, that the second energy absorbing member 872 may include the energy absorbing member 484 (FIG. 8), the plurality of stitches 584' (FIGS. 9 and 9A) or may comprise the energy absorbing member 684 (FIG. 10). In this example, the plurality of rivets 384' are coupled to the strap 768 so as to be spaced apart along the length L4 of the portion 874 of the strap 768. The length L4 is generally different than and in this example, significantly longer than the length L3 (FIG. 13).

Figure 23:
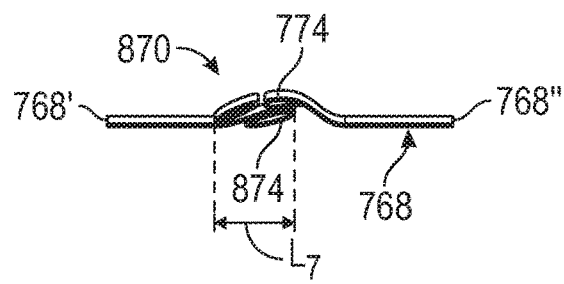
FIG. 23 is a detail side view of the energy absorbing element of FIG. 20 in which the energy absorbing element is folded onto a surface of a strap in accordance with various embodiments.
Figure 24:
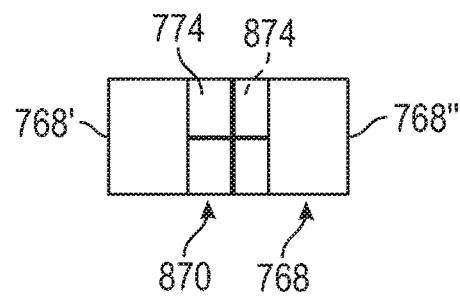
FIG. 24 is a detail top view of the energy absorbing element of FIG. 20 in which the energy absorbing element is folded upon itself in accordance with one of various embodiments.

In order to reduce the length L4 of the energy absorbing element 870 with the housing 882 to the length L3, and thereby, reduce an overall size of the energy absorbing connectors 704, in one example, with reference to FIGS. 21 and 22, the energy absorbing element 870 is folded to lie on top of the surface 768'' and a second, opposite surface 768'''' of the strap 768. As shown in FIGS. 21 and 22, the portion 774 and the second portion 874 of the strap 768 that contain the plurality of rivets 384' are each substantially parallel to the respective surface 768', 768' of the strap 768. With reference to FIGS. 23 and 24, the portion 774 and the second portion 874 of the strap 768 are each folded a plurality of times to arrive at a length L7. The length L7 is different than, and significantly less than, the length L4 (FIGS. 21 and 22). By folding the portion 774 and the second portion 874 of the strap 768 containing the energy absorbing member 772 and the second energy absorbing member 872, the length of the energy absorbing element 870 is reduced, making it more compact than the energy absorbing elements 370, 470, 570, 670 discussed with regard to FIGS. 7-10. It should be noted that the portion 774 and the second portion 874 of the strap 768 may alternatively be rolled to arrive at a reduced length.

Figure 25:
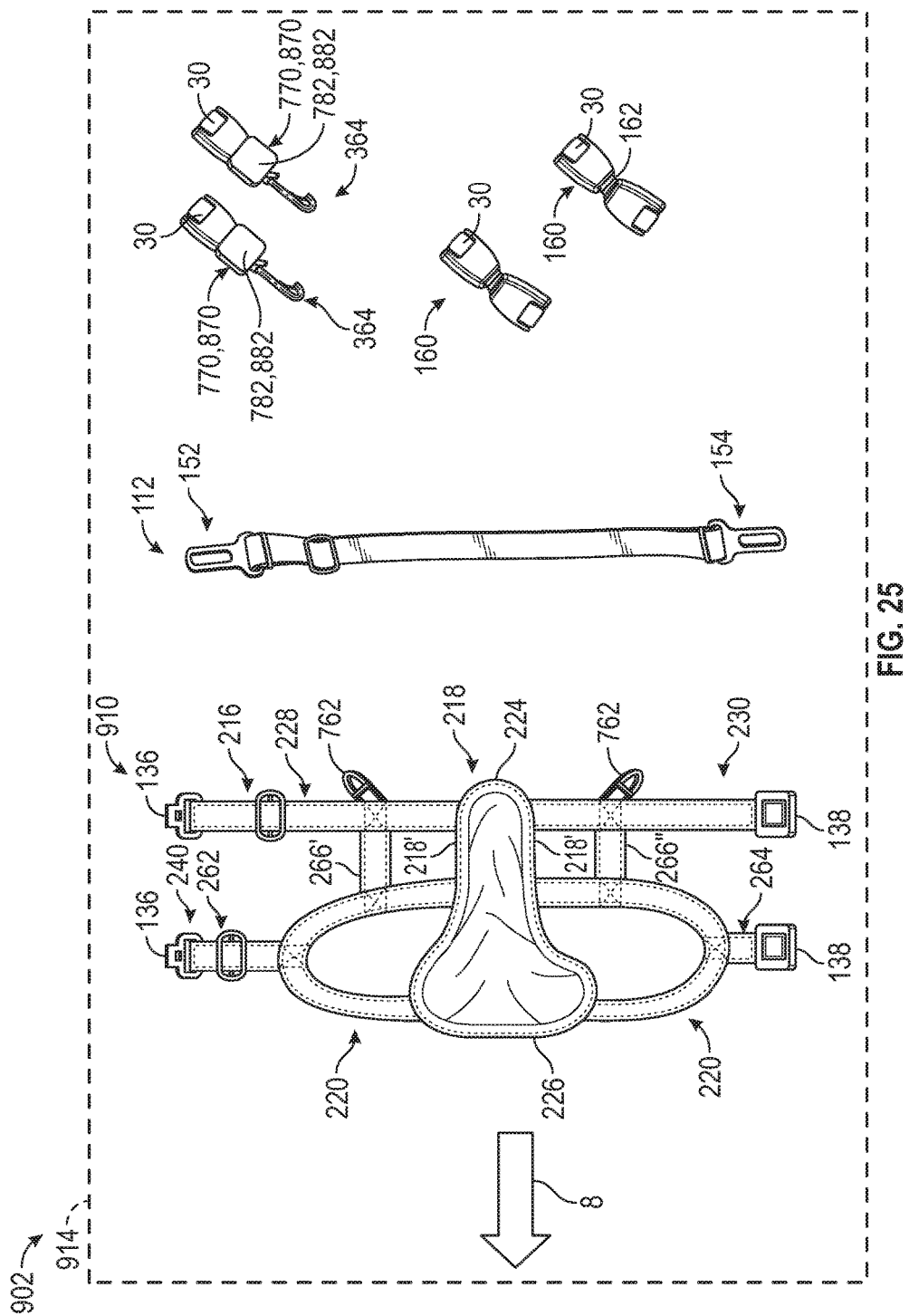
FIG. 25 is an exemplary pet restraint kit that includes an exemplary pet restraint system of the cargo restraint system of FIG. 1 in accordance with various embodiments.

With reference to FIG. 25, another exemplary pet restraint system 902 is shown. As the pet restraint system 902 is similar to the pet restraint system 102 described with regard to FIGS. 1-3, the pet restraint system 202 described with regard to FIG. 4 and the pet restraint system 702 described with regard to FIGS. 13-24, the same reference numerals will be used to denote the same features. The pet restraint system 902 includes a harness 910, the tether 112, and the one or more energy absorbing connectors 704. Optionally, the pet restraint system 902 may also include the one or more interconnected seat belt buckle receptacles 160. The harness 910, the tether 112 the one or more energy absorbing connectors 704 and optionally, the interconnected seat belt buckle receptacles 160 may be packaged together in suitable packaging and available to a consumer as a pet restraint kit 914 for use with the vehicle 10. Generally, the harness 910 is suitable for mid-size (25 kg.-50 kg.) to large pets (50 kg. and above). The harness 910 includes the body 716 and one or more of the connecting rings 762. In this regard, the harness 910 may include one of more connecting rings 762 such that the harness 910 may be employed with, and releasably coupled to, one or more of the energy absorbing connectors 704 associated with the pet restraint system 902 (and or one or more of the energy absorbing tethers 312 and the energy absorbing handled tether 360 of FIG. 6). The harness 910 is generally composed of a woven polymeric material; however, leather, a natural fiber or other material may be employed. An arrow 8 points in a direction of a front of the harness 910.

In this example, the harness 910 includes two connecting rings 762, which are coupled to the body 216 of the harness 910. One of the connecting rings 762 is coupled to the first back strap 228 at an intersection of the first back strap 228 and the interconnecting strap 266'. The other of the connecting rings 762 is coupled to the second back strap 230 at an intersection of the second back strap 230 and the interconnecting strap 266". The connecting rings 762 may be composed of a metal, metal alloy or a polymeric material. In one example, the connecting rings 762 are sewn to the harness 910 to couple the connecting rings 762 to the harness 910. Generally, the connecting rings 762 are substantially O-shaped, and receive a respective one of energy absorbing connectors 704 to couple the respective energy absorbing connectors 704 to the harness 910.

In order to use the pet restraint system 702, 902 for a pet, such as the dog 106, the body 116, 216 of the respective harness 710, 910 is assembled as discussed with regard to FIGS. 2 and 3, respectively. The connecting rings 762 are each coupled to the respective body 116, 216 of the harness 710, 910.

In order to assemble the energy absorbing connectors 704, with reference to FIG. 15, the energy absorbing element 770 is defined on the portion 774 of the strap 768. In one example, the strap 768 is folded to define the portion 774 and the plurality of rivets 384' are coupled to the portion 774. In the example of the energy absorbing element 870, with reference to FIGS. 21 and 22, the strap 768 is folded twice to define the portion 774 and the second portion 874. The plurality of rivets 384' are coupled to the portion 774 and the second portion 874.

With the energy absorbing element 770, 870 defined on the strap 768, the energy absorbing element 770, 870 may be folded or rolled to reduce the length of the energy absorbing element 770, 870. With reference to FIGS. 13 and 25, the first end 768' of the strap 768 is coupled to the spring hook clip 364, and the second end 768" of the strap 768 is coupled to the seat belt buckle receptacle 30.

It should be noted that the energy absorbing connectors 704 may also be used with the harness 310 discussed with regard to FIG. 6. Further, the energy absorbing tethers 312 and the energy absorbing handled tether 360 of FIG. 6 may be employed with the harnesses 710, 910. Moreover, while the energy absorbing connectors 704 are illustrated herein as including the energy absorbing element 770, 870, it should be understood that a connector having the spring hook clip 364 coupled to the seat belt buckle receptacle 30 via a strap without the energy absorbing element 770, 870 is also contemplated herein for use with one or more of the pet restraint systems 102, 202, 302, 702, 902.

Figure 26:
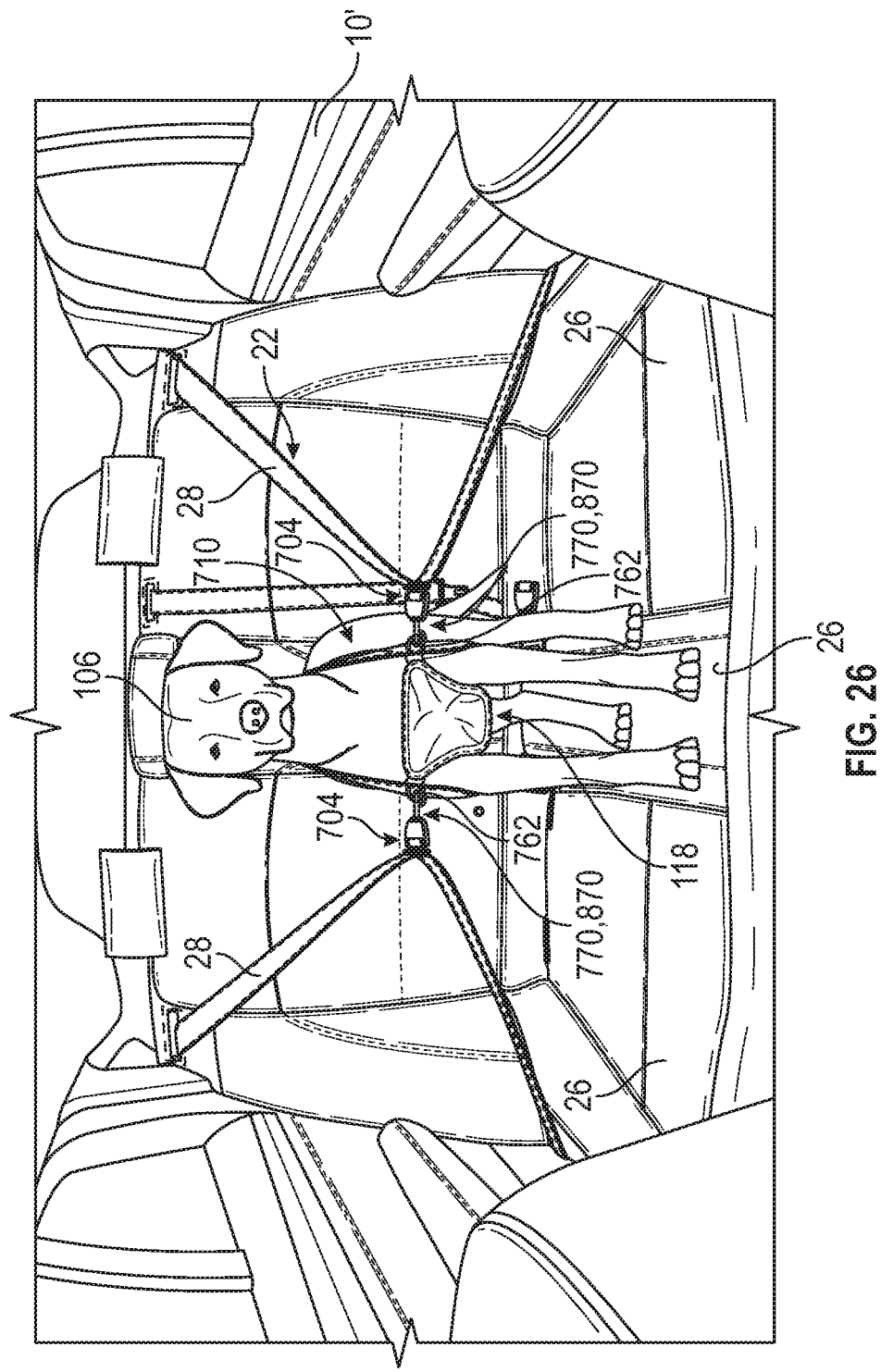
FIG. 26 is a schematic illustration of cargo, such as a pet, restrained by the pet restraint system of FIG. 13 within an interior of the vehicle of FIG. 1 in accordance with various embodiments.

The assembled harness 710, the tether 112, the energy absorbing connectors 704 and the interconnected seat belt buckle receptacles 160 may be packaged together and sold as the pet restraint kit 714 for restraining a pet, such as the dog 106 within the interior cabin 10' of the vehicle 10. The assembled harness 910, the tether 112, the energy absorbing connectors 704 and the interconnected seat belt buckle receptacles 160 may also be packaged together and sold as the pet restraint kit 914 for restraining a pet, such as the dog 106 within the interior cabin 10' of the vehicle 10. In this regard, with reference to FIG. 26, the harness 710 is shown coupled to an animal, such as the dog 106. In this example, the spring hook clip 364 of one of the energy absorbing connectors 704 is coupled to one of the connecting rings 762 and the spring hook clip 364 of the other energy absorbing connectors 704 is coupled to the other one of the connecting rings 762. The seat belt buckle receptacle 30 of one of the energy absorbing connectors 704 is coupled to the buckle tongue 36 of the seat belt 28 of one of the rear seats 26; and the seat belt buckle receptacle 30 of the other one of the energy absorbing connectors 704 is coupled to the buckle tongue 36 of the seat belt 28 of another one of the rear seats 26. Thus, in this example, the energy absorbing connectors 704 cooperate with the seat belts 28 to secure the pet with four points of restraint. The one of the energy absorbing elements 770, 870 coupled to the energy absorbing connectors 704 deform to absorb unexpected forces acting on the harness 110 during travel.

In the example of the energy absorbing element 770 (FIG. 14), the rivets 384' break off of the portion 774 upon the application of the tension force F greater than a predefined threshold. In the example of the energy absorbing element 870 (FIG. 20), the rivets 184' break off of the portion 774 and off of the second portion 874 upon the application of the tension force F greater than a predefined threshold. Thus, the energy absorbing elements 770, 870 employed with the energy absorbing connectors 704 deform to absorb energy and limit the tension forces F acting on the harness 110, 210 and cooperate with the seat belts 28 of the occupant restraint system 22 to securely retain the pet, such as the dog 106, within the interior 10' of the vehicle 10.

Figure 27:
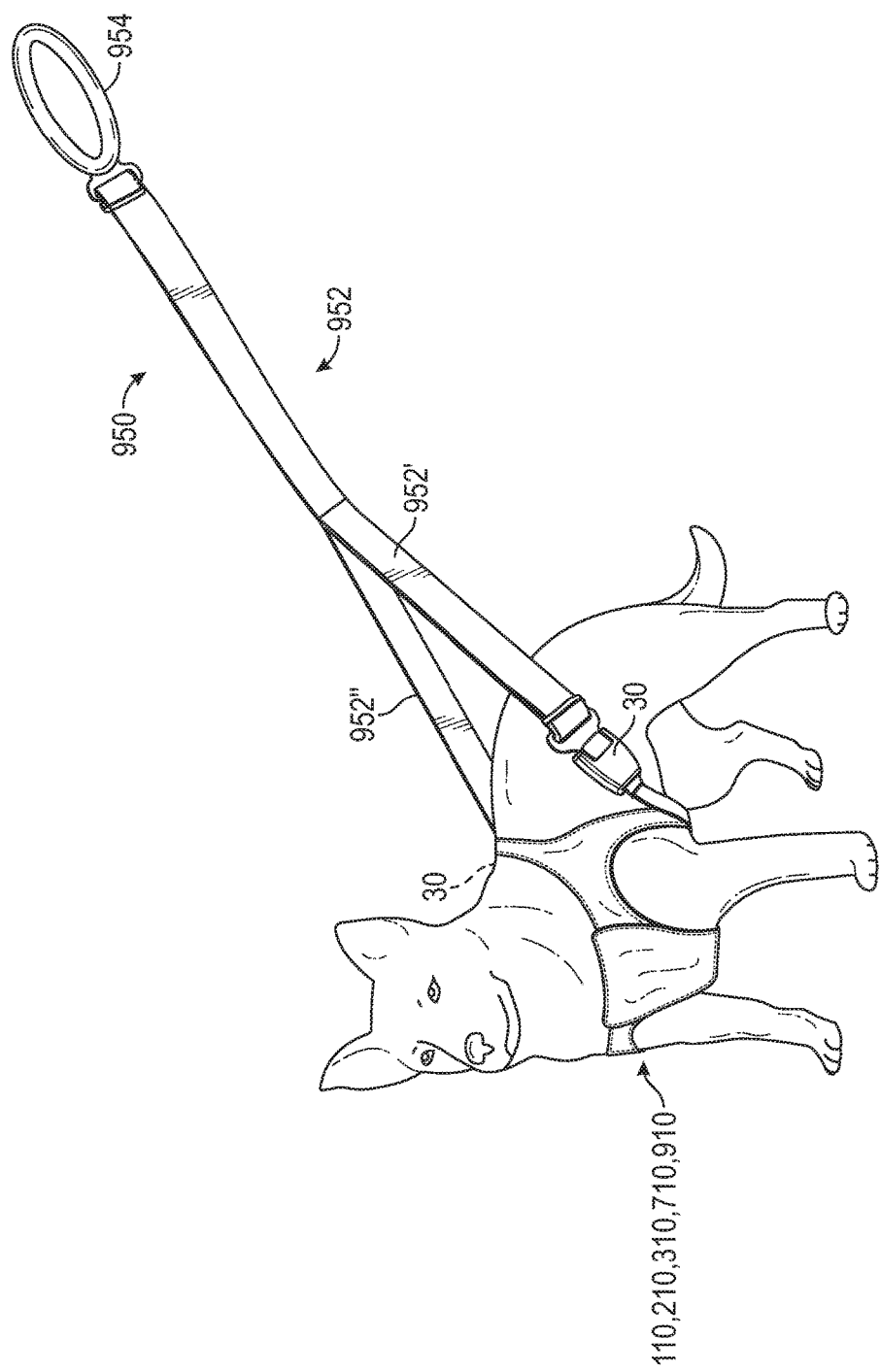
FIG. 27 is a schematic illustration of a leash coupled to the pet restraint system of FIG. 3 in accordance with various embodiments.

With reference to FIG. 27, in various embodiments, a leash 950 may be employed with the harnesses 110, 210, 310, 710, 910. In this example, the leash 950 includes two buckle tongues 36 that are coupled to a Y-strap 952. The Y-strap 952 has a first branch 952' coupled to one of the buckle tongues 36, and a second branch 952" coupled to the other of the buckle tongues 36. A handle 954 may be coupled to the strap 952 at an end opposite the first branch 952' and the second branch 952". In the example of the harness 310, 710, 910, the energy absorbing connectors 704 may be connected to the harness 310, 710, 910 to enable the buckle tongues 36 of the leash 950 to be coupled to the harness 710, 910. In addition, one or more of the harnesses 110, 210 may include a hook and loop fastener patch, which mates with a corresponding hook and loop fastener patch of coupled to the seat belt buckle receptacles 30 to secure the seat belt buckle receptacles 30 substantially flat against the harnesses 110, 210 during walking, or non-vehicular travel of the animal.

It should be noted that generally, the energy absorbing elements 370, 470, 570, 670 and the compact energy absorbing element 770, 870 may be configured to have a particular load limit force or amount of energy absorbed by the energy absorbing elements 370, 470, 570, 670 and the compact energy absorbing element 770, 870 during an abrupt deceleration/acceleration of the vehicle 10 based on a mass of the pet, such as the dog 106. TABLE 1, below, provides example kinetic energy to be absorbed and a load limit force for the respective energy absorbing elements 370, 470, 570, 670 and the compact energy absorbing element 770, 870 based on a mass of the pet.

TABLE 1

| Pet Mass (kg) | Kinetic Energy to be Absorbed (Joule) | Load Limit (kN) |
| --- | --- | --- |
| 5 | 121 | 0.4 |
| 10 | 241 | 0.8 |
| 15 | 362 | 1.2 |
| 20 | 482 | 1.6 |
| 25 | 603 | 2.0 |
| 30 | 723 | 2.4 |
| 35 | 844 | 2.8 |
| 40 | 965 | 3.2 |
| 45 | 1085 | 3.6 |
| 50 | 1206 | 4.0 |
| 55 | 1326 | 4.4 |
| 60 | 1447 | 4.8 |
| 65 | 1567 | 5.2 |
| 70 | 1688 | 5.6 |
| 75 | 1808 | 6.0 |

In the above TABLE 1, the kinetic energy to be absorbed is based on an incident speed of 25 kilometers per hour (kph) and an overall length of the energy absorbing elements 370, 470, 570, 670 and the compact energy absorbing element 770, 870 as about 0.3 meters (m). Thus, based on TABLE 1, for a pet with a mass of 25 kg. with two energy absorbing elements selected from the energy absorbing elements 370, 470, 570, 670 and the compact energy absorbing element 770, 870 coupled to the respective harness 310, 710, 910, the load limiting force for each of the two selected energy absorbing elements 370, 470, 570, 670 and the compact energy absorbing element 770, 870 would be about 1 kN (1.0 kN per each of the two energy absorbing elements selected from the energy absorbing elements 370, 470, 570, 670 and the compact energy absorbing element 770, 870).

Cargo Carrier Restraint System

Figure 28:
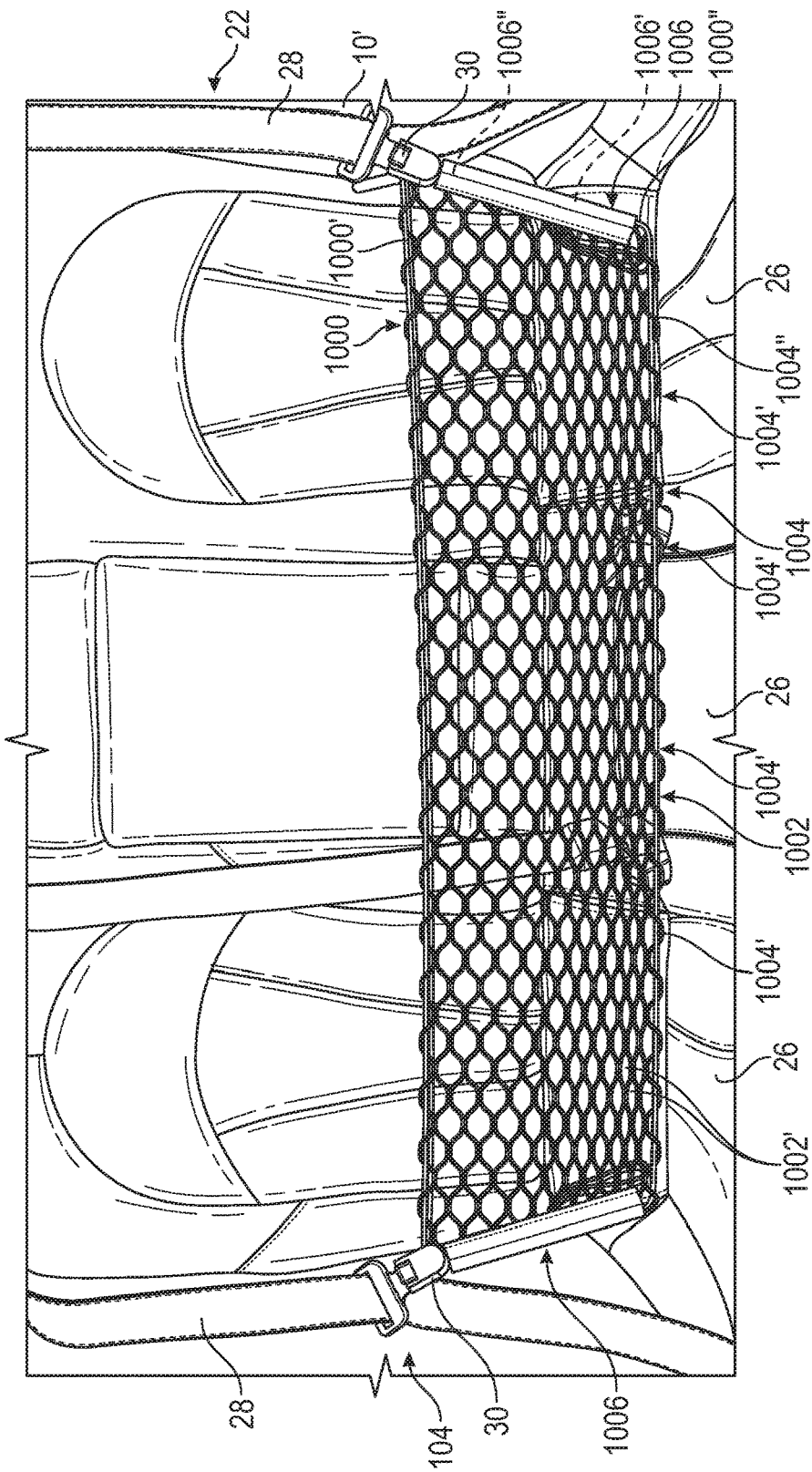
FIG. 28 is a schematic illustration of an exemplary cargo carrier restraint system of the cargo restraint system of FIG. 1 coupled within an interior of the vehicle of FIG. 1, in accordance with various embodiments.

With reference to FIG. 28, in one example, the cargo carrier restraint system 104 includes a cargo net 1000 and one or more seat belt buckle receptacles 30. In this example, the cargo net 1000 includes a fabric netting 1002 and a frame 1004. A portion of the fabric netting 1002 defines a top end 1000' of the cargo net 1000, while a portion of the frame 1004 defines an opposite, bottom end 1000". The cargo net 1000 is shown herein as extending across three rear seats 26, however, it will be understood that the cargo net 1000 may have any selected size. The fabric netting 1002 defines a plurality of spaced apart apertures 1002', and also includes a pair of fabric panels 1006. The fabric panels 1006 couple the fabric netting 1002 to the frame 1004, and are coupled to the seat belt buckle receptacles 30. In this example, the fabric panels 1006 define a passage 1006' that receives a portion of the frame 1004 to couple the frame 1004 to the fabric netting 1002. The fabric panels 1006 also define a loop 1006", which receives the seat belt buckle receptacle 30. Generally, one end of the loop 1006" is passed through the slot defined in the seat belt buckle receptacle 30 and then the loop 1006" is coupled to the respective fabric panel 1006, via sewing, for example, to retain the seat belt buckle receptacle 30 on the cargo net 1000.

The frame 1004 imparts rigidity to the cargo net 1000. The frame 1004 is generally U-shaped and may be composed of a metal, metal alloy or polymer. The frame 1004 includes a plurality of hinges 1004', which enable the frame 1004 to be folded, thereby enabling the cargo net 1000 to fold into a smaller size for storage. The hinges 1004' may be substantially evenly spaced along a base 1004" of the frame 1004. In one example, the hinges 1004' may comprise any suitable hinge 1004', including, but not limited to, a living hinge. In this example, the frame 1004 is shown with four hinges 1004', however, it will be understood that the frame 1004 may have any number of hinges 1004'.

With the fabric netting 1002 formed with the fabric panels 1006, the loop 1006" of each of the fabric panels 1006 may be passed through the bore of the seat belt buckle receptacles 30 and coupled back onto the respective fabric panel 1006 to couple the seat belt buckle receptacles 30 to the fabric netting 1002. With the hinges 1004' formed, the frame 1004 is inserted into the passages 1006' to couple the frame 1004 to the fabric netting 1002. The cargo net 1000 may be coupled to the occupant restraint system 22 of the rear seats 26 by coupling the buckle tongue 36 of two of the seat belts 28 to the respective seat belt buckle receptacle 30.

Figure 29:
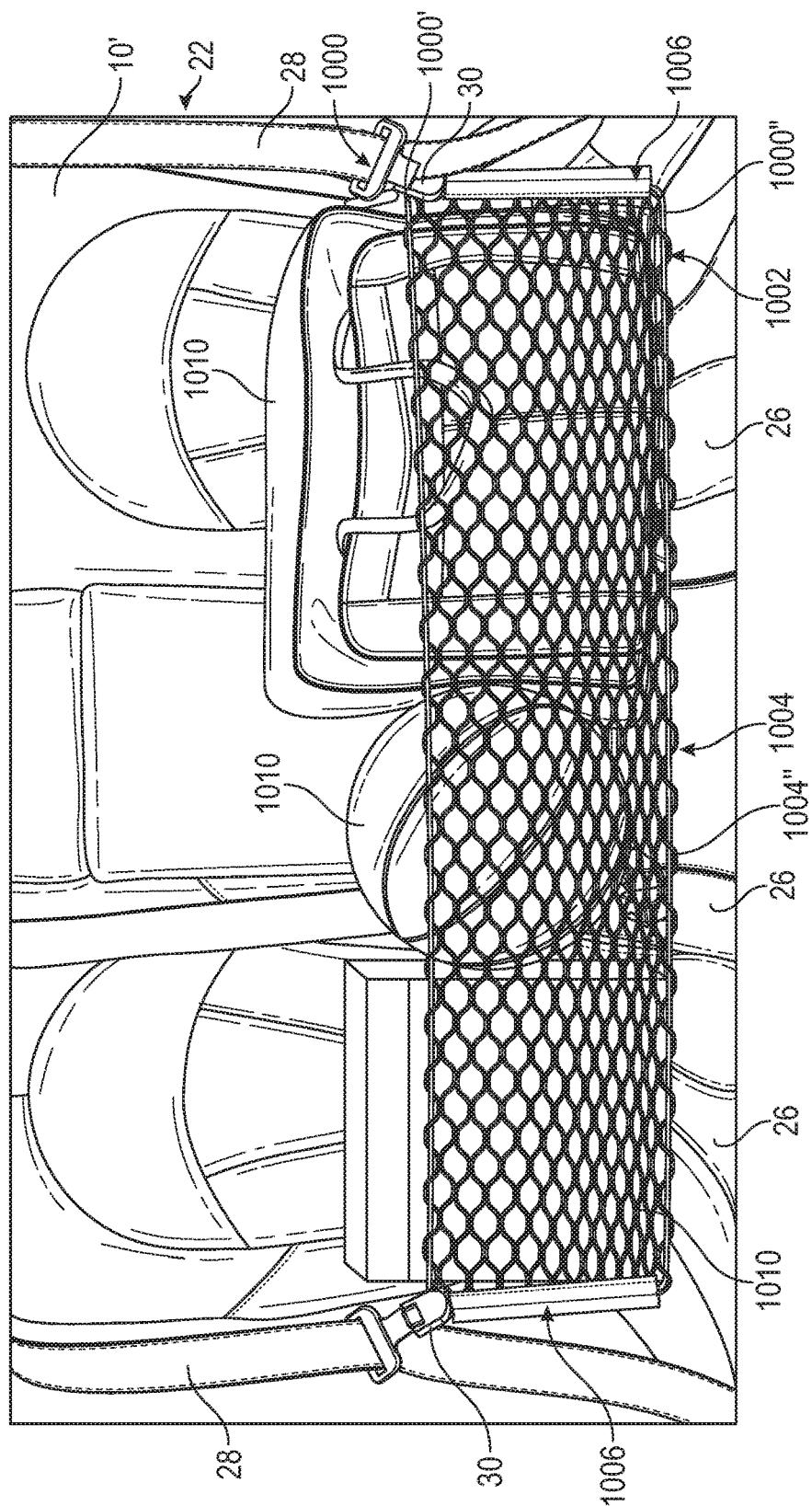
FIG. 29 is a schematic illustration of the exemplary cargo carrier restraint system of FIG. 28 retaining various cargo within an interior of the vehicle of FIG. 1, in accordance with various embodiments.

With reference to FIG. 29, with the cargo net 1000 coupled to the seat belts 28, the occupant restraint system 22 assists in retaining and securing the cargo net 1000, and thus, cargo 1010 within the interior 10' of the vehicle 10. Cargo 1010 may be received within an opening defined at the top end 1000' by the fabric netting 1002, and positioned into the cargo net 1000 so as to be at the bottom end 1000". As the fabric netting 1002 is flexible, the cargo net 1000 may retain and secure the cargo 1010 having assorted shapes and sizes.

Figure 30:
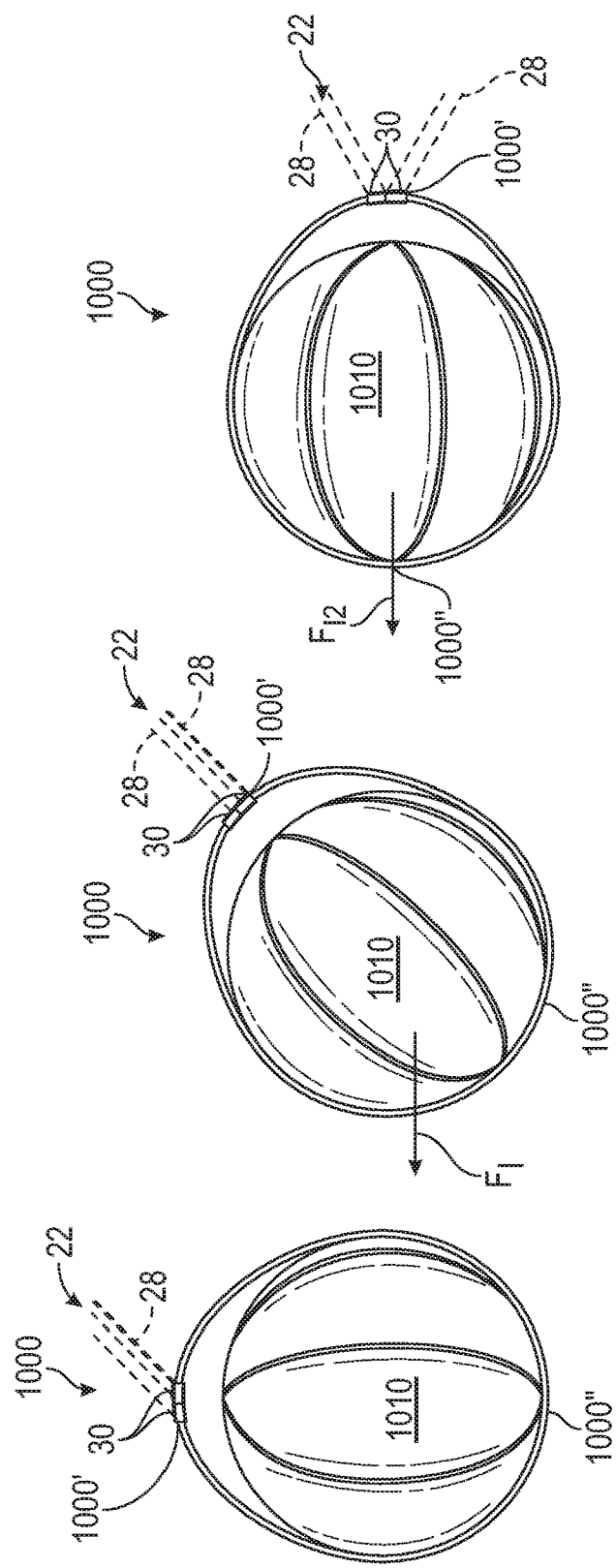
FIG. 30A is a schematic side-view illustration of the cargo carrier restraint system of FIG. 28 retaining cargo within an interior of the vehicle of FIG. 1 during a normal operation of the vehicle.
FIG. 30B is a schematic side-view illustration of the cargo carrier restraint system of FIG. 28 retaining cargo within an interior of the vehicle of FIG. 1 during an abrupt deceleration of the vehicle.
FIG. 30C is a schematic side-view illustration of the cargo carrier restraint system of FIG. 28 retaining cargo within an interior of the vehicle of FIG. 1 during a more abrupt deceleration of the vehicle than shown in FIG. 30B.

During operation of the vehicle 10, as the cargo net 1000 is secured at the top end 1000', the cargo net 1000 retains the cargo 1010 within the vehicle 10 during an abrupt deceleration. For example, with reference to FIGS. 30A-30C, the cargo net 1000 is shown schematically. In FIG. 30A, the vehicle 10 is under normal operation, the cargo 1010 and the cargo net 1000 are retained by the occupant restraint system 22. In FIG. 30B, the vehicle 10 has decelerated abruptly, and an inertia force $F_I$ is applied to the cargo 1010 and the cargo net 1000. The inertia force $F_I$ causes the mass center of the cargo 1010 to move forward, but the locked occupant restraint system 22, via the inertia force sensitive locking mechanism of the seat belt retractors 32, restrains the top of the cargo net 1000 keeping it from moving forward. As the seat belt buckle receptacles 30 are coupled to the seat belts 28 at the top end 1000' of the cargo net 1000, the cargo 1010 is retained with the cargo net 1000. In FIG. 30C, the cargo net 1000 is illustrated as undergoing a more abrupt deceleration than shown in FIG. 30B such that an inertia force $F_{I2}$ is greater than the inertia force $F_I$. As shown, the inertia force $F_{I2}$ causes the cargo 1010 to move forward, but the occupant restraint system 22 causes the cargo net 1000 to retain the cargo 1010 within the cargo net 1000.

With reference to FIG. 31, another exemplary cargo carrier restraint system 2000 is shown. As the cargo carrier restraint system 2000 is similar to the pet restraint system 302 described with regard to FIGS. 6-12, the same reference numerals will be used to denote the same features. In this example, the cargo carrier restraint system 2000 includes a body 2001 defined by a plurality of interconnected panels 2002, the one or more seat belt buckle receptacles 30 and the one or more spring hook clips 364. It should be noted that while the cargo carrier restraint system 2000 is described herein as including the spring hook clips 364, the cargo carrier restraint system 2000 may include any other suitable tie-down that cooperates with either the seat belt buckle receptacle 30 of the rear seats 26 and/or the lower anchors 34 of the rear seats 26.

In one example, the plurality of interconnected panels 2002 includes seven panels 2002 to define the body 2001. As shown, three panels 2006, 2008, 2010 of the panels 2002 have a length L10, which is greater than a length L11 of the remaining side panels 2012 (FIG. 32). Each of the panels 2002 is composed of a material for holding and retaining cargo 1010 (FIG. 32), including, but not limited to a net, a woven fabric, a basket weave, etc. In this example, the net, woven fabric, basket weave, etc. interconnects each of the panels 2002 to define the body 2001. In addition, each of the panels 2002 may be a solid panel, and composed of a polymeric material, such as nylon. In certain embodiments, however, the panel 2010 may not be a solid panel. In the example of the panels 2002 as solid panels, the panels 2002 may be interconnected via one or more hinges, including, but not limited to, living hinges to define the body 2001. Generally, the body 2001 is movable from a first, collapsed state (FIG. 31) to a second, expanded state (FIG. 32) for receiving the cargo 1010.

The panel 2006 is substantially opposite the panel 2008, and the panels 2006, 2008 span a length of the rear seats 26. The panel 2010 defines a load floor for the body 2001, and is interconnected to all of the panels 2006, 2007, 2008, 2012. Two of the panels 2012 are interconnected to the panels 2006, 2008 to define a side of the body 2001; and two of the panels 2012 are interconnected to the panels 2006, 2008 to define the opposite side of the body 2001. The panels 2012 are foldable inward, in a direction toward each other as shown in FIG. 31 to reduce the size of the body 2001 when not in use. It should be noted, however, that the panels 2012 may also be foldable outward, in a direction away from each other, if desired. As shown in FIG. 33, when not in use, the body 2001 has a width W12 along the rear seat 26, which is less than a width (L11+L11) when the body 2001 is in use (FIG. 32).

In this example, with reference to FIG. 31, the panel 2006 is coupled to two of the seat belt buckle receptacles 30 at a top edge 2006'. The top edge 2006' is opposite an edge of the panel 2006 coupled to the panel 2010. In this example, the panel 2006 includes two loops 2014, one on each side, so as to be adjacent to a respective one of the panels 2012. Each of the loops 2014 receive a respective one of the seat belt buckle receptacles 30 and retain the seat belt buckle receptacles 30 on the panel 2006. In one example, each of the loops 2014 pass through a respective one of the slots of the seat belt buckle receptacles 30 and are coupled back to the panel 2006, via sewing for example, to couple the seat belt buckle receptacles 30 to the panel 2006.

The spring hook clips 364 are coupled to the panel 2008. The spring hook clips 364 are coupled to the panel 2008 at a lower edge 2008' of the panel 2008. The lower edge 2008' of the panel 2008 is also connected to the panel 2010. The spring hook clips 364 extend outwardly from the panel 2008, and couple the body 2001 to respective lower anchors 34 of the vehicle 10. In this example, the body 2001 includes two spring hook clips 364; however, it will be understood that the body 2001 may include any number of spring hook clips 364. In one example, with reference to FIG. 33, the panel 2008 includes two straps 2016, and a respective end of one of the straps 2016 is threaded through a respective one of the slots 380' to couple the spring hook clips 364 to the straps 2016. The end of the straps 2016 may be coupled back onto the panel 2008, via sewing for example, to securely couple the spring hook clips 364 to the panel 2008.

In various embodiments, with reference FIG. 34A, the cargo carrier restraint system 2000 may include one or more hinge locks 3004 to releasably lock one or more of the hinges that interconnect the panels 2002. In one example, the body 2001 includes two hinge locks 3004', 3004" coupled to the panels 2012 so as to maintain the panels 2012 in a fixed, rigid position. Stated another way, the hinge locks 3004', 3004" prevent the panels 2012 from expanding outwardly (FIG. 35) or inwardly (FIG. 34). In one example, the hinge locks 3004', 3004" each comprise tabs having a slot that corresponds with a thickness of an edge 2012' of the panels 2012. In this example, the tabs fit over the edge 2012' of each of the panels 2012 at the living hinge, and maintain the panels 2012 in the fixed, rigid position. Generally, the panels 2012 are maintained in a co-planar relationship. The co-planar relationship of the panels 2012 keeps the body 2001 in the second, expanded state as shown in FIG. 34A to enable free movement of the cargo, such the dog 106, within the body 2001.

In order to install the cargo carrier restraint system 2000, with the body 2001 defined by the interconnected panels 2006, 2008, 2010, 2012, the seat belt buckle receptacles 30 may be coupled to the panel 2006 via the loops 2014. The spring hook clips 364 may be coupled to the panel 2008 via the straps 2016. The cargo carrier restraint system 2000 may be positioned into the vehicle 10 and the panel 2010 may lie along the rear seats 26. The cargo carrier restraint system 2000 may be positioned with the body 2001 in the first, collapsed state (FIG. 31). The spring hook clips 364 are coupled to each of the lower anchors 34, and the seat belt buckle receptacles 30 are coupled to the buckle tongues 36 of the seat belts 28. The body 2001 may be moved into the second, expanded state to receive the cargo 1010 as shown in FIGS. 32 and 34. Depending upon the amount of cargo 1010, the panels 2012 may be partially collapsed as shown in FIG. 34. In the example of FIG. 34A, the body 3001 may be moved from the first, collapsed state into the second, expanded state and the hinge locks 3004', 3004" may be positioned over the edges 2012' of the panels 2012. The cargo, such as the dog 106, may be positioned within the body 2001. The hinge locks 3004', 3004" may be removed from the edges 2012' in order to move the body 3001 from the second, expanded state to the first, collapsed state.

It should be noted that while the panels 2006, 2008, 2010 are illustrated in FIGS. 31-34 as extending across three rear seats 26 of the vehicle 10, the present disclosure is not so limited. In this regard, with reference to FIGS. 35 and 36, a cargo carrier restraint system 2000' is shown. As the cargo carrier restraint system 2000' is similar to the cargo carrier restraint system 2000 described with regard to FIGS. 31-34, the same reference numerals will be used to denote the same features. In this example, the cargo carrier restraint system 2000' includes a body 2020 defined by a plurality of interconnected panels 2022, the one or more seat belt buckle receptacles 30 and the one or more spring hook clips 364.

In one example, the plurality of interconnected panels 2022 includes seven panels 2022 to define the body 2001. As shown, three panels 2026, 2028, 2030 of the panels 2002 have a length L13 (FIG. 36), which is greater than the length L11 of the remaining side panels 2012 (FIG. 32). Each of the panels 2022 is composed of a material for holding and retaining cargo 1010 (FIG. 35), including, but not limited to a net, a woven fabric, a basket weave, etc. In this example, the net, woven fabric, basket weave, etc. interconnects each of the panels 2022 to define the body 2020. In addition, each of the panels 2022 may be a solid panel, and composed of a polymeric material, such as nylon. In certain embodiments, however, the panel 2030 may not be a solid panel. In the example of the panels 2022 as solid panels, the panels 2022 may be interconnected via one or more hinges, including, but not limited to, living hinges to define the body 2020. Generally, the body 2020 is movable from a first, collapsed state to a second, expanded state (FIG. 35) for receiving the cargo 1010.

The panel 2026 is substantially opposite the panel 2028, and the panels 2026, 2028 span a length of substantially a single one of the rear seats 26. The panel 2030 defines a load floor for the body 2020, and is interconnected to all of the panels 2026, 2028, 2012. Two of the panels 2012 are interconnected to the panels 2026, 2028 to define a side of the body 2020; and two of the panels 2012 are interconnected to the panels 2026, 2028 to define the opposite side of the body 2020. As discussed with regard the cargo carrier restraint system 2000, the panels 2012 are foldable inward, in a direction toward each other to reduce the size of the body 2020 when not in use.

In this example, with reference to FIG. 31, the panel 2026 is coupled to two of the seat belt buckle receptacles 30 at the top edge 2006'. The panel 2026 includes the two loops 2014 that couple the seat belt buckle receptacles 30 to the panel 2026. The spring hook clips 364 are coupled to the panel 2028 at the lower edge 2008' of the panel 2028. The lower edge 2008' of the panel 2008 is connected to the panel 2030. The spring hook clips 364 extend outwardly from the panel 2028, and couple the body 2020 to respective lower anchors 34 of the vehicle 10. The panel 2028 includes the two straps 2016, which securely couple the spring hook clips 364 to the panel 2028.

As the installation and use of the cargo carrier restraint system 2000' is substantially the same as the installation and use of the cargo carrier restraint system 2000, the installation and use of the cargo carrier restraint system 2000' will not be discussed in great detail herein. Briefly, the seat belt buckle receptacles 30 may be coupled to the panel 2026 via the loops 2014. The spring hook clips 364 may be coupled to the panel 2028 via the straps 2016. The cargo carrier restraint system 2000 may be positioned into the vehicle 10 and the panel 2030 may lie substantially along the single one of the rear seats 26. The body 2001 may be moved from the first, collapsed state into the second, expanded state to receive the cargo 1010. Depending upon the amount of cargo 1010, the panels 2012 may be expanded outward as shown.

With reference to FIG. 37, another exemplary cargo carrier restraint system 3000 is shown. As the cargo carrier restraint system 3000 is similar to the cargo carrier restraint system 2000 described with regard to FIGS. 31-34, the same reference numerals will be used to denote the same features. In this example, the cargo carrier restraint system 3000 includes a body 3001 defined by a plurality of interconnected panels 3002, the one or more hinge locks 3004, the one or more seat belt buckle receptacles 30 and the one or more spring hook clips 364. It should be noted that while the cargo carrier restraint system 3000 is described herein as including the spring hook clips 364, the cargo carrier restraint system 3000 may include any other suitable tie-down that cooperates with either the seat belt buckle receptacle 30 of the rear seats 26 and/or the lower anchors 34 of the rear seats 26.

In this example, the plurality of interconnected panels 3002 includes seven panels 3002 to define the body 3001. As shown, panels 3006, 3008, 3010 of the panels 3002 have a length L14, which is greater than the length L11 of the remaining side panels 2012 (FIG. 39). Each of the panels 3002 is composed of a material for holding and retaining cargo, such as the dog 106 (FIG. 39), including, but not limited to a fine-mesh net, a woven fabric, a basket weave, etc. In this example, the fine-mesh net, woven fabric, basket weave, etc. interconnects each of the panels 3002 to define the body 3001. In addition, each of the panels 3002 may be a solid panel, and composed of a polymeric material, such as nylon. In the example of the panels 3002 as solid panels, the panels 3002 may be interconnected via one or more hinges, including, but not limited to, living hinges to define the body 3001. Generally, the body 3001 is movable from a first, collapsed state (FIG. 37) to a second, expanded state (FIGS. 39 and 40) for receiving the cargo.

In this example, the panel 3006 is each substantially opposite the panel 3008. The panels 3006, 3008, 2012 span a length of the rear seats 26 in the first, collapsed state. The panel 3010 defines a load floor for the body 3001, and is interconnected to all of the panels 3006, 3008, 2012. Two of the panels 2012 are interconnected to the panels 3006, 3008 to define the sides of the body 3001. The panels 2012 are foldable outward, in a direction away from each other as shown in FIG. 38.

In this example, with reference to FIG. 38, the panel 3006 is coupled to one of the seat belt buckle receptacles 30 at a top edge 3006'. The top edge 3006' is opposite an edge of the panel 3006 coupled to the panel 3010. In this example, the panel 3006 includes the loops 2014. The loops 2014 receive a respective one of the seat belt buckle receptacles 30 and retain the seat belt buckle receptacle 30 on the panel 3006. Each of the loops 2014 pass through a respective one of the slots of the seat belt buckle receptacles 30 and are coupled back to the panel 3006 via sewing for example, to couple the seat belt buckle receptacles 30 to the panel 3006.

With reference to FIG. 37, one of the spring hook clips 364 is coupled to the panel 3016 at a lower edge 3008' of the panel 3008. The lower edge 3008' of the panel 3008 is also connected to the panel 3010. Another one of the spring hook clips 364 is coupled to the panel 3008 at the lower edge 3008'. The spring hook clips 364 extend outwardly from the panel 3008, and couple the body 3001 to the lower anchors 34 of the vehicle 10. In this example, the body 3001 includes two spring hook clips 364. However, it will be understood that the body 3001 may include any number of spring hook clips 364. In one example, the panels 3008 each include one of the straps 2016, and a respective end of one of the straps 2016 is threaded through a respective one of the slots 380' to couple the spring hook clips 364 to the straps 2016. The end of the straps 2016 may be coupled back onto the panels 3008, via sewing for example, to securely couple the spring hook clip 364 to the panels 3008.

With reference to FIG. 39, the one or more hinge locks 3004 include the two hinge locks 3004', 3004" coupled to the panels 2012 so as to maintain the panels 2012 in the fixed, rigid position. The co-planar relationship of the panels 2012 keeps the body 3001 in the second, expanded state as shown in FIG. 39 to enable free movement of the cargo, such the dog 106, within the body 3001.

As the installation and use of the cargo carrier restraint system 3000 is substantially the same as the installation and use of the cargo carrier restraint system 2000, the installation and use of the cargo carrier restraint system 3000 will not be discussed in great detail herein. Briefly, the seat belt buckle receptacles 30 may be coupled to the panel 3006 via the loops 2014. The spring hook clips 364 may be coupled to the panel 3008 via the straps 2016. The cargo carrier restraint system 3000 may be positioned into the vehicle 10 and the panel 3010 may lie substantially along the rear seats 26. The body 3001 may be moved from the first, collapsed state into the second, expanded state and the hinge locks 3004', 3004" may be positioned over the edges 2012' of the panels 2012. The cargo, such as the dog 106, may be positioned within the body 3001. The hinge locks 3004', 3004" may be removed from the edges 2012' in order to move the body 3001 from the second, expanded state to the first, collapsed state.

With continued reference to FIG. 41, a schematic illustration of the forces acting on cargo, such as the dog 106, within the cargo carrier restraint systems 3000 is shown. Generally, the inertia force $F_I$ is applied to the cargo, such as the dog 106, during the operation of the vehicle 10. As the body 3001 is secured by two of the seat belts 28, a shoulder belt restraint force $F_{S1}$ and a lap belt restraint force $F_{S2}$ is applied to the body 3001 on both sides to restrain the body 3001 on the rear seat 26. As the body 3001 is also secured by two of the lower anchors 34, a lower anchor restraint force $F_{L1}$ is applied to the body 3001 on both sides to further restrain the body 3001 on the rear seat 26.

It should be noted that while the cargo carrier restraint system 3000 are illustrated in FIGS. 37-40 as being used with the rear seat(s) 26 of the vehicle 10, the present disclosure is not so limited. In this regard, with reference to FIGS. 42-44, a cargo carrier restraint system 4000 is shown for use with the front seat 24, such as a passenger seat. As the cargo carrier restraint system 4000 is similar to the cargo carrier restraint systems 3000 described with regard to FIGS. 37-40, the same reference numerals will be used to denote the same features. In this example, the cargo carrier restraint system 4000 includes a body 4020 defined by a plurality of interconnected panels 4022 and the one or more hinge locks 3004.

In this example, the plurality of interconnected panels 4022 includes seven panels 4022 to define the body 4020. As shown, three panels 4026, 4028, 4030 of the panels 4022 have a length L16 (FIG. 40), which is greater than the length L17 of remaining side panels 4012 (FIG. 43). Each of the panels 4022 is composed of a material for holding and retaining cargo, including, but not limited to a net, a woven fabric, a basket weave, etc. In this example, the net, woven fabric, basket weave, etc. interconnects each of the panels 4022 to define the body 4020. In addition, each of the panels 4022 may be a solid panel, and composed of a polymeric material, such as nylon. In the example of the panels 4022 as solid panels, the panels 4022 may be interconnected via one or more hinges, including, but not limited to, living hinges to define the body 4020. Generally, the body 4020 is movable from a first, collapsed state to a second, expanded state (FIG. 42) for receiving the cargo.

In this example, the panel 4026 is substantially opposite the panel 4028, and the panels 4026, 4028 span a length of substantially the font seat 24. The panel 4026 may include a hook or outward projection 4026' to aid in guiding the seat belt 28 about the panel 4026. The panel 4030 defines a load floor for the body 4020, and is interconnected to all of the panels 4026, 4028, 4012. Two of the panels 4012 are interconnected to the panels 4026, 4028 to define a side of the body 4020; and two of the panels 4012 are interconnected to the panels 4026, 4028 to define the opposite side of the body 4020. The panels 4012 are foldable inward, in a direction toward each other to reduce the size of the body 4020 when not in use.

With reference to FIG. 43, the one or more hinge locks 3004 include the two hinge locks 3004', 3004" coupled to the panels 4012 so as to maintain the panels 4012 in a fixed, rigid position. Stated another way, the hinge locks 3004', 3004" prevent the panels 4012 from expanding outwardly (FIG. 35) or inwardly (FIG. 34). In one example, the hinge locks 3004', 3004" each comprise tabs having a slot that corresponds with a thickness of an edge 4012' of the panels 4012. In this example, the tabs fit over the edge 4012' of each of the panels 4012 at the living hinge, and maintain the panels 4012 in the fixed, rigid position. Generally, the panels 4012 are maintained in a co-planar relationship. The co-planar relationship of the panels 4012 keeps the body 4020 in the second, expanded state as shown in FIG. 43 to enable free movement of the cargo within the body 4020.

In order to install the cargo carrier restraint system 4000, with the body 4020 defined by the interconnected panels 4026, 4028, 4030, 4012, the cargo carrier restraint system 4000 may be positioned into the vehicle 10 and the panel 4030 may lie along the front seat 24. The cargo carrier restraint system 4000 may be positioned with the body 4020 in the first, collapsed state. The body 4020 may be moved from the first, collapsed state into the second, expanded state and the hinge locks 3004', 3004" may be positioned over the edges 4012' of the panels 4012. The seat belt 28 of the occupant restraint system 20 may be positioned about the body 4020, such that a portion of the seat belt 28 contacts the panel 4026. The seat belt 28 is coupled to the seat belt buckle receptacle 30 to retain the body 4020 on the front seat 24. The cargo may be positioned within the body 4020. The hinge locks 3004', 3004" may be removed from the edges 4012' in order to move the body 4020 from the second, expanded state to the first, collapsed state.

With reference to FIG. 44, another exemplary cargo carrier restraint system 5000 is shown. As the cargo carrier restraint system 5000 is similar to pet restraint system 102 described with regard to FIG. 3, the same reference numerals will be used to denote the same features. In this example, the cargo carrier restraint system 5000 includes a band 5002, a strap 5004 and the second tongue 154.

The band 5002 is composed of a polymeric material, and may be composed of the same material as the strap 5004. In certain embodiments, the band 5002 may be composed of a metal or a metal alloy. The band 5002 is annular, and defines an aperture 5003. The aperture 5003 receives a portion of the strap 5004 to retain the strap 5004 about cargo.

The strap 5004 may be composed of a woven polymeric material for example, and alternatively, may be composed of a natural fiber, a leather, etc. The strap 5004 includes a loop of extra material and the slider 134 such that a length of the strap 5004 is adjustable in a longitudinal direction of the strap 150. The strap 5004 includes a first end 5006, and an opposite, second end 5008. The band 5002 is coupled to the first end 5006; and the second tongue 154 is coupled to the second end 5008. In one example, the band 5002 separately formed and is retained within the loop of extra material. The band 5002 may also be defined by sewing a portion of the strap 5004 onto itself at the first end 5006. The second end 5008 is looped around the bracket 154' of the second tongue 154 and coupled to itself to retain the second tongue 154. For example, the second end 5008 may be sewn together to retain the second tongue 154. The second tongue 154 engages with a respective one of the seat belt buckle receptacles 30 coupled to the occupant restraint systems 20, 22. Thus, the cargo carrier restraint system 5000 may be used to couple cargo in a variety of ways within the interior cabin 10' of the vehicle 10 (FIG. 48).

It should be noted that while the cargo carrier restraint system 5000 is illustrated in FIG. 47 as having the second tongue 154 for engaging with a respective one of the seat belt buckle receptacles 30 coupled to the occupant restraint systems 20, 22, the present disclosure is not so limited. In this regard, with reference to FIG. 46, another exemplary cargo carrier restraint system 6000 is shown. As the cargo carrier restraint system 6000 is similar to cargo carrier restraint system 5000 described with regard to FIG. 45 and the pet restraint system 102 described with regard to FIG. 3, the same reference numerals will be used to denote the same features. In this example, the cargo carrier restraint system 6000 includes the band 5002, the strap 5004 and the seat belt buckle receptacle 30.

In this example, the seat belt buckle receptacle 30 is coupled to the second end 5008. In one example, the second end 5008 is fed through a slot 30' of the seat belt buckle receptacle 30 and coupled to itself to retain the seat belt buckle receptacle 30. For example, the second end 5008 may be sewn together to retain the seat belt buckle receptacle 30. The seat belt buckle receptacle 30 engages with a respective one of the buckle tongues 36 of the occupant restraint systems 20, 22. Thus, the cargo carrier restraint system 6000 may also be used to couple cargo in a variety of ways within the interior cabin 10' of the vehicle 10 (FIG. 48).

It should be noted that while the cargo carrier restraint system 6000 is illustrated in FIG. 46 as having the seat belt buckle receptacle 30 for engaging with a respective one of the buckle tongues 36 of the occupant restraint systems 20, 22, the present disclosure is not so limited. In this regard, with reference to FIG. 47, another exemplary cargo carrier restraint system 7000 is shown. As the cargo carrier restraint system 7000 is similar to cargo carrier restraint system 5000 described with regard to FIG. 45 and the pet restraint system 302 described with regard to FIG. 6, the same reference numerals will be used to denote the same features. In this example, the cargo carrier restraint system 7000 includes the band 5002, the strap 5004 and the spring hook clip 364.

In this example, the spring hook clip 364 is coupled to the second end 5008. In one example, the second end 5008 is fed through the slot 380' of the spring hook clip 364 and coupled to itself to retain the spring hook clip 364. For example, the second end 5008 may be sewn together to retain the spring hook clip 364. The spring hook clip 364 engages with a respective one of the lower anchors 34 coupled to the occupant restraint system 22. Thus, the cargo carrier restraint system 6000 may also be used to couple cargo in a variety of ways within the interior cabin 10' of the vehicle 10 (FIG. 48).

In order to assemble and use the cargo carrier restraint systems 5000, 6000, 7000, in one example, with the strap 5004 formed, the band 5002 may be positioned onto the first end 5006 of the strap 5004. The slider 134 may be threaded onto the strap 5004 to retain the band 5002. For the cargo carrier restraint system 5000, the second tongue 154 may be coupled to the second end 5008 of the strap 150 by sewing the second end 5008 of the strap 150 onto itself. Similarly, for the cargo carrier restraint system 6000, the seat belt buckle receptacle 30 may be coupled to the second end 5008 of the strap 150 by sewing the second end 5008 of the strap 150 onto itself. For the cargo carrier restraint system 7000, the spring hook clip 364 may be coupled to the second end 5008 of the strap 150 by also sewing the second end 5008 of the strap 150 onto itself.

With the cargo carrier restraint systems 5000, 6000, 7000 assembled, the cargo carrier restraint systems 5000, 6000, 7000 may be used to retain cargo within the interior 10' of the vehicle 10. With reference to FIG. 48, the cargo carrier restraint system 5000 is shown retaining cargo 5010. The strap 5004 is positioned about the cargo 5010, and the portion of the strap 5004 is passed through the band 5002 to retain the cargo by the strap 5004 itself. The tongue 154" of the second tongue 154 is coupled to the seat belt buckle receptacle 30 to retain the cargo on the seat 24, 26.

It should be understood, that for the cargo carrier restraint system 6000, the strap 5004 may be positioned about the cargo, and the portion of the strap 5004 is passed through the band 5002 to retain the cargo by the strap 5004 itself. The seat belt buckle receptacle 30 is coupled to the buckle tongue 36 of the seat belt 28 to retain the cargo on the seat 24, 26. For the cargo carrier restraint system 7000, the strap 5004 may be positioned about the cargo, and the portion of the strap 5004 is passed through the band 5002 to retain the cargo by the strap 5004 itself. The spring hook clip 364 is coupled to the lower anchor 34 to retain the cargo on the rear seat 26.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A kit for securing cargo within an interior of a vehicle having an occupant restraint system including a coupling member, comprising:
    a harness having at least one connecting ring and configured to hold the cargo;
    a first strap having a seat belt buckle receptacle at a first end releasably coupled to the coupling member and a second connector at a second end coupled to the at least one connecting ring, the first strap having a length defined between the first end and the second end; and
    an energy absorbing element defined on a portion of the first strap between the first end and the second end, the energy absorbing element including a plurality of rivets spaced apart along the length of the first strap, each of the plurality of rivets defined parallel to a surface of the first strap, the portion of the first strap folded to lie on the surface of the first strap and each of the plurality of rivets is deformable to absorb a force acting on the cargo.

2. The kit of claim 1, further comprising a tether.

3. The kit of claim 2, wherein the second connector is a first spring hook clip that is configured to couple to the at least one connecting ring.

4. The kit of claim 1, wherein the energy absorbing element is folded such that a first length of the energy absorbing element is less than the length of the first strap.

5. The kit of claim 1, wherein the energy absorbing element comprises two energy absorbing elements including a first energy absorbing element formed on the portion of the first strap and a second energy absorbing element formed on a second portion of the first strap.

6. A cargo restraint system for securing cargo to a coupling member within an interior of a vehicle, comprising:
 a harness having at least one connecting ring and configured to hold the cargo;
 a strap having a first connector at a first end that releasably couples to the connecting ring and a second connector at a second end opposite the first end that is configured to couple to the coupling member within the interior of the vehicle, the strap having a first strap portion associated with the first end and a second strap portion associated with the second end; and
 an energy absorbing element defined on the strap between the first end and the second end, the energy absorbing element including a housing and an energy absorbing member, the housing coupled to the first strap portion and the second strap portion and the housing surrounds a portion of the energy absorbing member, the energy absorbing member comprising an adhesive that is disposed between a first strap end of the first strap portion and a second strap end of the second strap portion, the energy absorbing member deformable to absorb a force acting on the cargo.

7. The cargo restraint system of claim 6, wherein the at least one energy absorbing member couples the housing to the strap.

8. The cargo restraint system of claim 6, wherein the second connector comprises a first spring hook clip that is configured to couple to the coupling member in the form of a lower anchor associated with the vehicle and the second connector comprises a second spring hook clip coupled to the at least one connecting ring.

9. A cargo restraint system for securing cargo within an interior of a vehicle, comprising:
 a body having a plurality of interconnected panels, the plurality of interconnected panels cooperating to hold the cargo;
 a first seat belt buckle receptacle coupled to a first panel of the plurality of interconnected panels and configured to couple to a first belt tongue of a first seat belt associated with the vehicle; and
 a first lower connector coupled to a second panel of the plurality of interconnected panels and configured to couple to a first lower anchor associated with the vehicle.

10. The cargo restraint system of claim 9, wherein the first lower connector comprises a first spring hook clip configured to connect to the first lower anchor.

11. The cargo restraint system of claim 10, further comprising a second spring hook clip coupled to one of the plurality of interconnected panels and configured to couple to a second lower anchor associated with the vehicle.

12. The cargo restraint system of claim 9, further comprising a second seat belt buckle receptacle coupled to one of the plurality of interconnected panels and configured to couple to a second belt tongue of a second seat belt associated with the vehicle.

13. The cargo restraint system of claim 9, wherein the body comprises a collapsible body having hinges interconnecting the plurality of interconnected panels and at least one hinge lock operable to arrange one of the plurality of interconnected panels substantially co-planar with another one of the plurality of interconnected panels.

14. The cargo restraint system of claim 6, wherein the second connector is a handle that is configured to couple to the coupling member in the form of a seat belt of an occupant restraint system associated with the vehicle.

* * * * *